(12) United States Patent
Lager

(10) Patent No.: US 9,723,918 B2
(45) Date of Patent: *Aug. 8, 2017

(54) UNIVERSALLY MOUNTED WORK SURFACE HEIGHT ADJUSTOR WITH SUCTION CUPS

(71) Applicant: WL Innovations, LLC, Columbus, OH (US)

(72) Inventor: William Lager, Columbus, OH (US)

(73) Assignee: WL INNOVATIONS, LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,472

(22) Filed: Sep. 14, 2015

(65) Prior Publication Data

US 2016/0000219 A1    Jan. 7, 2016

Related U.S. Application Data

(63) Continuation-in-part of application No. 14/570,250, filed on Dec. 15, 2014, which is a
(Continued)

(51) Int. Cl.
| | | |
|---|---|---|
| *A47B 9/00* | (2006.01) |
| *A47B 21/02* | (2006.01) |
| *A47B 9/20* | (2006.01) |
| *A47B 83/00* | (2006.01) |
| *F16B 47/00* | (2006.01) |
| *A47B 13/00* | (2006.01) |
| *A47B 5/02* | (2006.01) |
| *A47B 57/40* | (2006.01) |
| *A47B 9/04* | (2006.01) |
| *A47B 57/42* | (2006.01) |

(52) U.S. Cl.
CPC .............. *A47B 21/02* (2013.01); *A47B 5/02* (2013.01); *A47B 9/04* (2013.01); *A47B 9/20* (2013.01); *A47B 13/003* (2013.01); *A47B 57/40* (2013.01); *A47B 57/42* (2013.01); *A47B 83/001* (2013.01); *F16B 47/006* (2013.01); *A47B 2200/0056* (2013.01)

(58) Field of Classification Search
CPC .......... A47B 57/40; A47B 57/42; A47B 57/46; A47B 57/48; A47B 9/00; A47B 9/02; A47B 9/14; A47B 9/20; A47B 37/00; A47B 21/02; A47B 5/02; A47B 13/003; A47B 83/001; A47B 2200/0056; F16B 47/006
USPC ........... 108/42, 144.11, 147, 147.11, 147.17, 108/147.19, 50.01, 50.02, 157.1; 248/243, 220.43

See application file for complete search history.

(56) References Cited

U.S. PATENT DOCUMENTS

| | | | | |
|---|---|---|---|---|
| 2,772,846 A | * | 12/1956 | Skar ...................... A47B 57/42 |
| | | | | 211/134 |
| 2,829,934 A | * | 4/1958 | Schulze ................... A47B 9/00 |
| | | | | 108/157.1 |

(Continued)

*Primary Examiner* — Jose V Chen
(74) *Attorney, Agent, or Firm* — Dickinson Wright PLLC

(57) ABSTRACT

An apparatus for adjusting the height of a work surface comprising a height-adjusting mechanism and a universal mount that ensures compatibility with a wide variety of desks and other work surfaces. The apparatus may include one or more suction cups for securing the work surface to the height adjustment mechanism. The apparatus may also include a bent universal adapter bracket.

21 Claims, 52 Drawing Sheets

Related U.S. Application Data continuation-in-part of application No. 14/247,511, filed on Apr. 8, 2014, now Pat. No. 8,919,264.

(56) References Cited

U.S. PATENT DOCUMENTS

| | | | | |
|---|---|---|---|---|
| 3,729,113 A * | 4/1973 | Lopatka | A47B 57/30 | 220/480 |
| 4,050,752 A * | 9/1977 | Dykstra | B01L 9/02 | 108/147 |
| 4,222,542 A * | 9/1980 | Wilson | A47B 57/42 | 211/192 |
| 4,549,712 A * | 10/1985 | Simon | A47B 57/42 | 248/224.8 |
| 4,619,208 A * | 10/1986 | Kurrasch | A47B 9/12 | 108/106 |
| 4,762,072 A * | 8/1988 | Boundy | A47B 21/06 | 108/50.02 |
| 4,969,403 A * | 11/1990 | Schwartz | A47B 5/00 | 108/147 |
| 5,083,514 A * | 1/1992 | Schwartz | A47B 5/00 | 108/108 |
| 5,129,835 A * | 7/1992 | DeFouw | H02G 3/288 | 439/211 |
| 5,199,778 A * | 4/1993 | Aoki | A47B 57/32 | 108/147 |
| 5,265,952 A * | 11/1993 | Greshem | A47B 83/001 | 108/147 |
| 5,447,099 A * | 9/1995 | Adams | A47B 9/04 | 108/147 |
| 5,743,193 A * | 4/1998 | Kakuta | A47B 21/02 | 108/106 |
| 5,913,584 A * | 6/1999 | Swindell | A47B 57/06 | 108/108 |
| 6,267,064 B1 * | 7/2001 | Ostertag | A47B 13/021 | 108/108 |
| 7,506,772 B2 * | 3/2009 | Chen | A47B 95/008 | 211/103 |
| 8,256,628 B2 * | 9/2012 | Stafford | A47F 5/0025 | 108/108 |
| 8,453,387 B2 * | 6/2013 | Goepfert | A47B 47/05 | 248/245 |
| 8,919,264 B1 * | 12/2014 | Lager | A47B 9/04 | 108/108 |
| 2005/0217542 A1 * | 10/2005 | Tzeng | F16B 12/42 | 108/157.1 |
| 2005/0274299 A1 * | 12/2005 | Bienick | A47B 57/48 | 108/108 |
| 2011/0247532 A1 * | 10/2011 | Jones | A47B 9/02 | 108/147 |

* cited by examiner

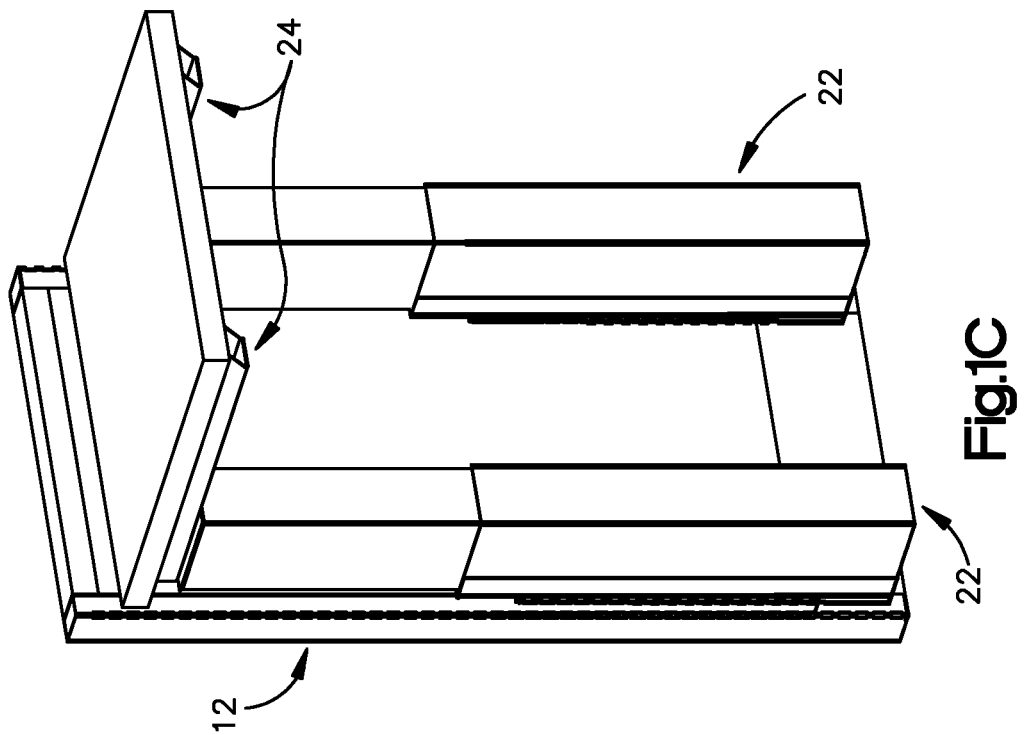
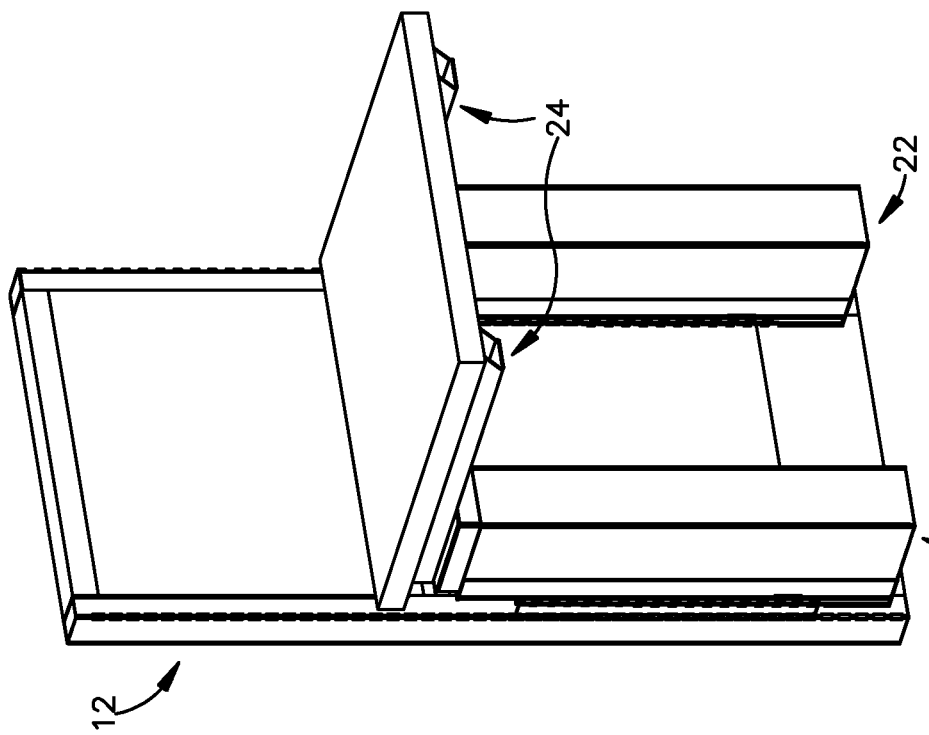

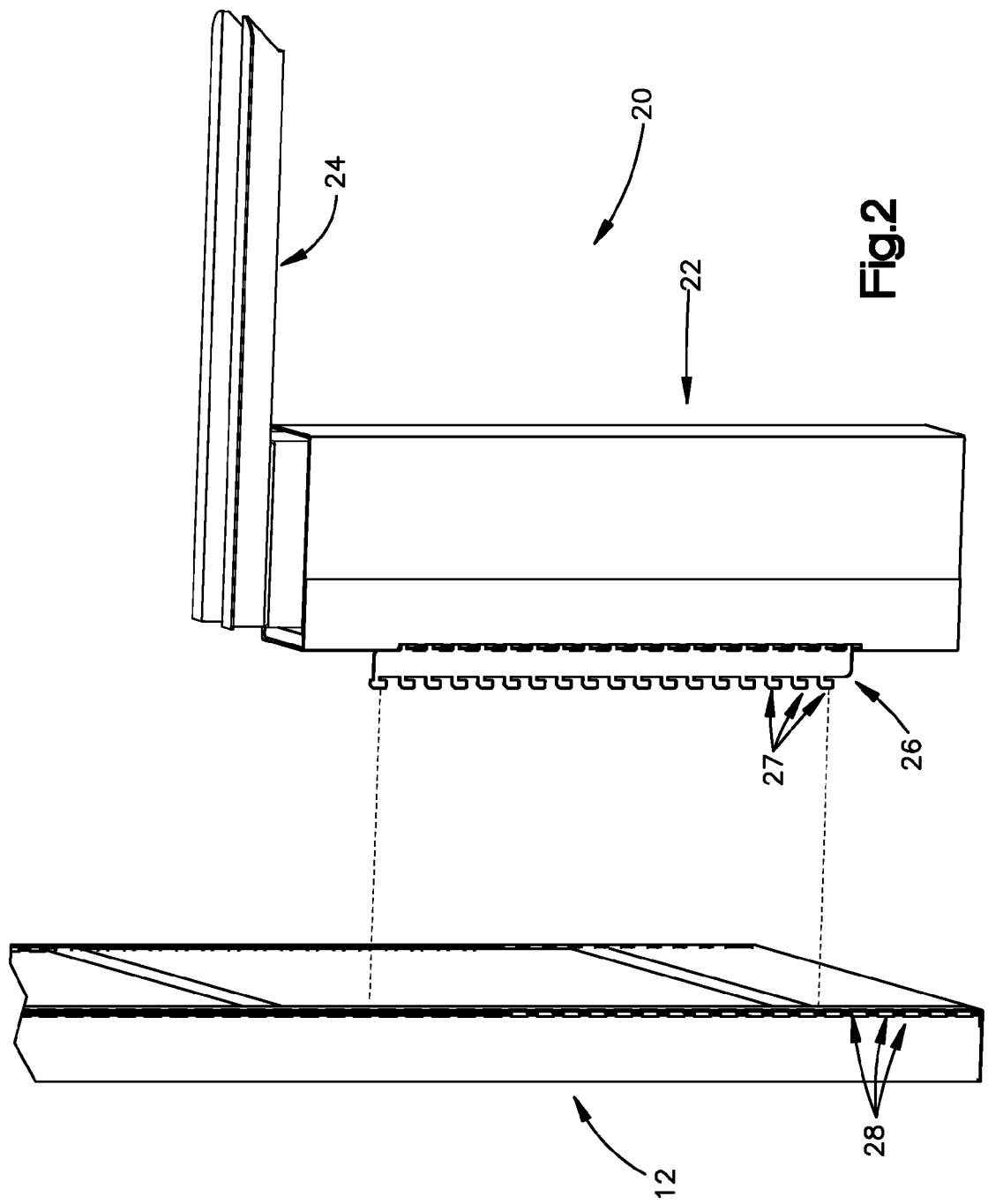

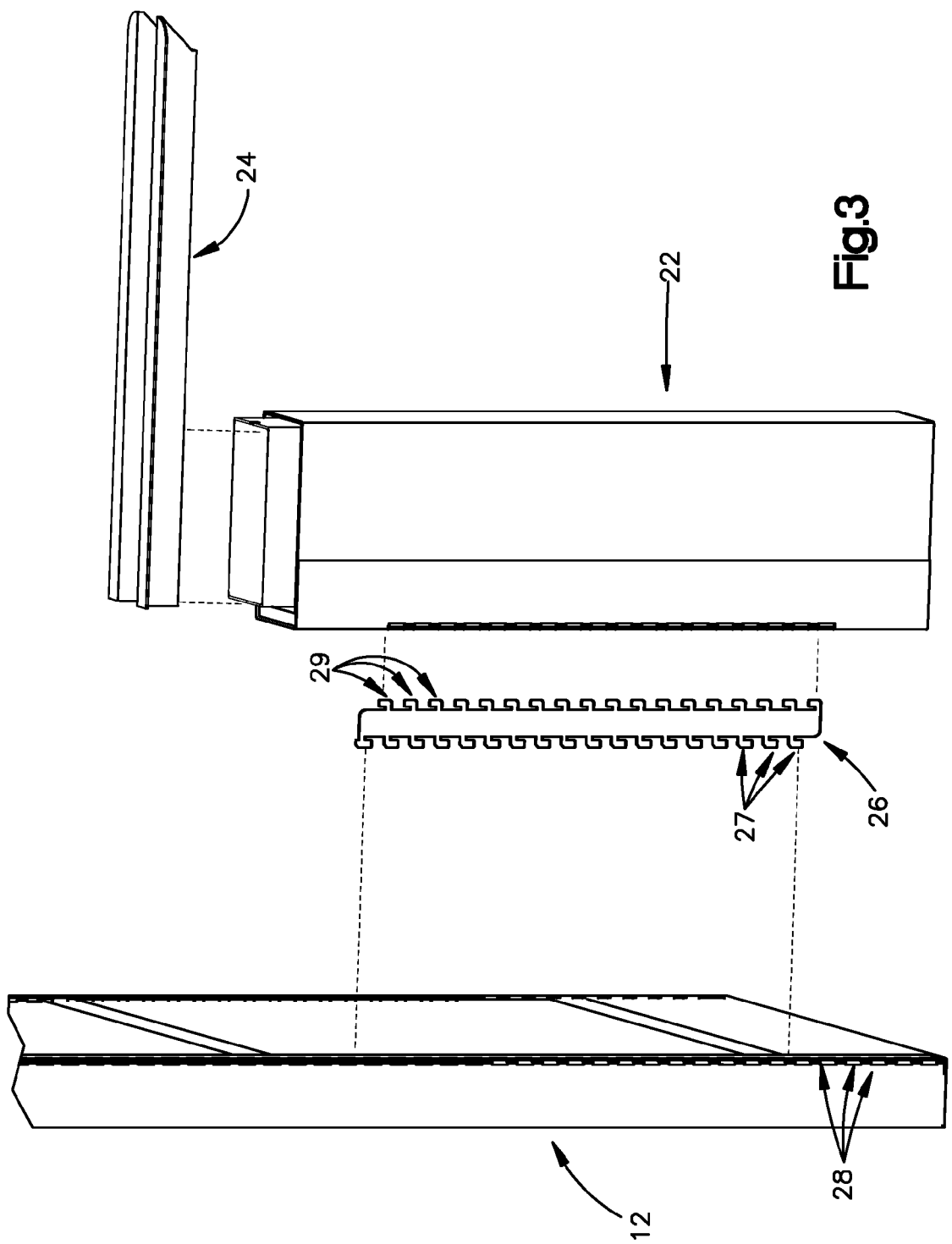

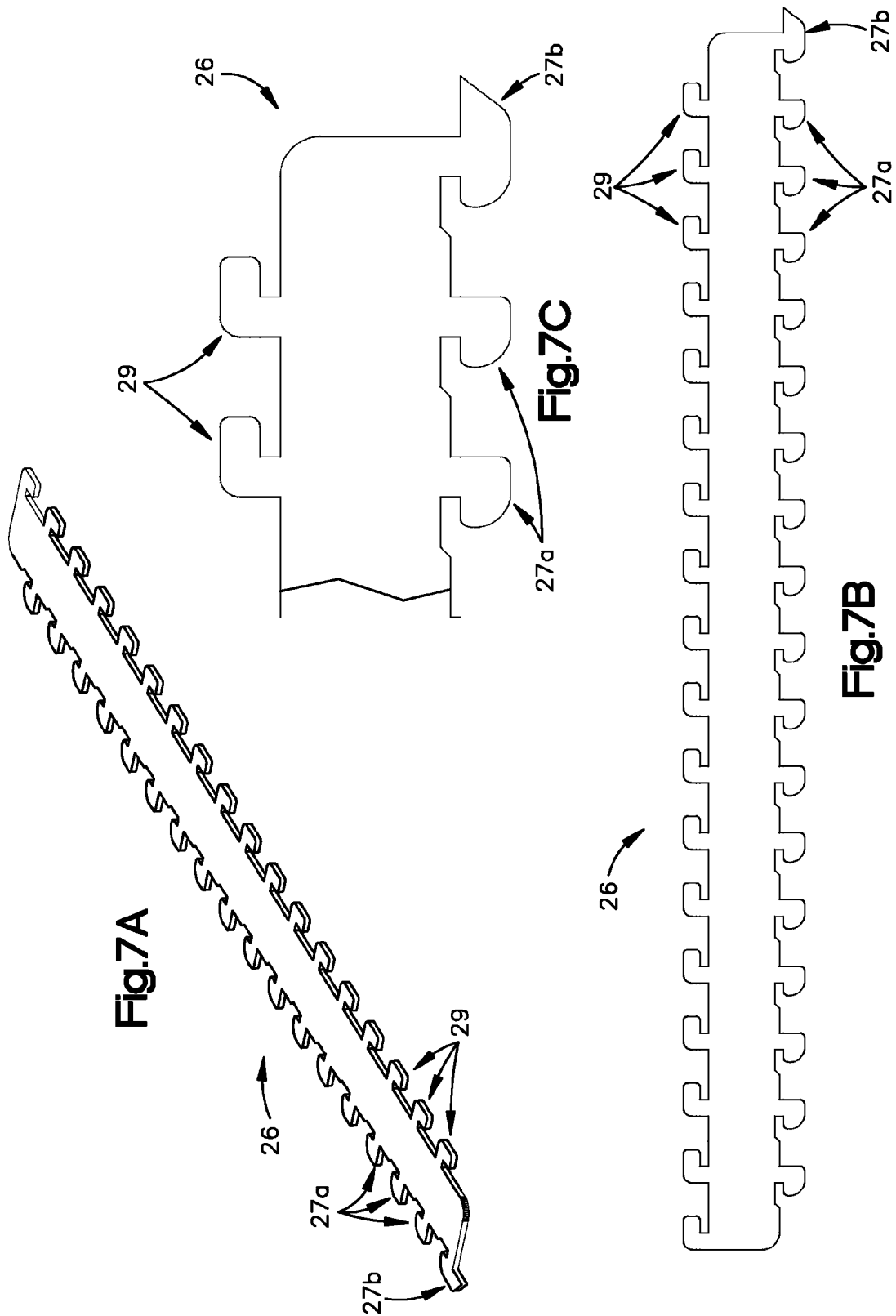

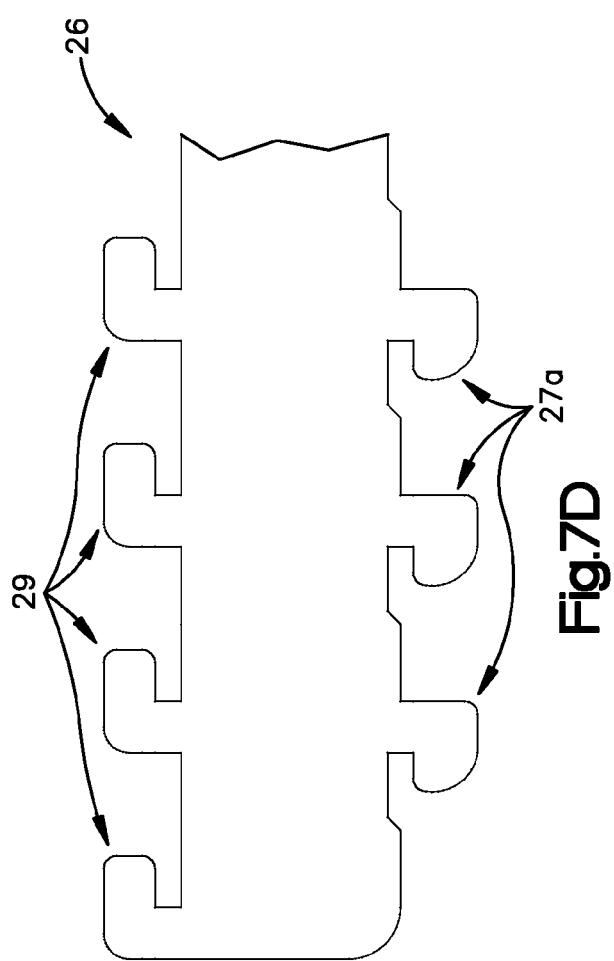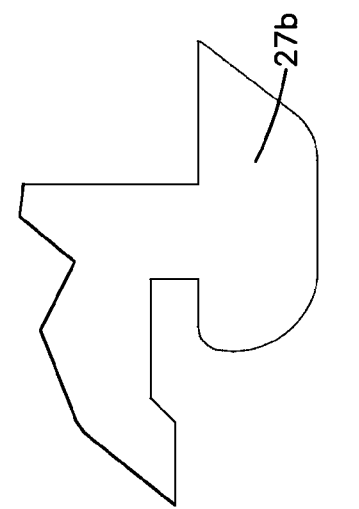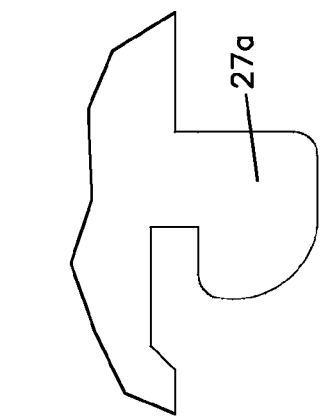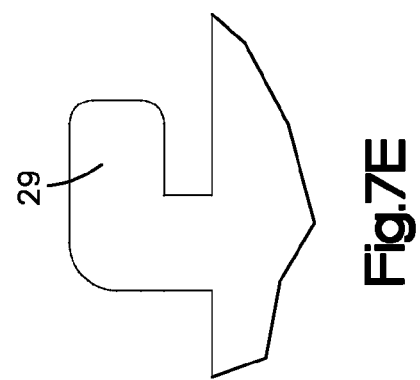

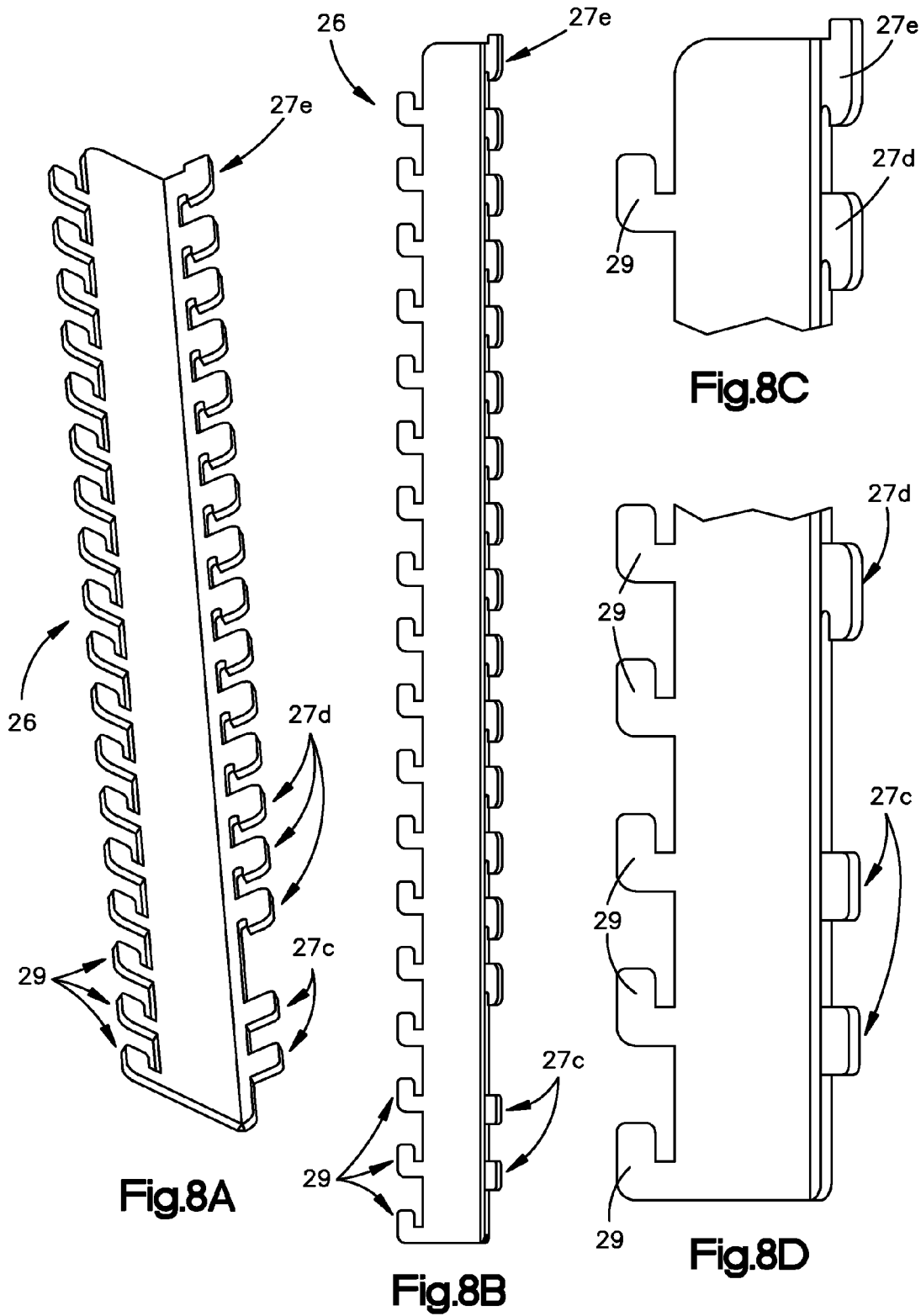

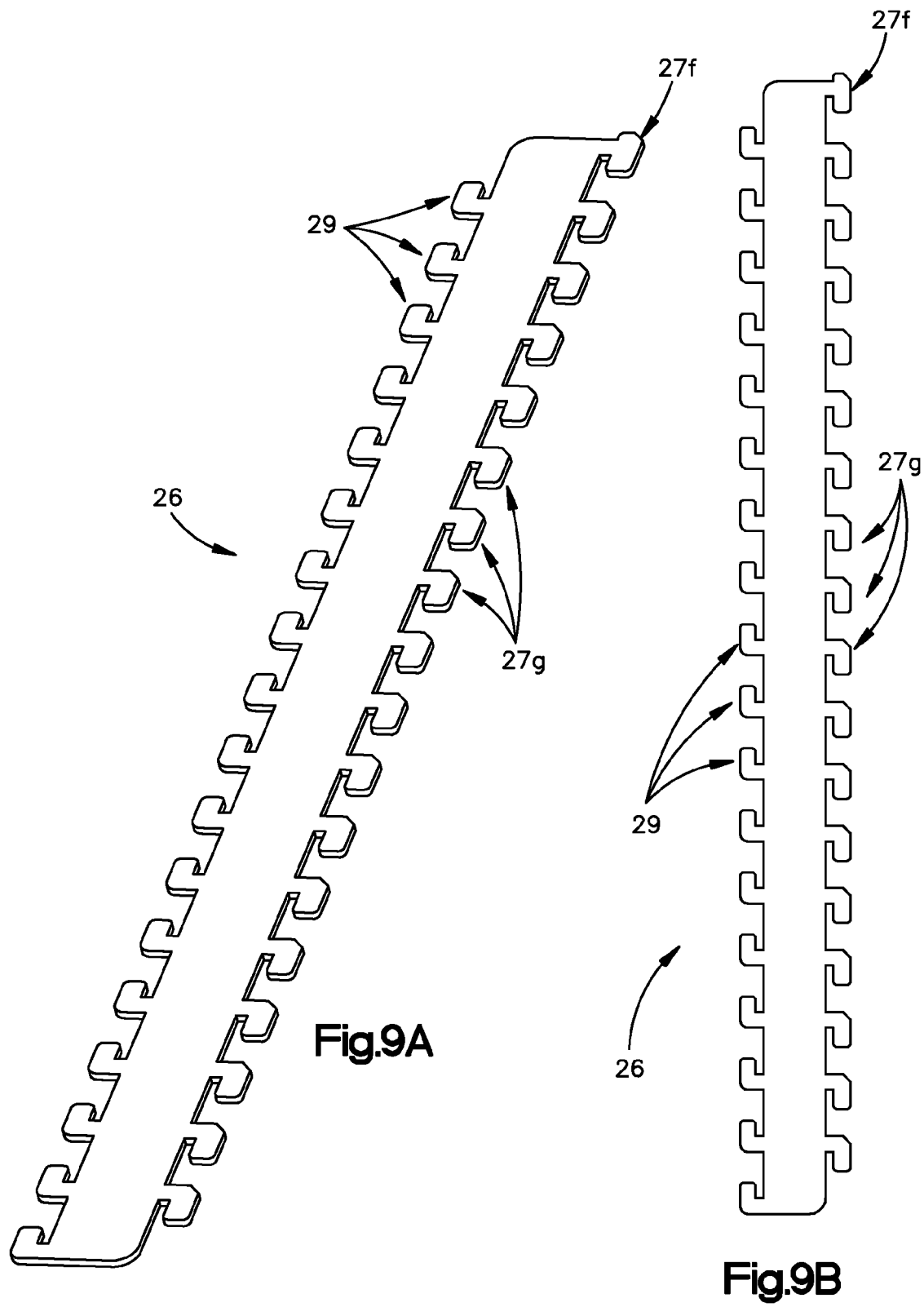

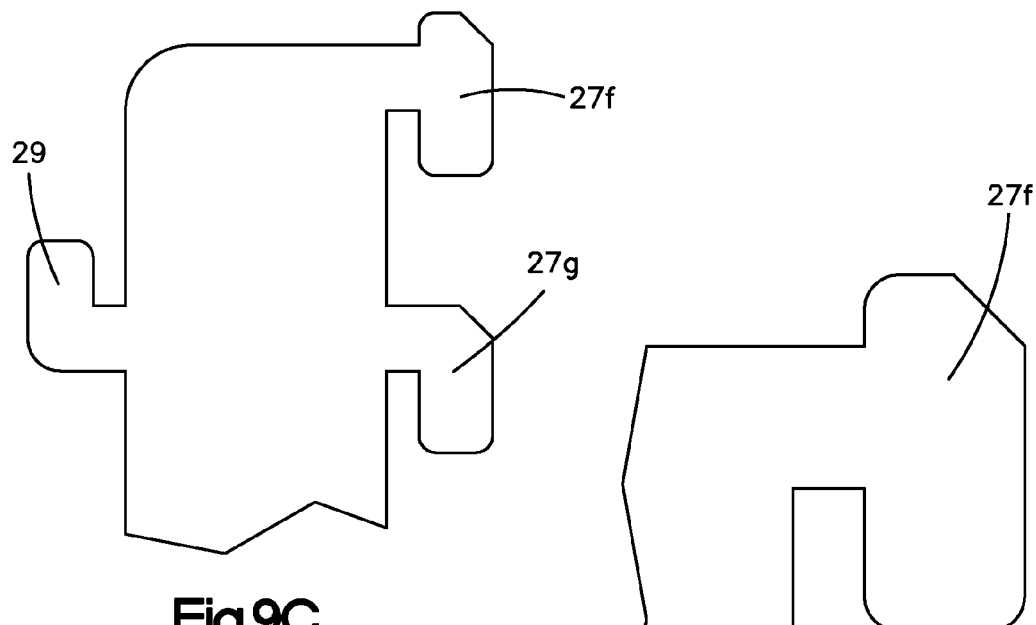
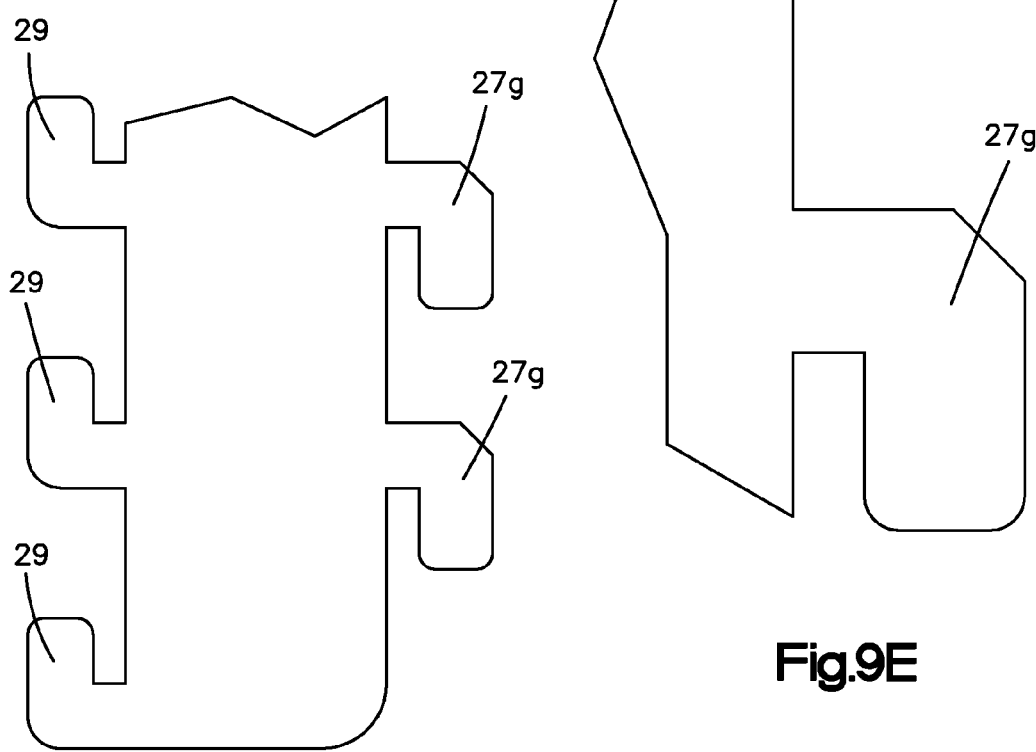
Fig.9C
Fig.9D
Fig.9E

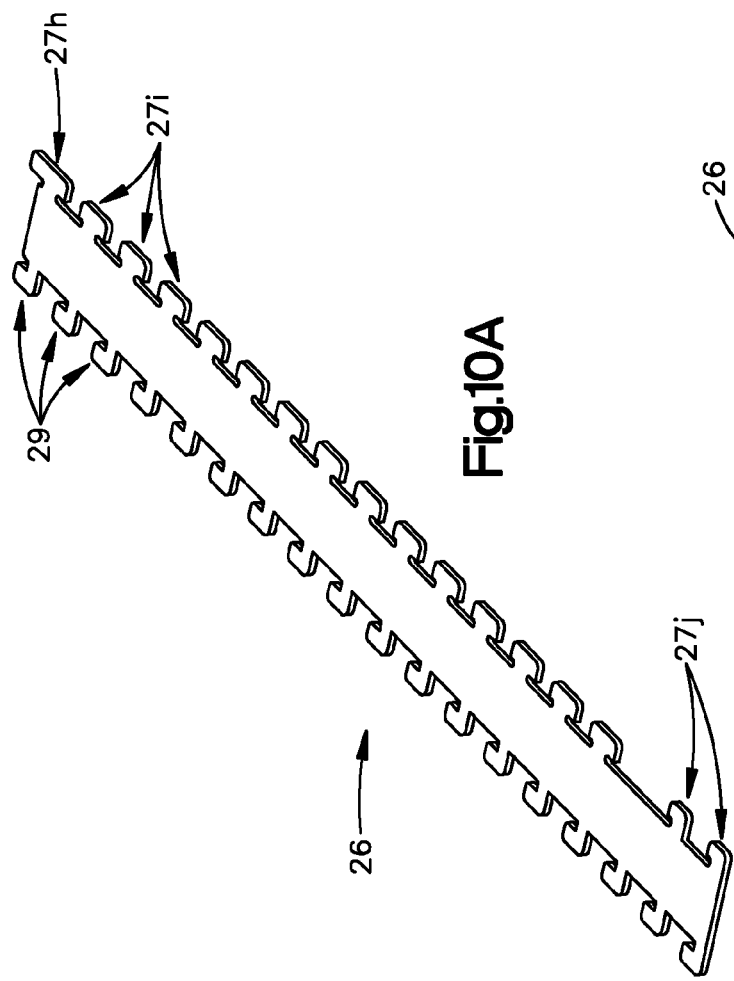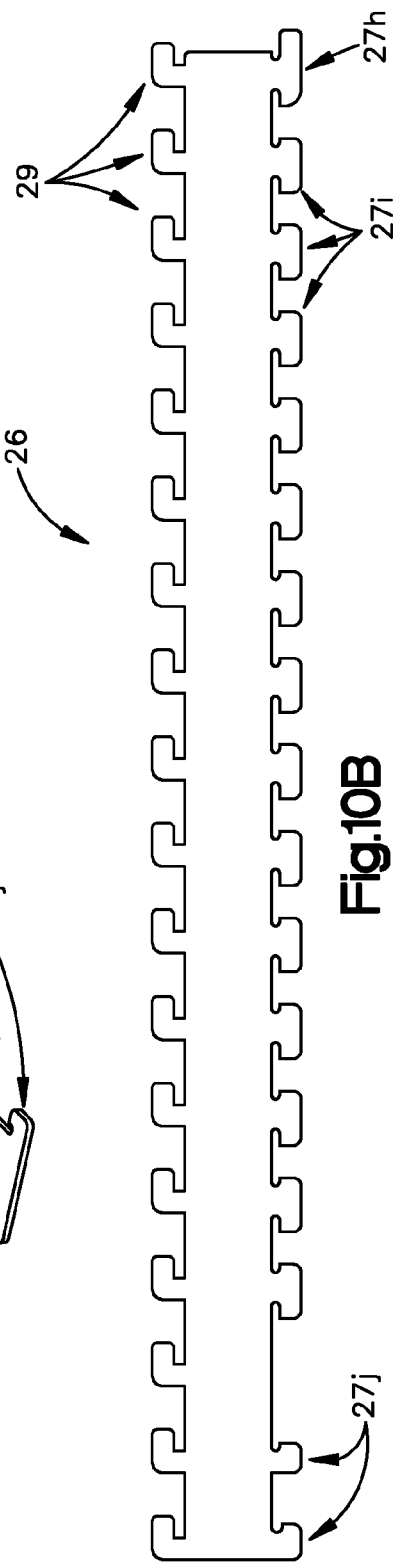

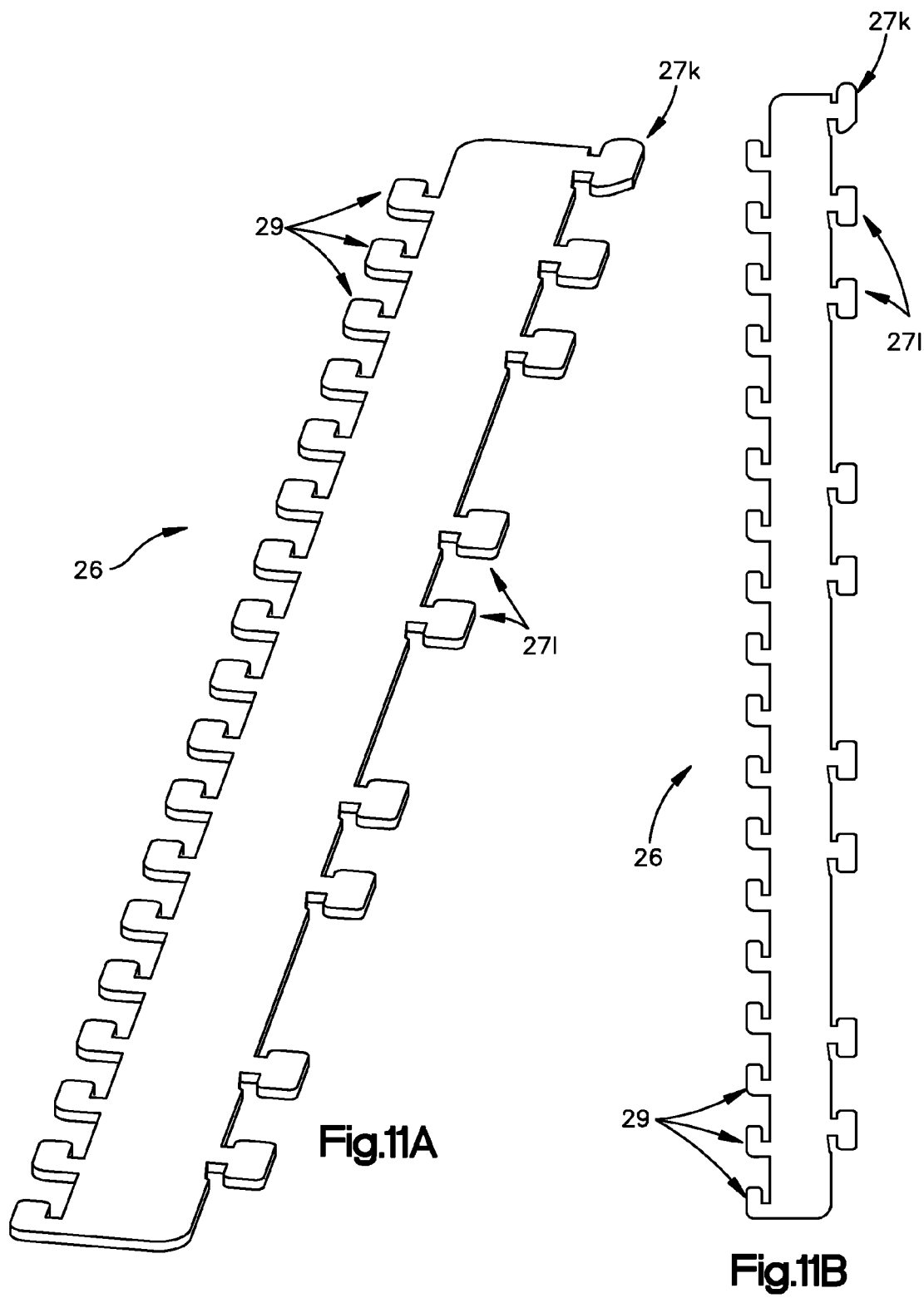

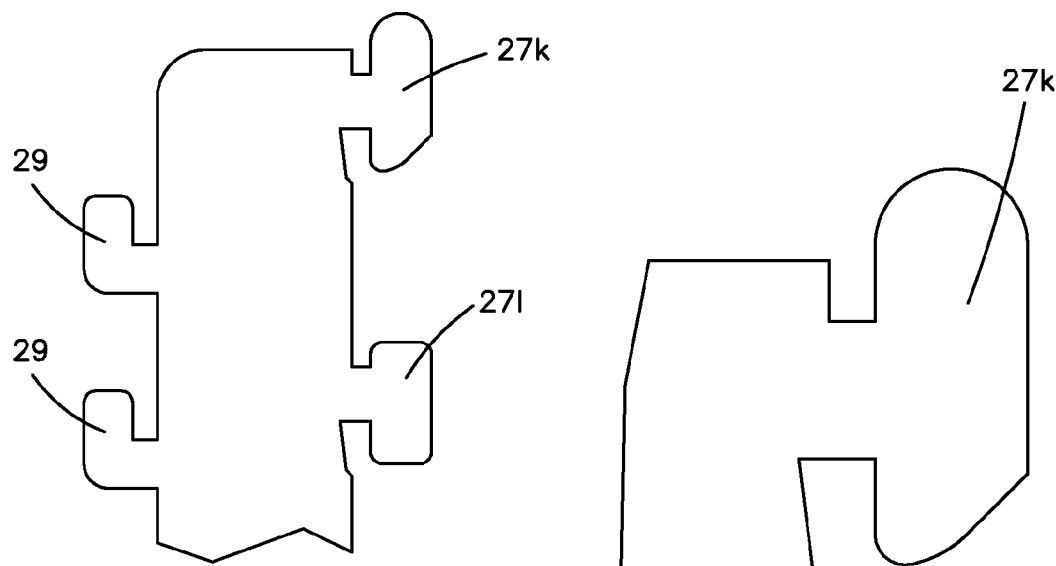
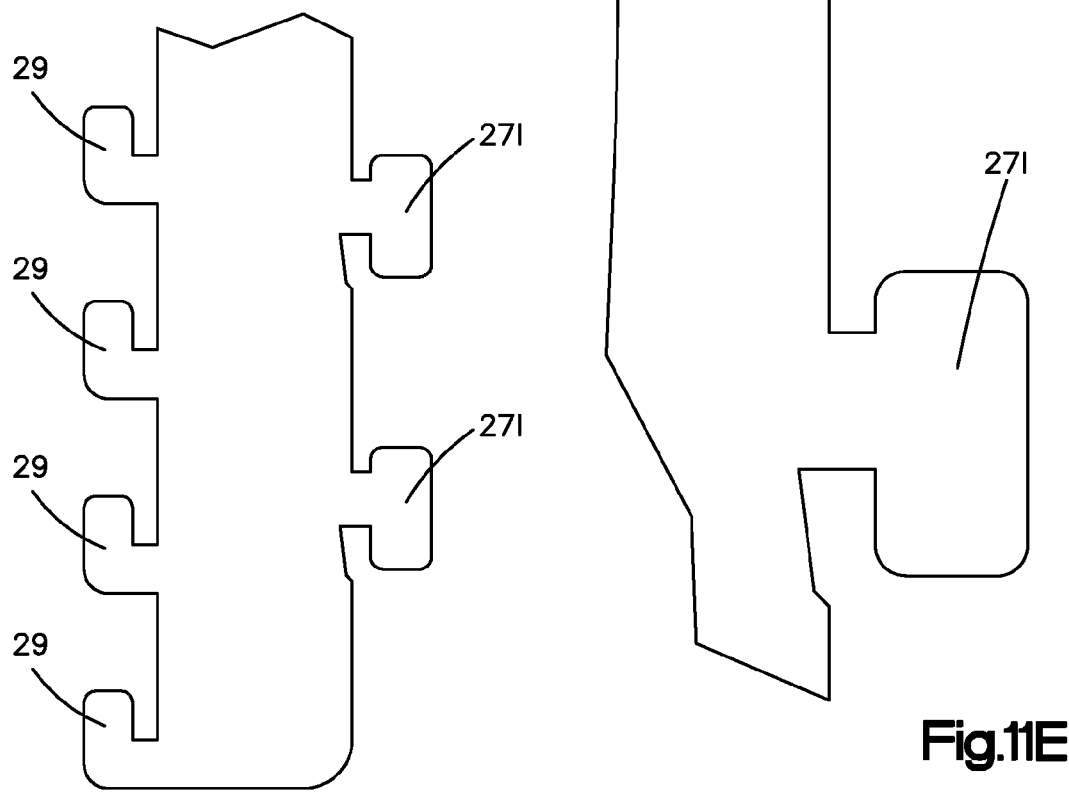

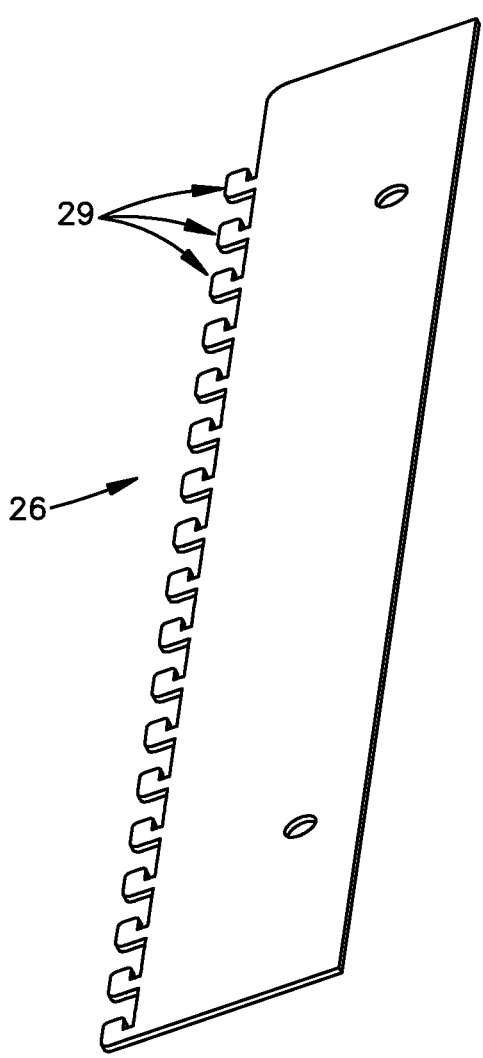
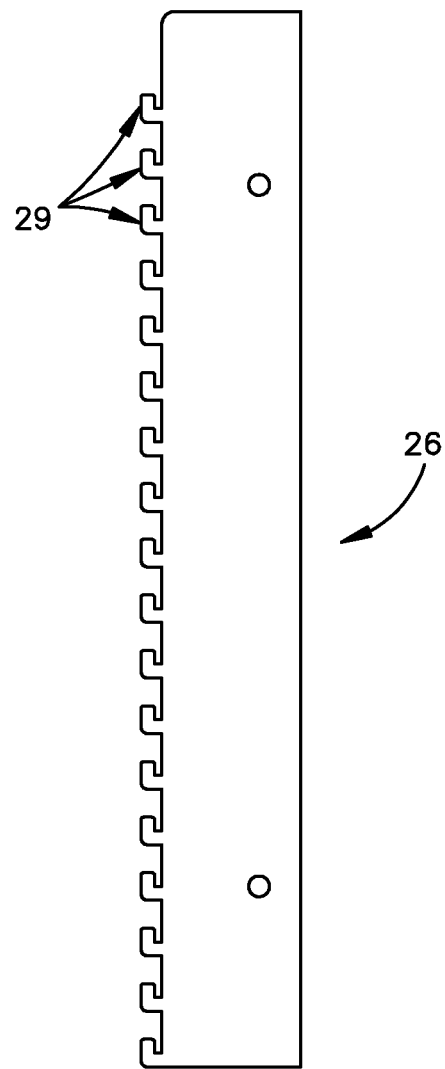
Fig.12A
Fig.12B
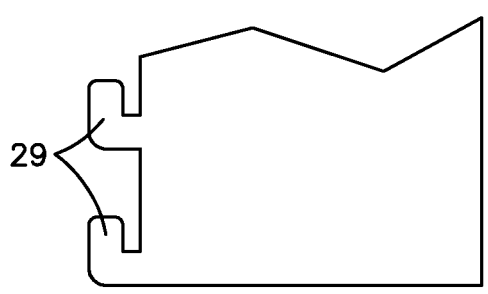
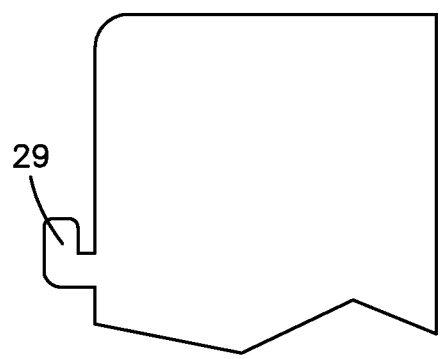
Fig.12C
Fig.12D

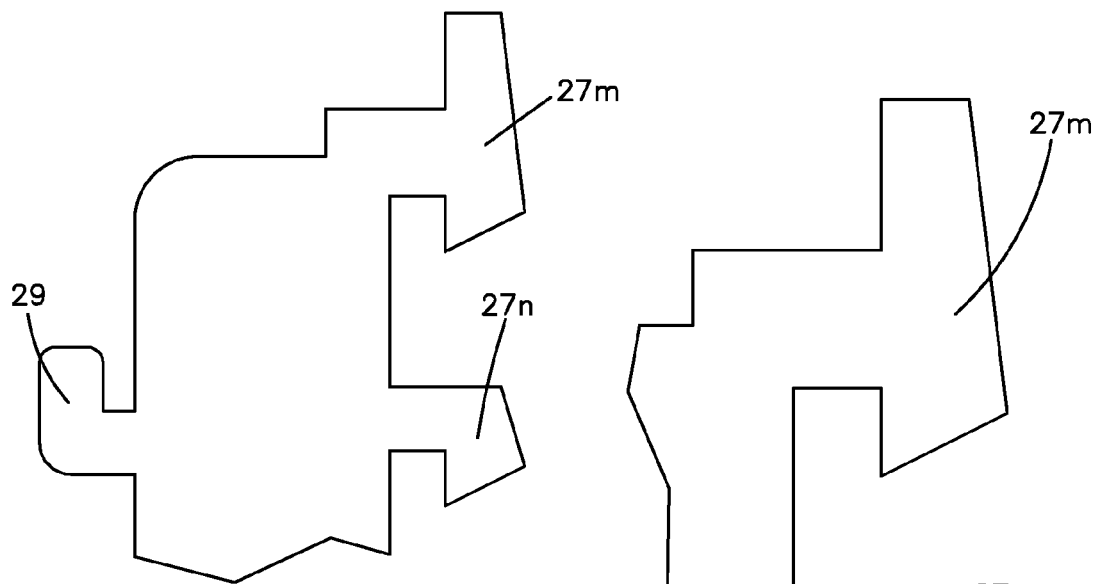
Fig.13C
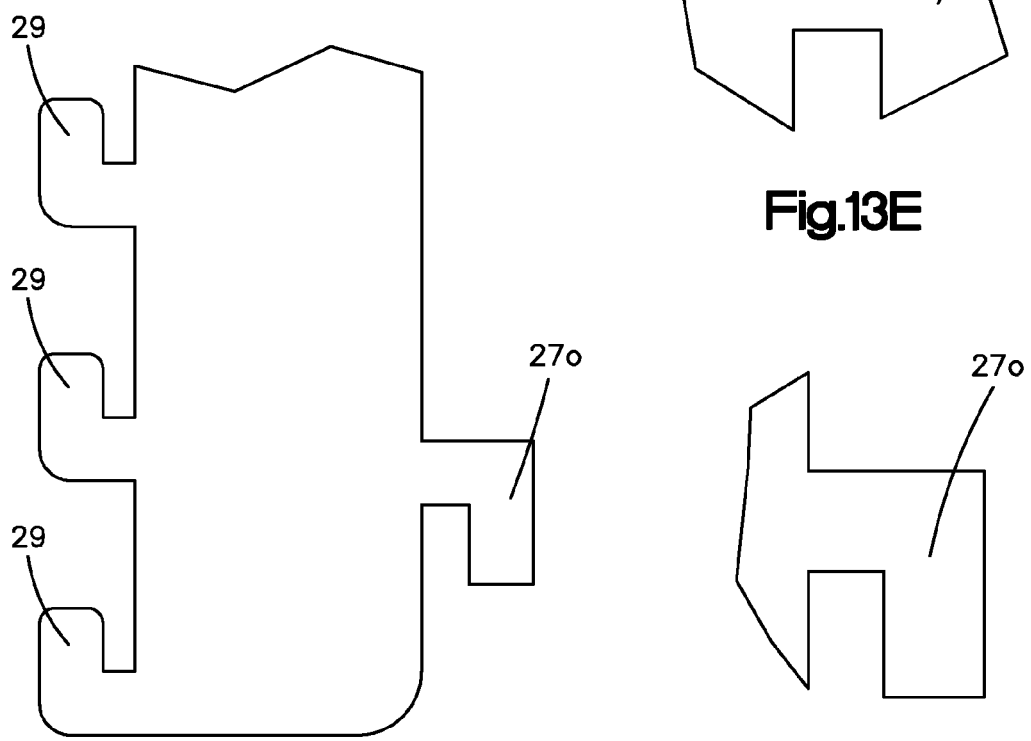
Fig.13D
Fig.13E
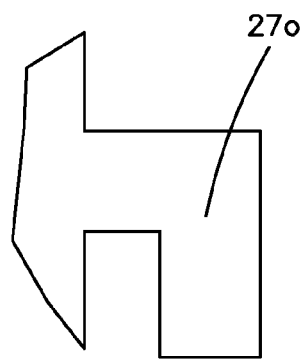
Fig.13F

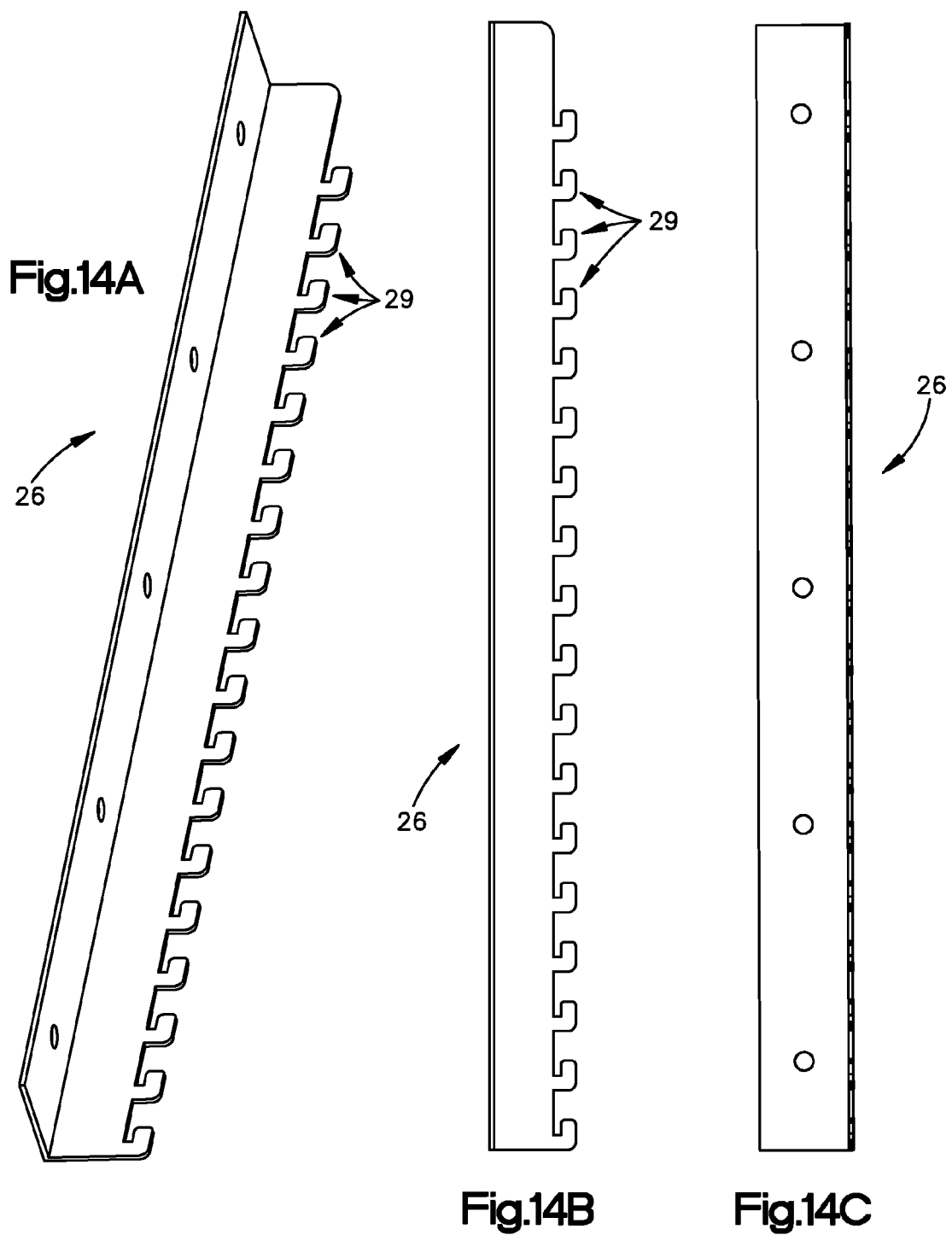

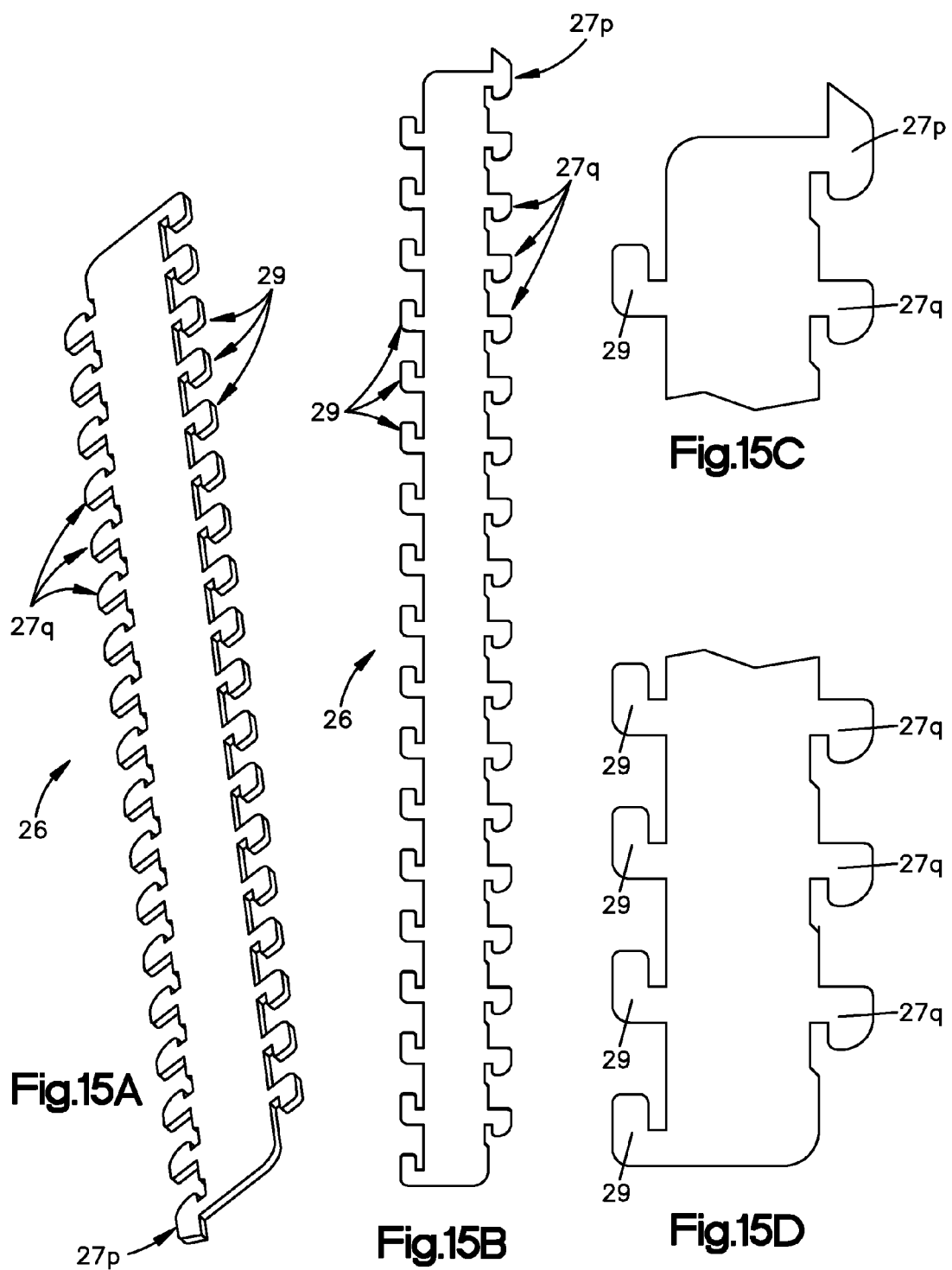

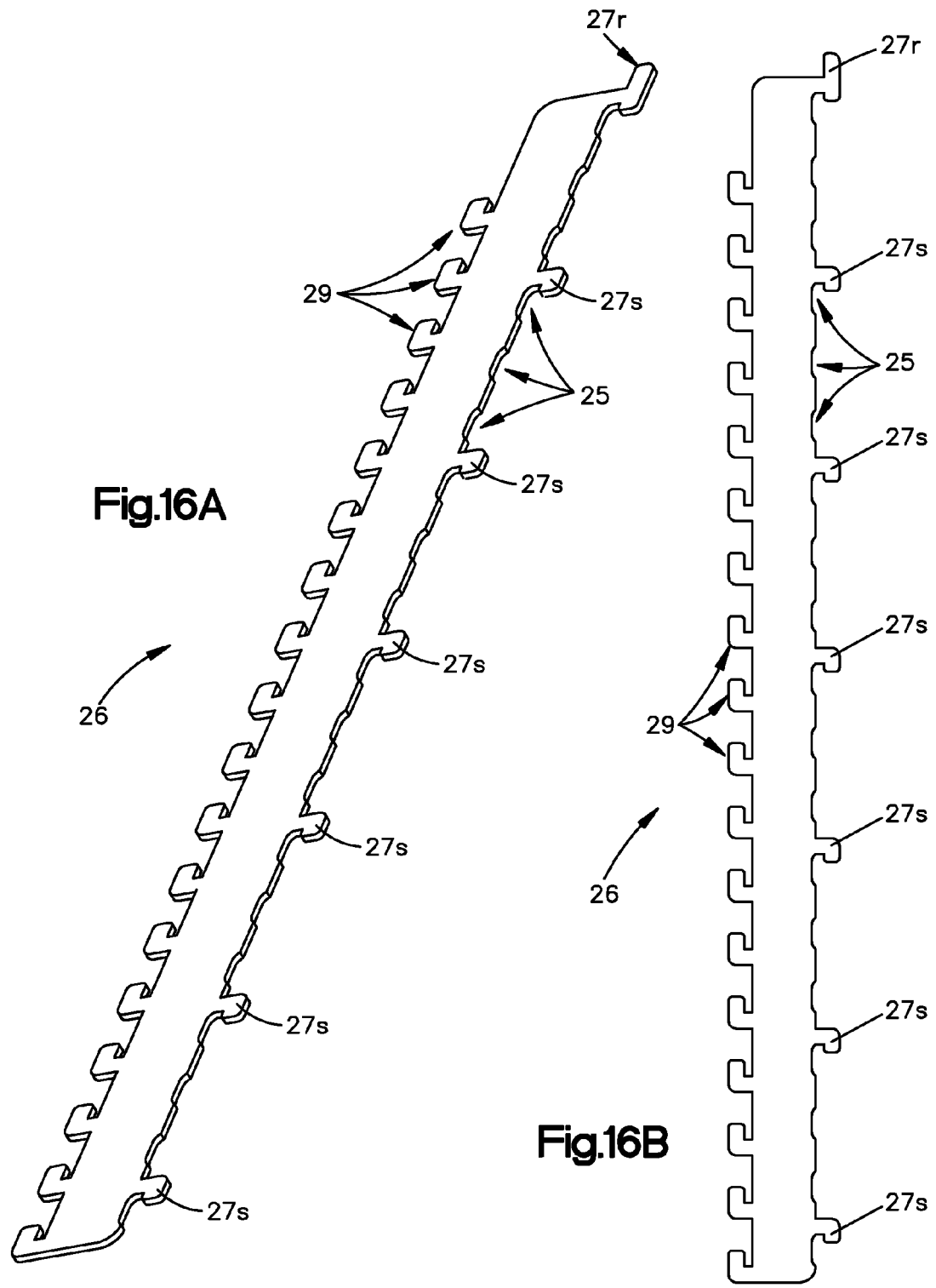

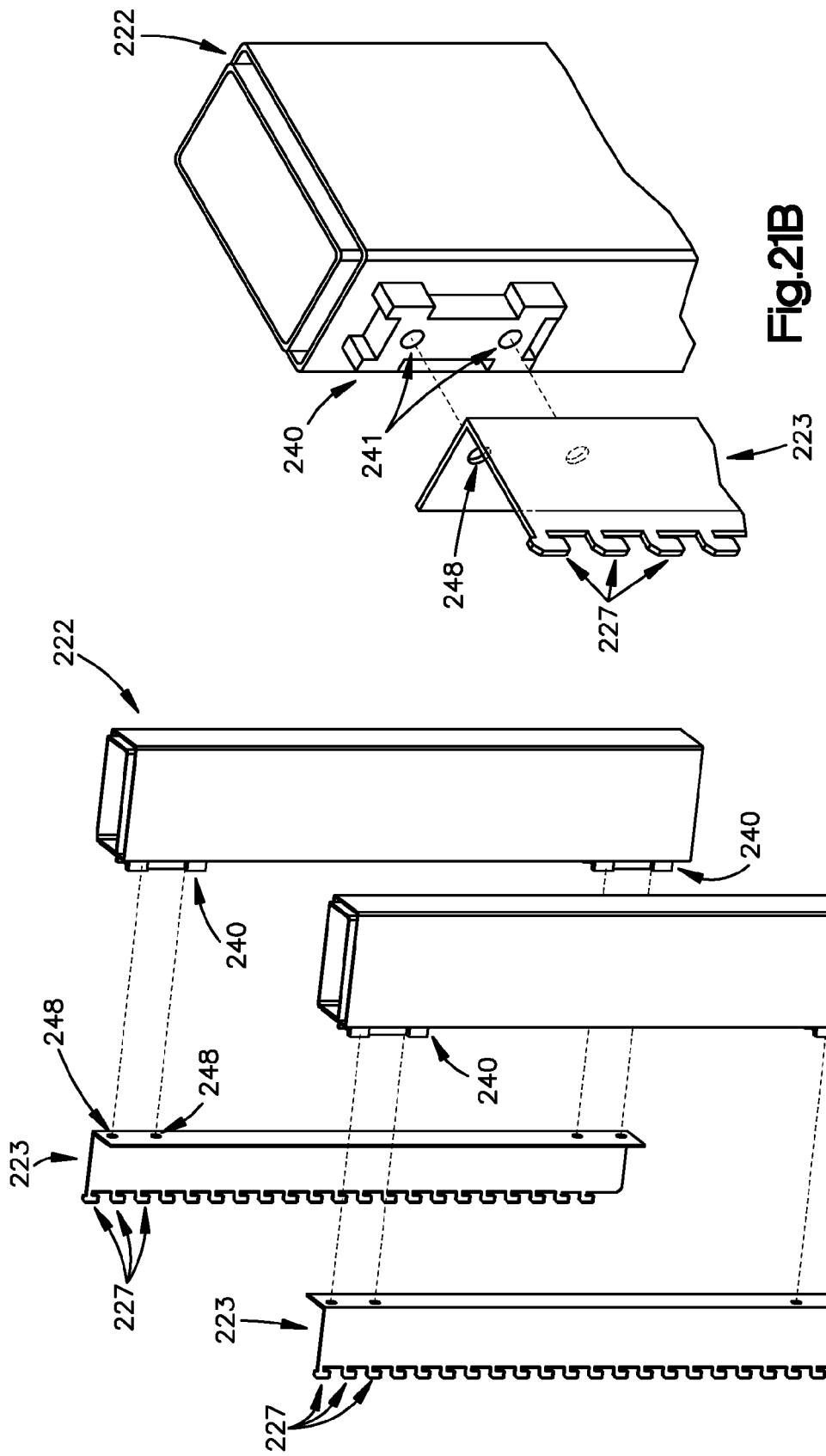

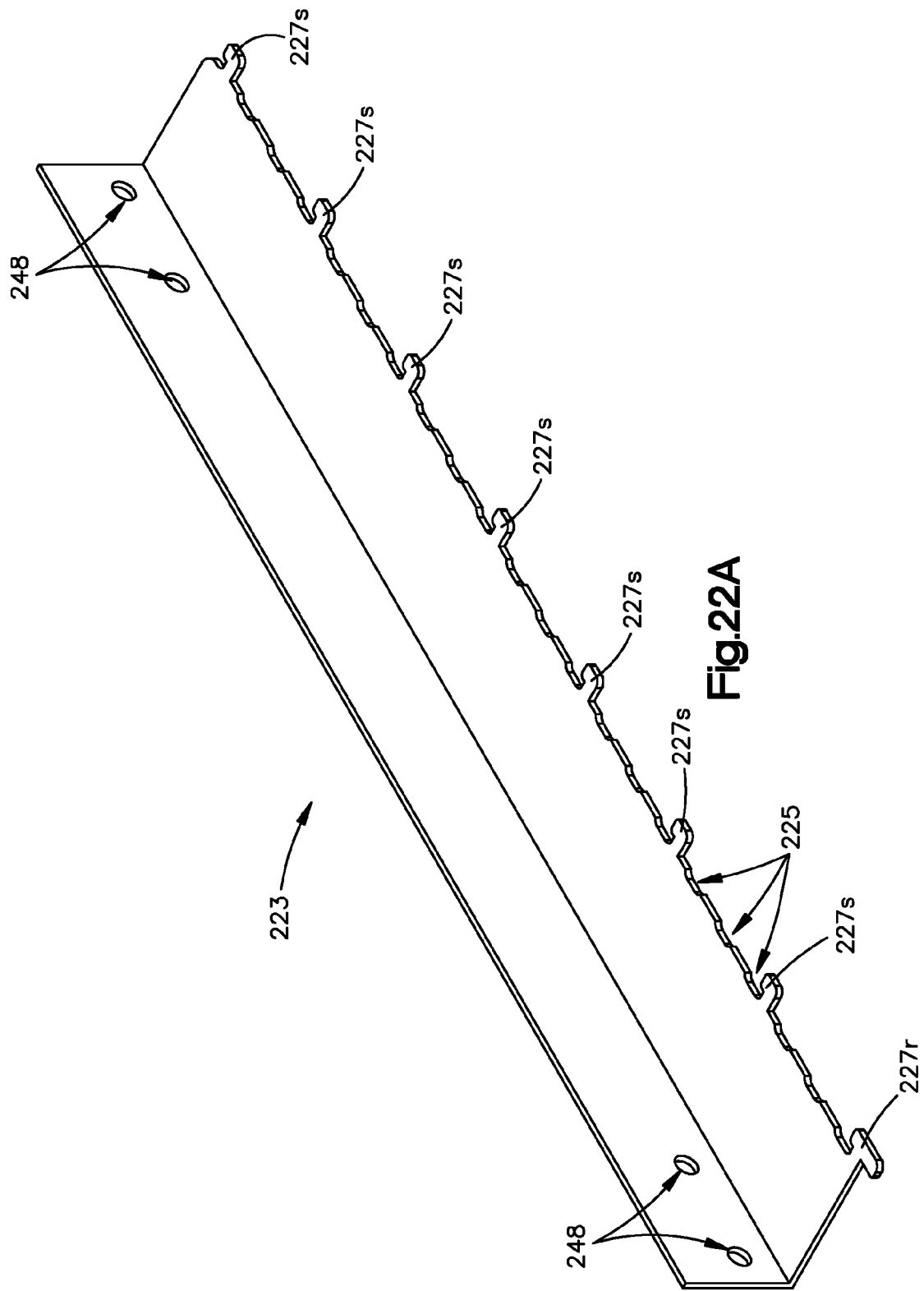

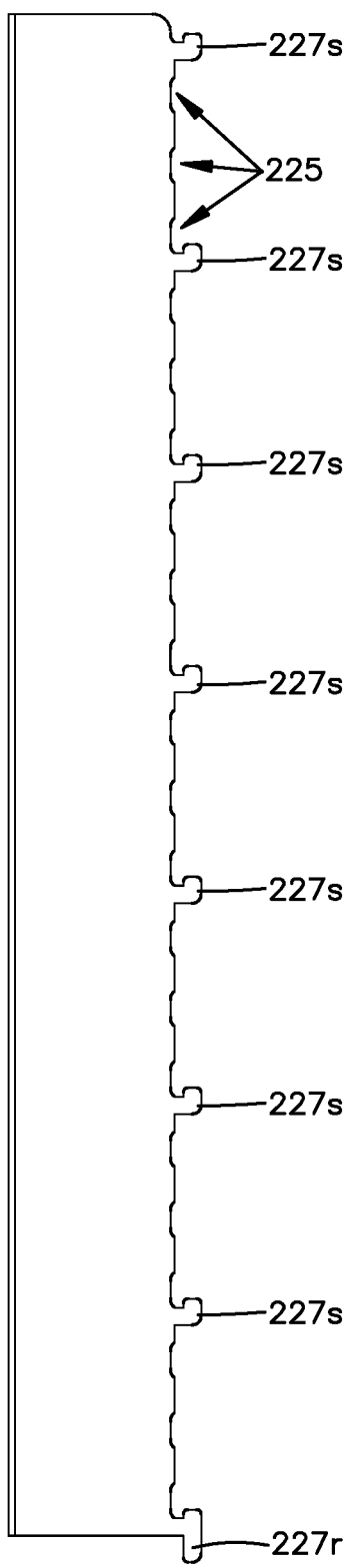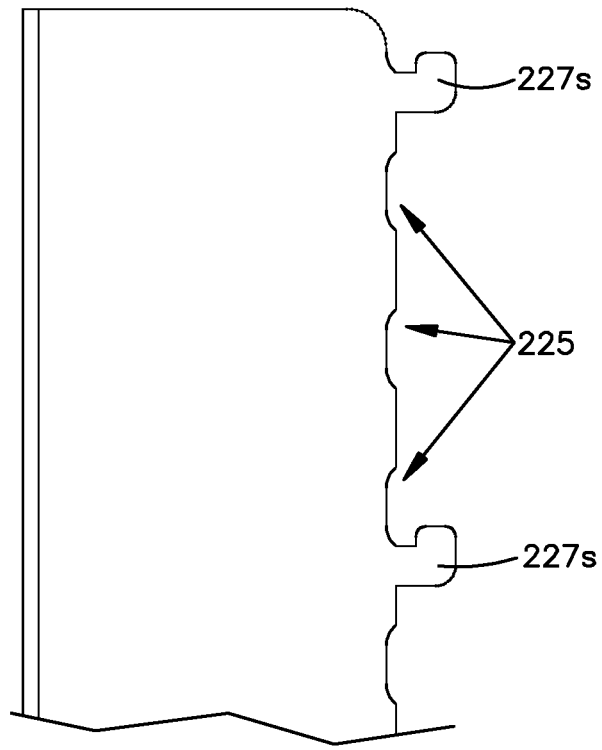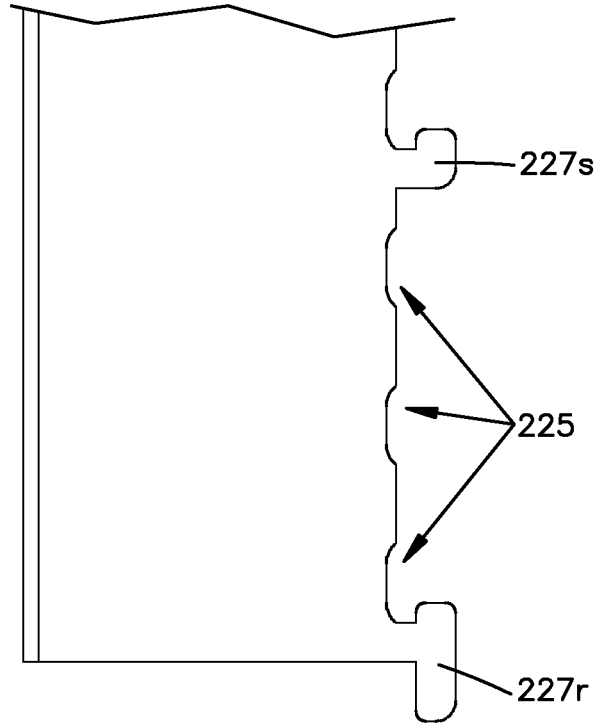
Fig.22B
Fig.22C
Fig.22D

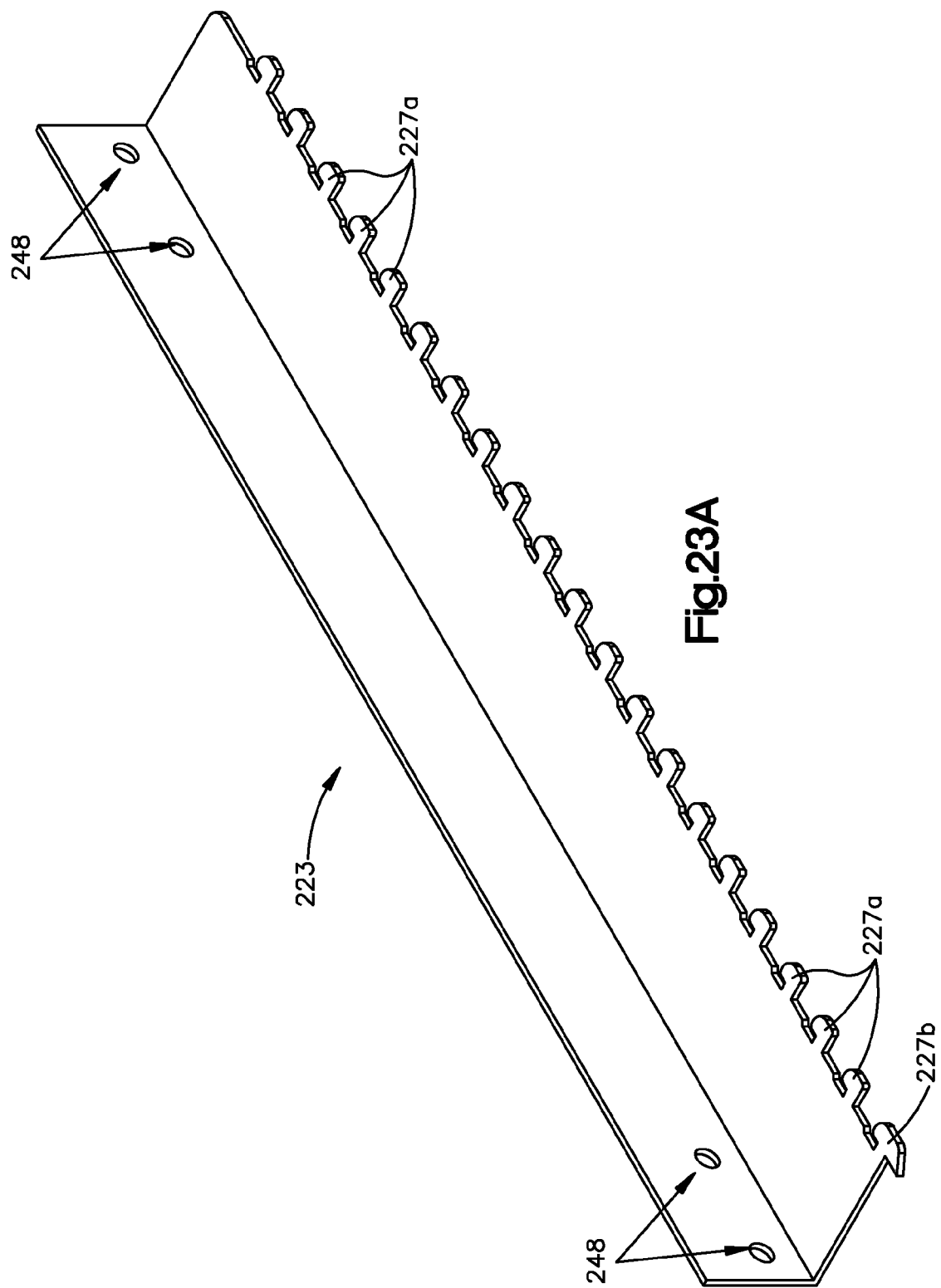

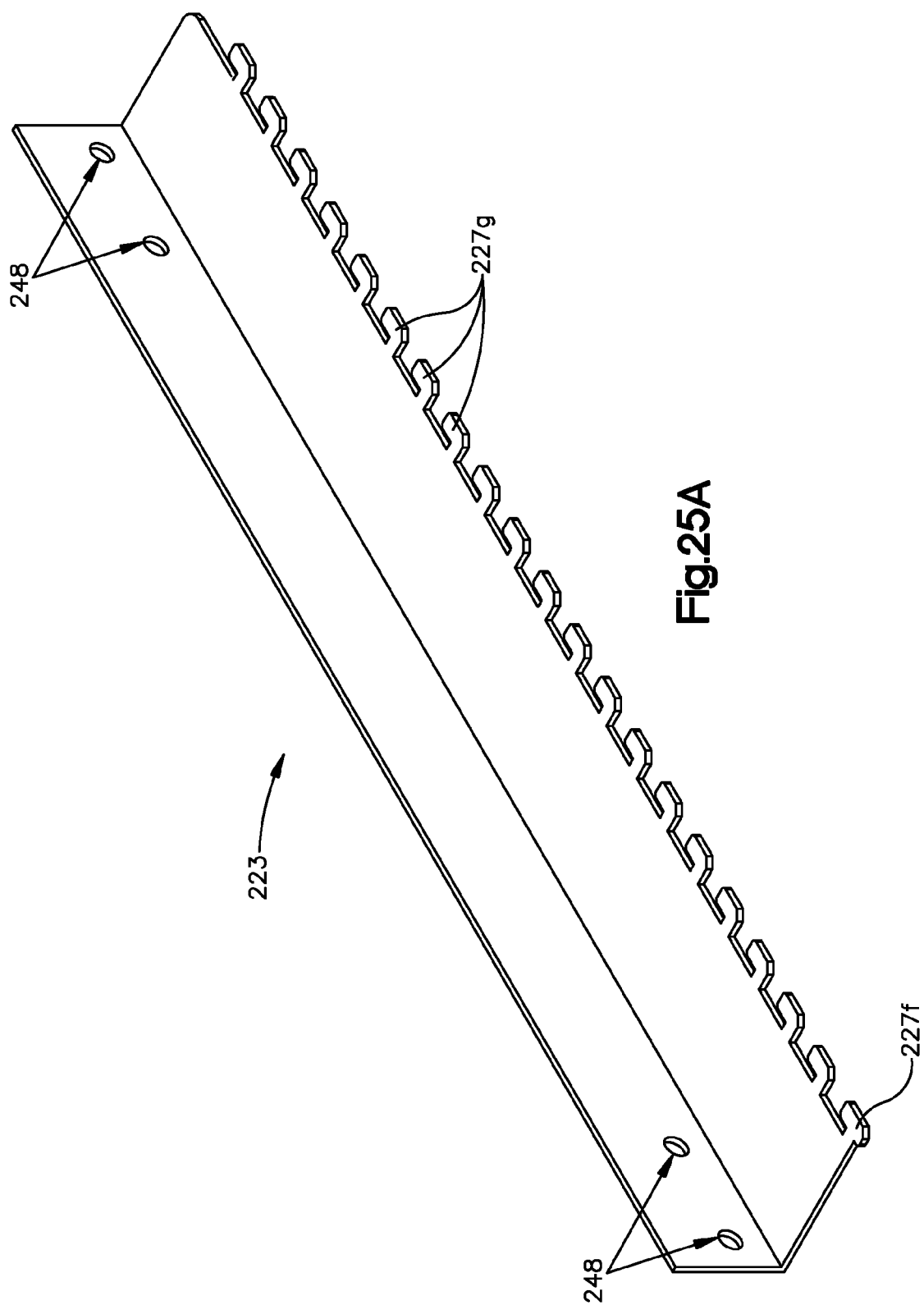

227f

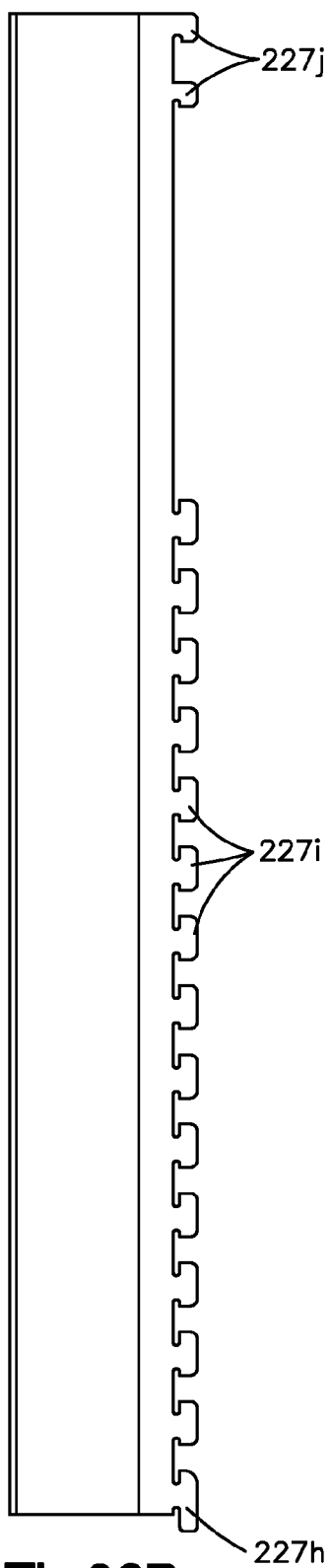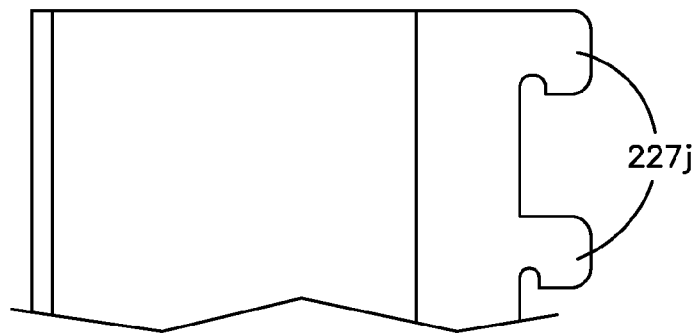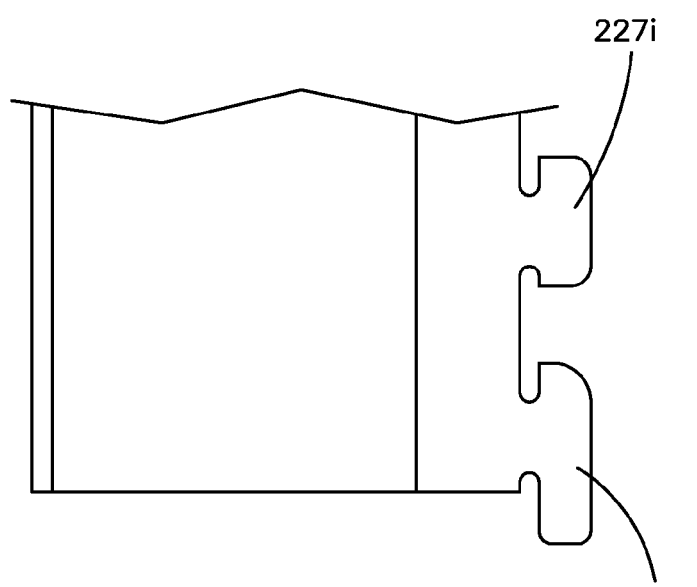
Fig.26B
Fig.26C
Fig.26D

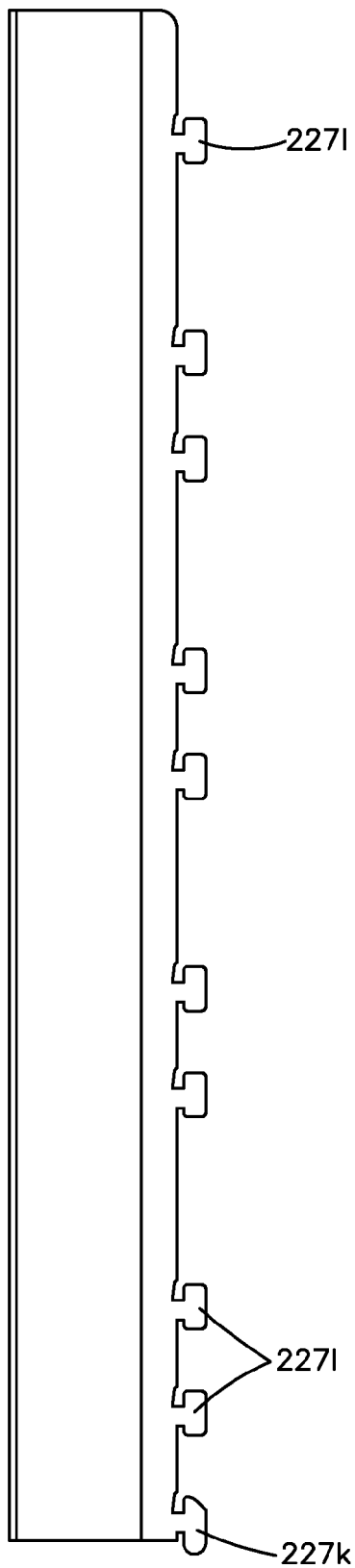
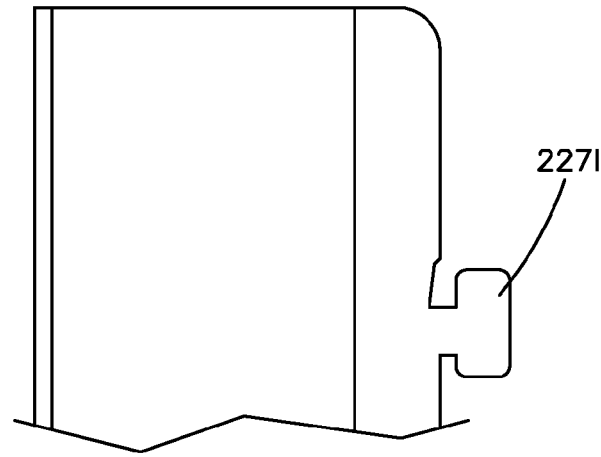
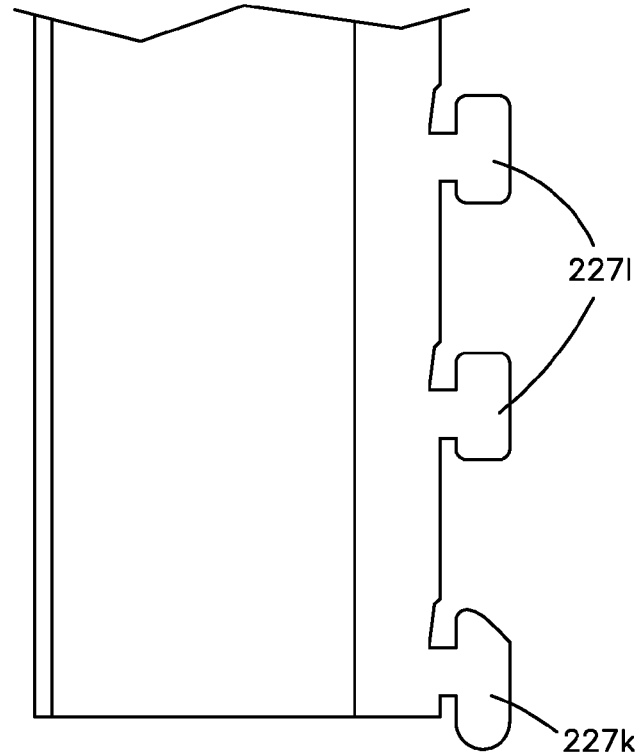
Fig.27B
Fig.27C
Fig.27D

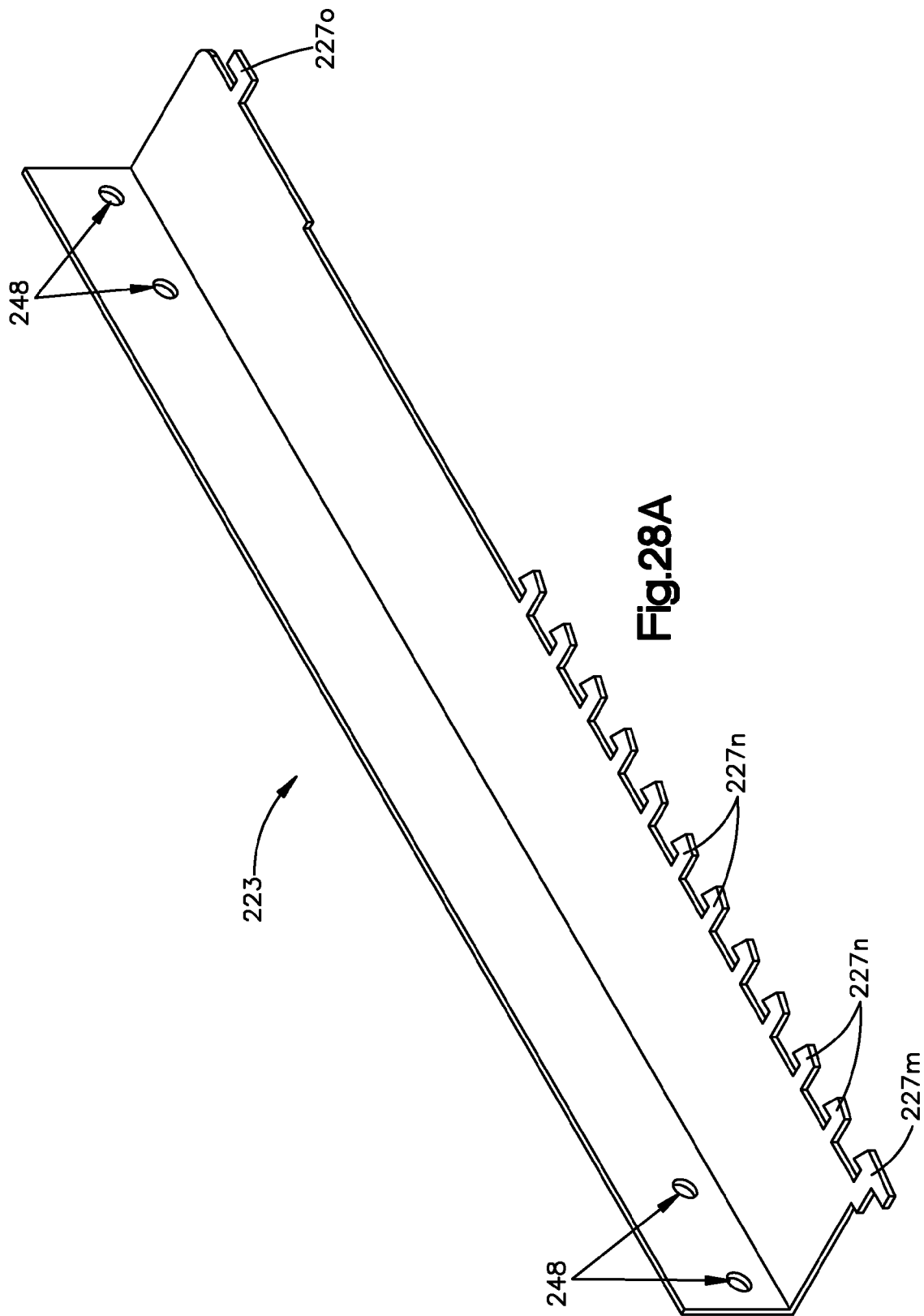

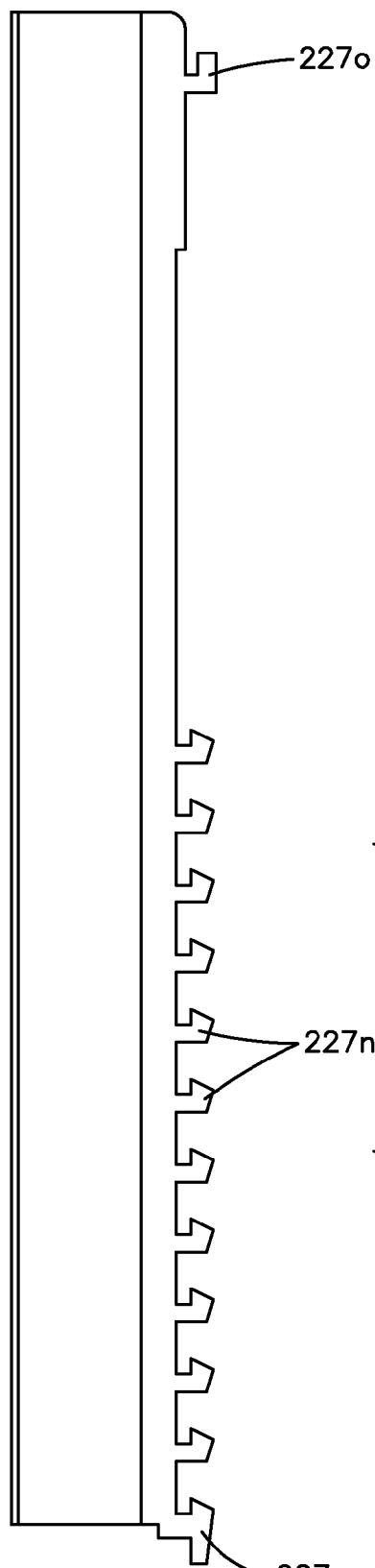
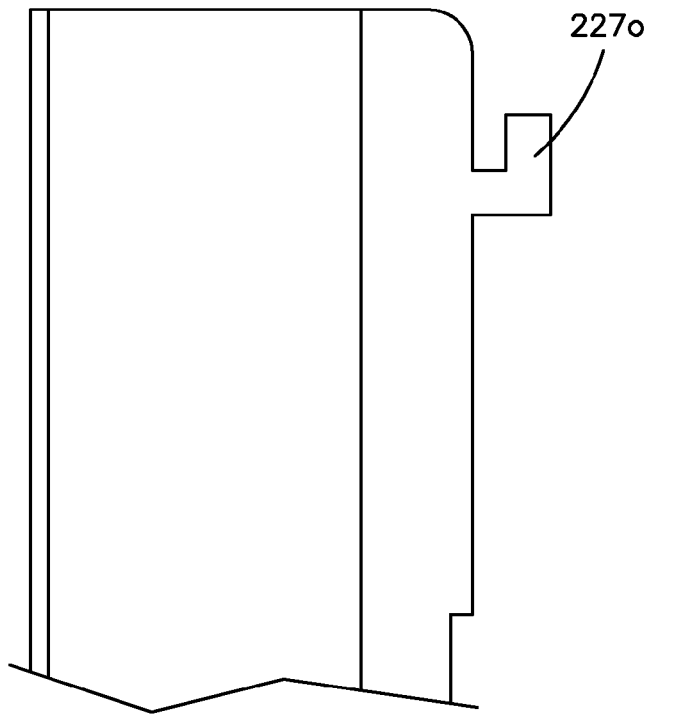
Fig.28C
Fig.28B
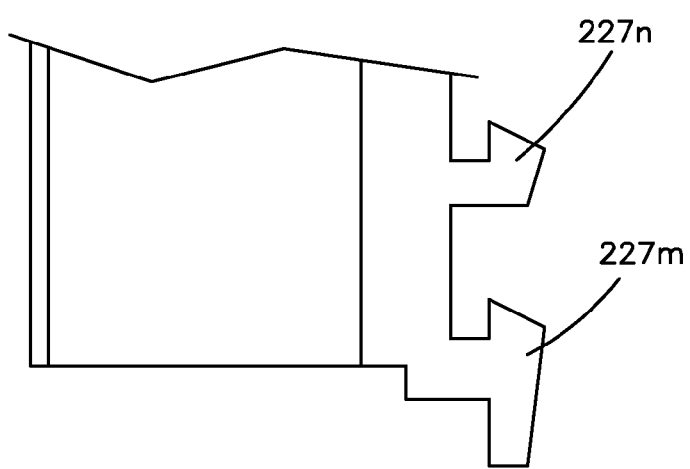
Fig.28D

# UNIVERSALLY MOUNTED WORK SURFACE HEIGHT ADJUSTOR WITH SUCTION CUPS

CROSS-REFERENCE TO RELATED APPLICATIONS

This application claims the priority of U.S. application Ser. No. 14/570,250, filed on Dec. 15, 2014, which is pending and claims the priority of U.S. application Ser. No. 14/247,511, filed on Apr. 8, 2014 and issued as U.S. Pat. No. 8,919,264. The prior applications are herein incorporated by reference for all purposes in their entirety.

GOVERNMENT LICENSE RIGHTS

This invention was not made with government funding or support.

FIELD OF THE INVENTION

Embodiments of the present invention relate generally to an apparatus for adjusting one or more adjustable elements of a linear, horizontal surface. More particularly, the embodiments of the present invention are directed to an apparatus for adjusting the height of a horizontal surface, such as a desktop.

BACKGROUND OF THE INVENTION

Adjustable height work surfaces such as adjustable height desktops are known. Such adjustable height work surfaces can accommodate individual user preferences for desktop height in order to maximize ergonomic efficiency and comfort within an office environment.

Further, there is a trend toward working while standing. This is believed to have a number of health benefits and can increase comfort, particularly for individuals who find it difficult to sit for extended periods of time. Some individuals prefer to stand at the desk all or most of the time, whereas other individuals prefer to alternate standing and sitting at the desk. This trend thus increases the need for work surface height adjusting mechanisms which can be actuated quickly and conveniently by the end user, without the use of tools.

Office furniture manufacturers have responded to this trend by offering motorized desk height adjustment as an option available with the manufacturer's own brand of desks and modular office furniture. However, this is often expensive, and the availability of such an option for new furniture does not address the needs of millions of users of existing desks that currently lack convenient, user-friendly height adjustment. Also, retrofitting existing desks for height adjustment presents significant challenges, because of a lack of standards for interconnection of modular office equipment. In general, each manufacturer has its own system of interconnecting modules and accessories.

What is needed is a convenient, inexpensive, and universally applicable apparatus for adding an automatic height adjustment capability to desktops and other work surfaces.

SUMMARY OF THE INVENTION

In accordance with the present invention, the problem of providing an inexpensive, convenient, and universal work surface height adjustor that works with many existing furniture models is solved by providing as part of the inventive height adjustor an adapter bracket especially designed for compatibility with the particular model of furniture for which work surface height adjustment is desired. Further, other embodiments of the height adjustor apparatus are designed to similarly connect to a wall or other convenient fixed surface.

In a preferred embodiment of the present invention, the adapter bracket has two sides, one for interconnection to the furniture (or wall, or other fixed surface) and the other side for interconnection to a telescoping tube assembly that raises or lowers the work surface by means of an electric linear actuator. When connecting to furniture, an adapter bracket is chosen that includes, on the furniture side, various adapter elements, the precise shape and spacing of which are specifically designed to fit corresponding slots in the furniture. When connecting to a wall or other fixed element, an adapter bracket is chosen that has suitable holes for the insertion of fasteners, such as screws, wall anchors, or the like.

The described adjustor can also be adapted to adjust a restaurant table, or a hospital bed, or other adjustable items such as, e.g., an assembly line or a server rack.

BRIEF DESCRIPTION OF THE DRAWINGS

FIG. 1B shows a horizontal work surface mounted to a height adjustor according to an embodiment of the present invention, in a lowered position.

FIG. 1C shows a height adjustor according to an embodiment of the present invention, extended to a raised position.

FIG. 2 shows a height adjustor according to an embodiment of the present invention, assembled and ready for mounting on a frame.

FIG. 3 is a partly exploded view of a height adjustor according to an embodiment of the present invention, depicting a telescoping tubing, an adapter bracket, and a cantilever.

FIG. 7A depicts a perspective view of an embodiment of an adapter bracket according to the present invention for use with, e.g., All Steel furniture.

FIG. 7B depicts a top view of the embodiment of FIG. 7A.

FIG. 7C depicts details of adapters of the embodiment of FIG. 7A.

FIG. 7D depicts details of other adapters of the embodiment of FIG. 7A.

FIG. 7E is an enlarged view of a left-side adapter of the embodiment of FIG. 7A.

FIG. 7F is an enlarged view of a right-side adapter of the embodiment of FIG. 7A.

FIG. 7G is an enlarged view of a top right-side adapter of the embodiment of FIG. 7A.

FIG. 8A depicts a perspective view of an embodiment of an adapter bracket according to the present invention for use with, e.g., AO furniture.

FIG. 8B depicts a top view of the embodiment of FIG. 8A.

FIG. 8C depicts details of adapters of the embodiment of FIG. 8A.

FIG. 8D depicts details of other adapters of the embodiment of FIG. 8A.

FIG. 9A depicts a perspective view of an embodiment of an adapter bracket according to the present invention for use with, e.g. Compatico furniture.

FIG. 9B depicts a top view of the embodiment of FIG. 9A.

FIG. 9C depicts details of adapters of the embodiment of FIG. 9A.

FIG. 9D depicts details of other adapters of the embodiment of FIG. 9A.

FIG. 9E is an enlarged view of certain adapters of the embodiment of FIG. 9A.

FIG. 10A depicts a perspective view of an embodiment of an adapter bracket according to the present invention for use with, e.g., Ethos Space furniture.

FIG. 10B depicts a top view of the embodiment of FIG. 10A.

FIG. 11A depicts a perspective view of an embodiment of an adapter bracket according to the present invention for use with, e.g., Knoll Dividends furniture.

FIG. 11B depicts a top view of the embodiment of FIG. 11A.

FIG. 11C depicts details of adapters of the embodiment of FIG. 11A.

FIG. 11D depicts details of other adapters of the embodiment of FIG. 11A.

FIG. 11E is an enlarged view of certain adapters of the embodiment of FIG. 11A.

FIG. 12A depicts a perspective view of an embodiment of an adapter bracket according to the present invention for use with, e.g., side mounting.

FIG. 12B depicts a top view of the embodiment of FIG. 12A.

FIG. 12C depicts details of adapters of the embodiment of FIG. 12A.

FIG. 12D depicts details of other adapters of the embodiment of FIG. 12A.

FIG. 13C depicts details of adapters of the embodiment of FIG. 13A.

FIG. 13D depicts details of other adapters of the embodiment of FIG. 13A.

FIG. 13E is an enlarged view of certain adapters of the embodiment of FIG. 13A.

FIG. 13F is an enlarged view of an adapter of the embodiment of FIG. 13A.

FIG. 14A depicts a perspective view of an embodiment of an adapter bracket according to the present invention for use with, e.g., wall mounting.

FIG. 14B depicts a top view of the embodiment of FIG. 14A.

FIG. 14C depicts a side view of the embodiment of FIG. 14A.

FIG. 15A depicts a perspective view of an embodiment of an adapter bracket according to the present invention for use with, e.g., Techion furniture.

FIG. 15B depicts a top view of the embodiment of FIG. 15A.

FIG. 15C depicts details of adapters of the embodiment of FIG. 15A.

FIG. 15D depicts details of other adapters of the embodiment of FIG. 15A.

FIG. 16A depicts a perspective view of an embodiment of a universal adapter bracket according to the present invention.

FIG. 16B depicts a top view of the embodiment of FIG. 16A.

FIG. 21A is a partly exploded view of a height adjustor according to an embodiment of the present invention, depicting telescoping tubing, angle brackets, and connecting plates.

FIG. 21B is a detailed view depicting the alignment of screw holes in an angle bracket with corresponding holes in a connecting plate.

FIG. 22A depicts a perspective view of an embodiment of a universal angle bracket according to the present invention.

FIG. 22B depicts the adapter side of the embodiment of FIG. 22A.

FIG. 22C depicts details of adapters of the embodiment of FIG. 22A.

FIG. 22D depicts details of other adapters of the embodiment of FIG. 22A.

FIG. 23A depicts a perspective view of a embodiment of an angle bracket according to the present invention for use with, e.g., All Steel furniture.

FIG. 25A depicts a perspective view of an embodiment of an angle bracket according to the present invention for use with, e.g, Compatico furniture.

FIG. 26B depicts the adapter side of the embodiment of FIG. 26A.

FIG. 26C depicts details of adapters of the embodiment of FIG. 26A.

FIG. 26D depicts details of other adapters of the embodiment of FIG. 26A.

FIG. 27B depicts the adapter side of the embodiment of FIG. 27A.

FIG. 27C depicts details of an adapter of the embodiment of FIG. 27A.

FIG. 27D depicts details of other adapters of the embodiment of FIG. 27A.

FIG. 28A depicts a perspective view of an embodiment of an angle bracket according to the present invention for use with, e.g., Steel Case furniture.

FIG. 28B depicts the adapter side of the embodiment of FIG. 28A.

FIG. 28C depicts details of an adapter of the embodiment of FIG. 28A.

FIG. 28D depicts details of other adapters of the embodiment of FIG. 28D.

FIG. 29C depicts details of adapters of the embodiment of FIG. 29A.

FIG. 29D depicts details of other adapters of the embodiment of FIG. 29A.

DETAILED DESCRIPTION OF THE INVENTION

In the various figures, the same references denote identical or similar elements.

Figure 1A:
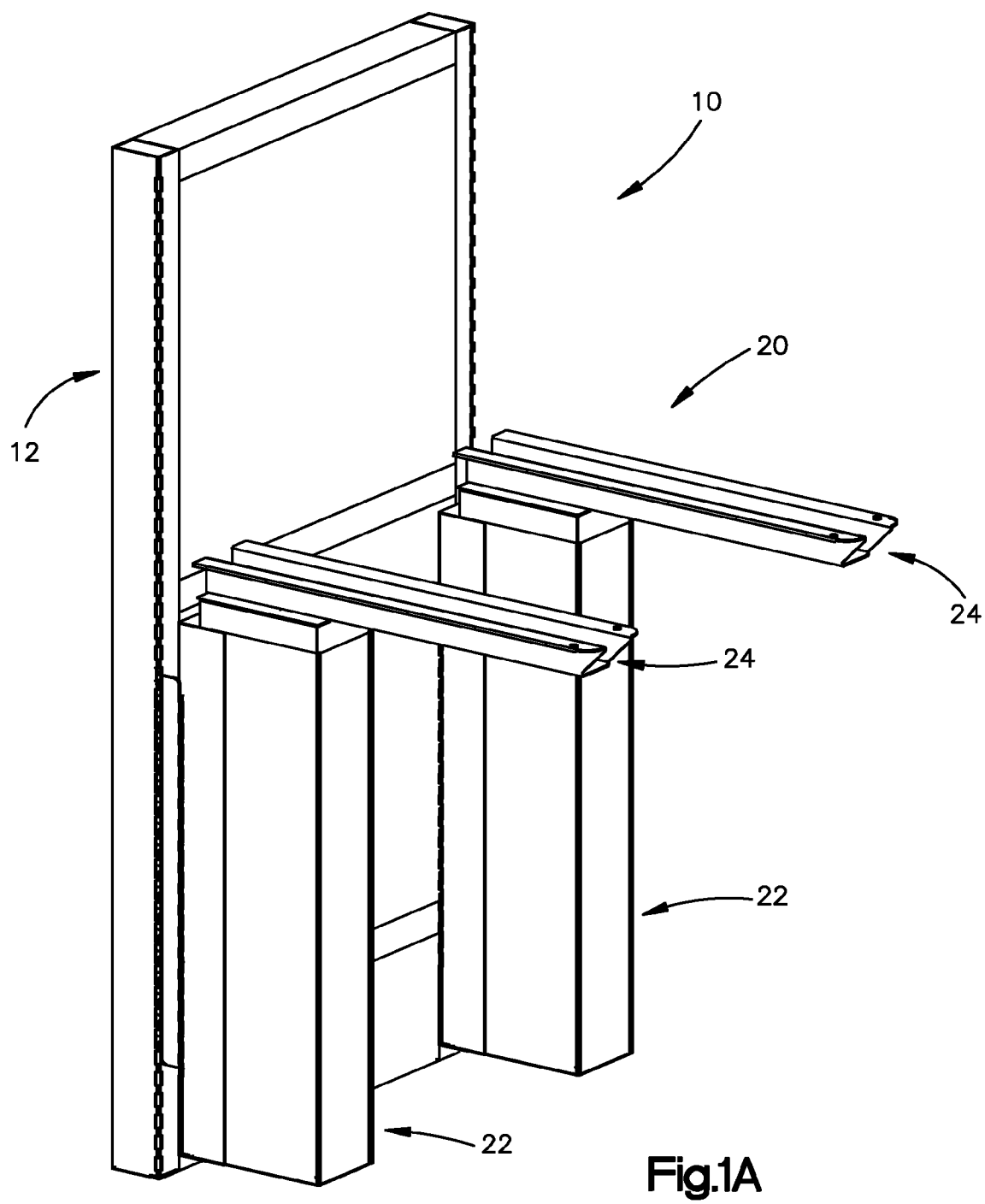
FIG. 1A shows a horizontal surface height adjustor according to an embodiment of the present invention, mounted on a frame.

FIGS. 1A-1C depict an embodiment 20 of the work surface height adjusting apparatus of the present invention, mounted to a frame 12. Frame 12 can be, for example, a panel frame or other component of a modular furniture system or office cubicle system. Frame 12 can be a frame of a desk or work station. Alternatively, rather than being mounted to a frame, work surface adjusting apparatus 20 can be mounted to a wall or other fixed surface, or secured to a footing or to a floor.

In the embodiment shown in FIG. 1B, cantilever elements 24 attach to and support the work surface or desktop. Cantilever elements 24 thus cause the work surface or desktop to be raised or lowered as the inner portions of telescoping tubes (legs) 22 move up or down, respectively. It will be apparent to one skilled in the art that other types of lifting columns or lifting mechanisms can be used to raise and lower the work surface, in addition to telescoping tubes. For example, a screw jack or hydraulic jack can be used. Lifting columns or lifting mechanisms can be manual or power-driven. Cantilever elements 24 may be fastened to the work surface using, preferably, wood screws or sheet metal screws. Preferably, where a previously fixed-height desktop is being retrofitted to an adjustable configuration, these are the same screws previously used to secure the desktop to a fixed element, such as a bracket fixedly attached to the frame or other portion of the desk or furniture system.

In the embodiment shown in FIGS. 1A-1C, there are 2 telescoping tube assemblies 22 (also referred to as "legs"). In another embodiment (not shown), there is a single leg. This might be suitable for use with, e.g., a smaller work surface. In other embodiments, there can be more than 2 legs. For example, there can be 4 legs. When 2 or more telescoping tube assemblies are used, each preferably has its own linear actuator (discussed below) and these are preferably synchronized through a control unit, so that each lifts or lowers the work surface by the same amount and at the same rate.

FIG. 1B depicts a work surface mounted on cantilever elements 24 in a lowered position, and FIG. 1C depicts work surface height adjusting apparatus 20 with telescoping tube assemblies 22 fully extended, and the work surface in a correspondingly high position. It will be appreciated that, by means of work surface height adjusting apparatus 20, the work surface can be brought to any desired intermediate position, as well. Preferably, work surface height adjusting apparatus 20 supports a work surface height in a fully raised position that will allow a tall person to work comfortably while standing. Preferably, work surface height adjusting apparatus 20 supports a work surface height of about 42"-48" in a fully raised position. Preferably, work surface height adjusting apparatus 20 supports a work surface height of about 28"-30" in a fully lowered position.

Figure 1D:
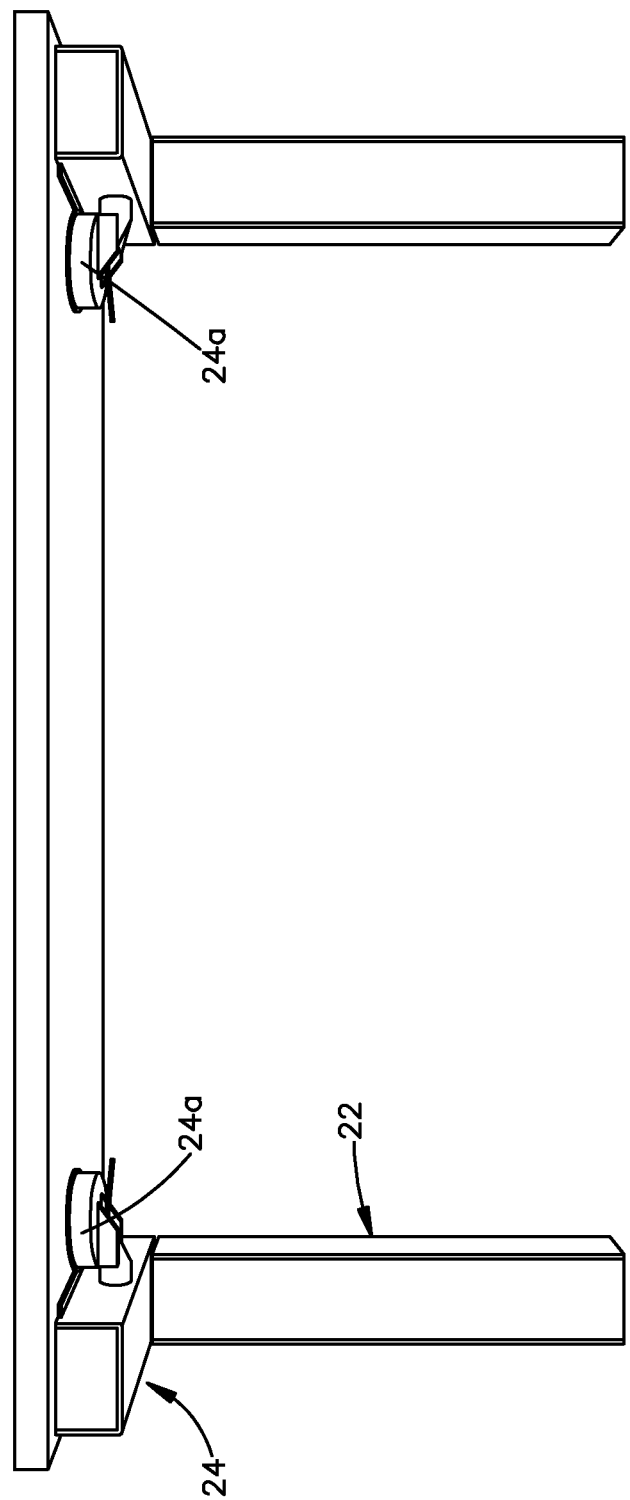
FIG. 1D shows a horizontal surface height adjustor according to an embodiment of the present invention, with a work surface suction cup attachment element.
Figure 1F:
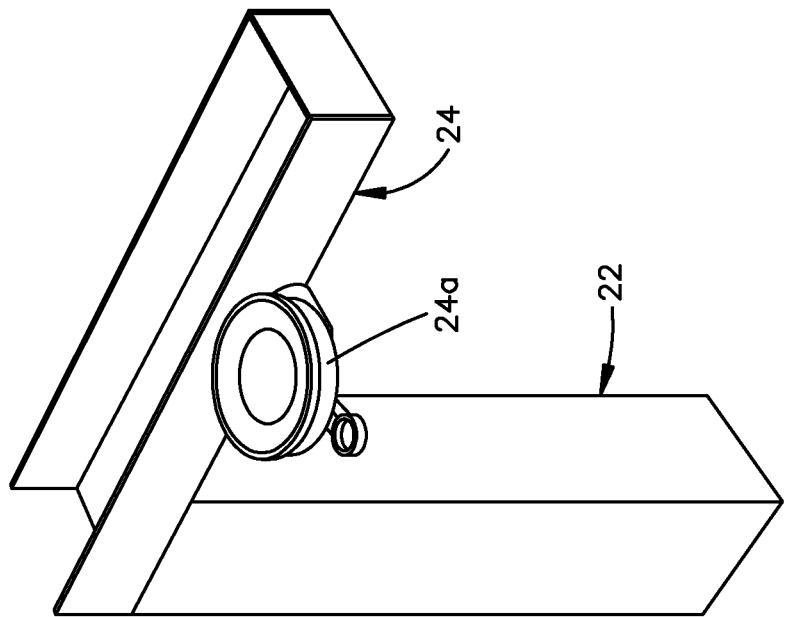
FIG. 1F shows an expanded view of the suction cup attachment element.
Figure 1E:
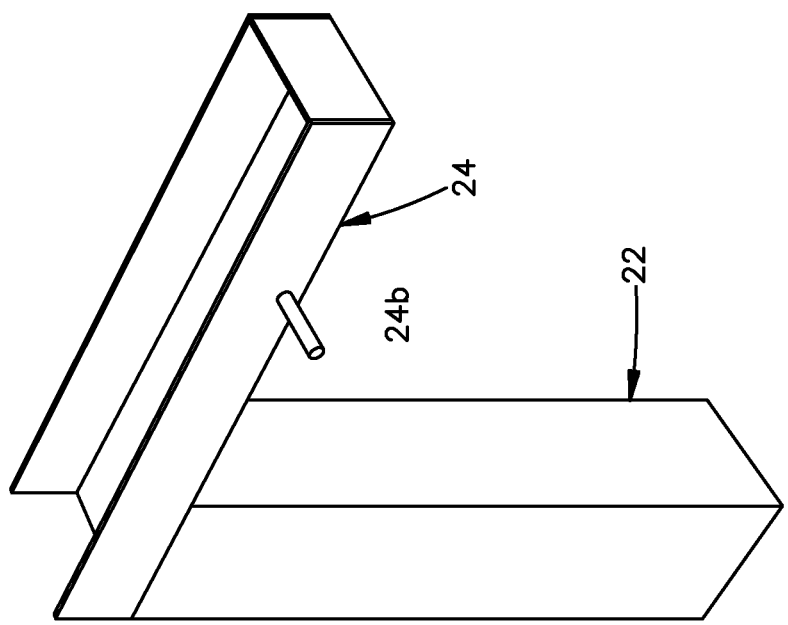
FIG. 1E shows a horizontal surface height adjustor attachment element for the work surface suction cup.

FIG. 1D depicts a work surface height adjusting apparatus 20 with suction cup elements 24a for the attachment of the work surface. It will be appreciated that, by means of suction cup attachment of a work surface to the work surface height adjusting apparatus 20 there will be no tools needed for set up. The work surface height adjusting apparatus 20 can be attached and/or detached from any work surface simply by using the suction cups attachment, without a need for screws or drills to securely fasten the work surface. FIG. 1E depicts the screw suction cup attachment element 24b. The screw attachment element 24b is attached to the cantilever 24. The suction cup elements 24a can be attached to the work surface height adjusting apparatus 20 by the screw attachment element 24b. The suction cup elements 24a are installed by simply attaching onto the screw 24b and tightening by hand.

FIG. 2 depicts some of the principal components of a preferred embodiment of a work surface height adjustment apparatus 20, assembled and ready for mounting on frame 12. As shown, adapter bracket 26 includes a plurality of adapters 27 disposed along the side of adapter bracket 26 that faces frame 12. In the embodiment shown in FIG. 2, the adapters 27 are generally hook-shaped. Frame 12 comprises an array of slots 28 corresponding to adapters 27, which receive adapters 27 when apparatus 20 is mounted to frame 12. As discussed in further detail below, a wide variety of embodiments of adapter bracket 26 are contemplated, with various configurations of adapters and other fastening elements or mechanisms, to permit attachment of apparatus 20 to various desks and other furniture, as well as to fixed elements, such as walls. In some embodiments, adapters 27 are generally hook-shaped and may be referred to as "hooks." In other embodiments, adapters 27 may assume other shapes as understood by a person of ordinary skill in the art.

As shown in FIG. 3, adapter bracket 26 also includes a row of adapters 29 along the other side of bracket 26, for attachment to telescoping tube 22. In contrast to adapters 27, which vary in size, number, spacing, shape, or other characteristics, depending on the specific desk or other component to which the height adjustment apparatus is attached, adapters 29 are of a standard size, number, spacing, and shape, for attachment to telescoping tube 22 of the present embodiment. In a preferred embodiment, adapters 29 are generally hook-shaped. In a preferred embodiment, each bracket 26 includes about 18 adapters 29. Alternatively, adapter bracket 26 may attach to telescoping tube 22 by other means. Preferably adapter bracket 26 attaches to telescoping tube 22 by a mechanism that facilitates quick assembly and disassembly. A person of ordinary skill in the art will readily understand that the embodiments of the present invention include detachable adapters 29 and fixed adapters 29 that are permanently connected to the sleeve of the telescoping tube 22.

Figure 4A:
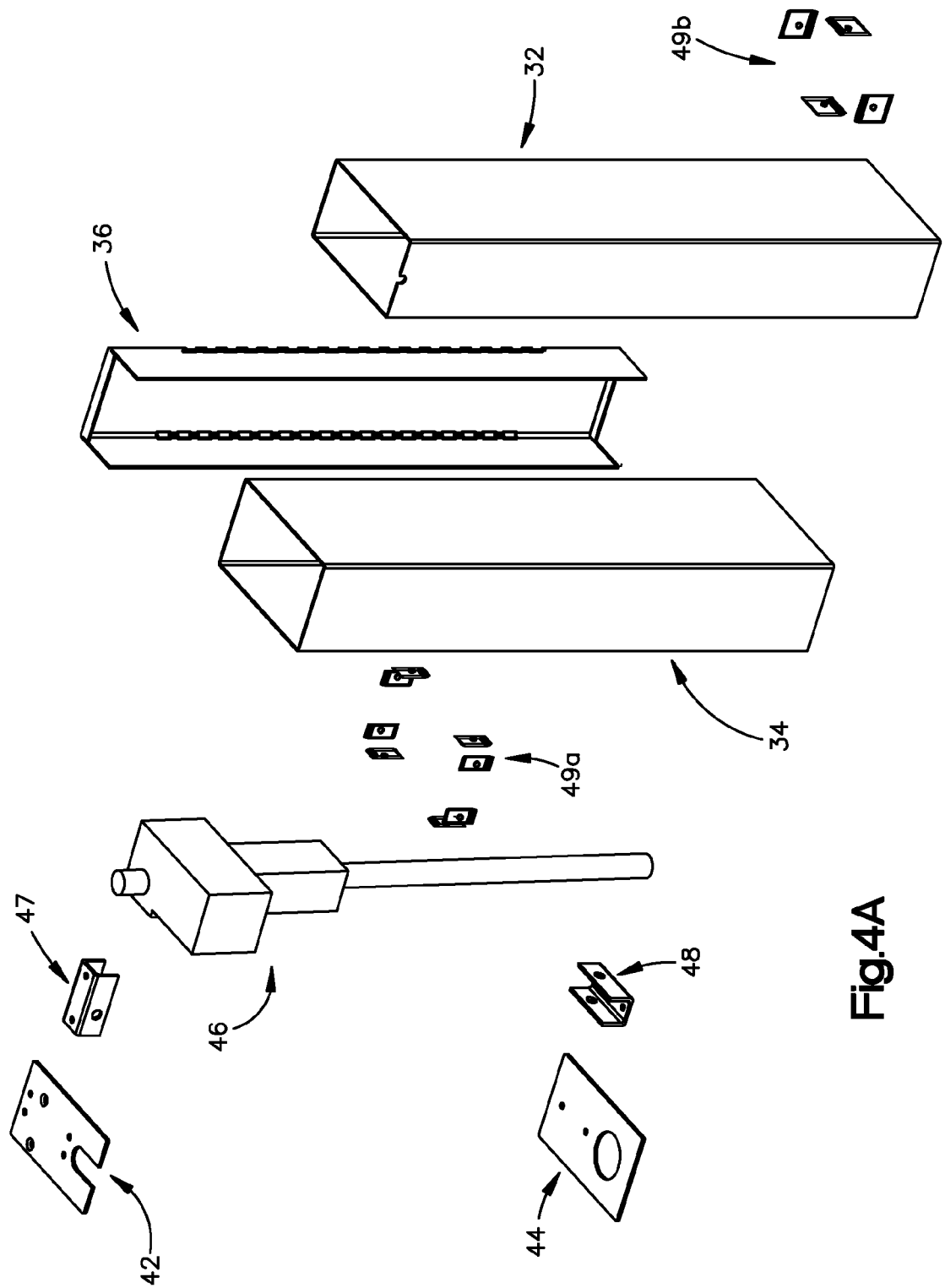
FIG. 4A is an exploded view of telescoping tubing according to an embodiment of the present invention, depicting an inner tube, outer tube, sleeve, bottom plate, top plate, and actuator motor.
Figure 4C:
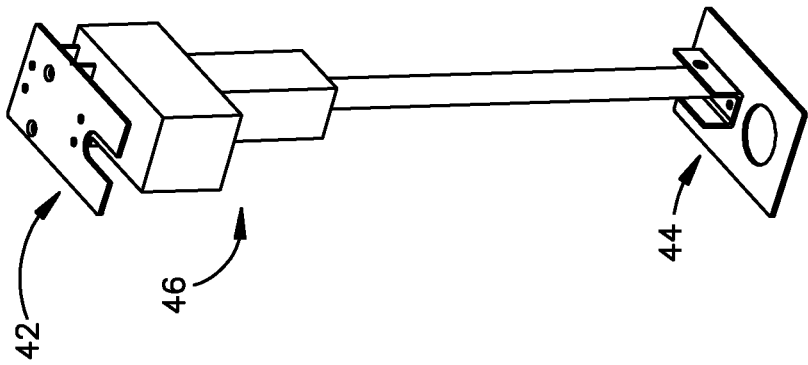
FIG. 4C depicts the actuator assembled to top and bottom plates.

FIG. 4A depicts a parts-separated, exploded view, of the telescoping tubing 22 assembly that includes an inner tube 32, outer tube 34, sleeve 36, bottom plate 44, top plate 42, and actuator 46. In a preferred embodiment, inner tube 32 has the general form of a right rectangular prism, open at the top and bottom. Preferably, inner tube 32 is about 25" high, 6½" wide, and 3½" deep. Preferably, outer tube 34 is of similar shape and configuration but is dimensioned slightly larger so that inner tube 32 fits inside outer tube 34. It will be understood that inner tube 32 and outer tube 34 may assume other (e.g. non-rectangular) shapes and configurations, so long as inner tube 32 fits within and can move readily with respect to outer tube 34.

Figure 4B:
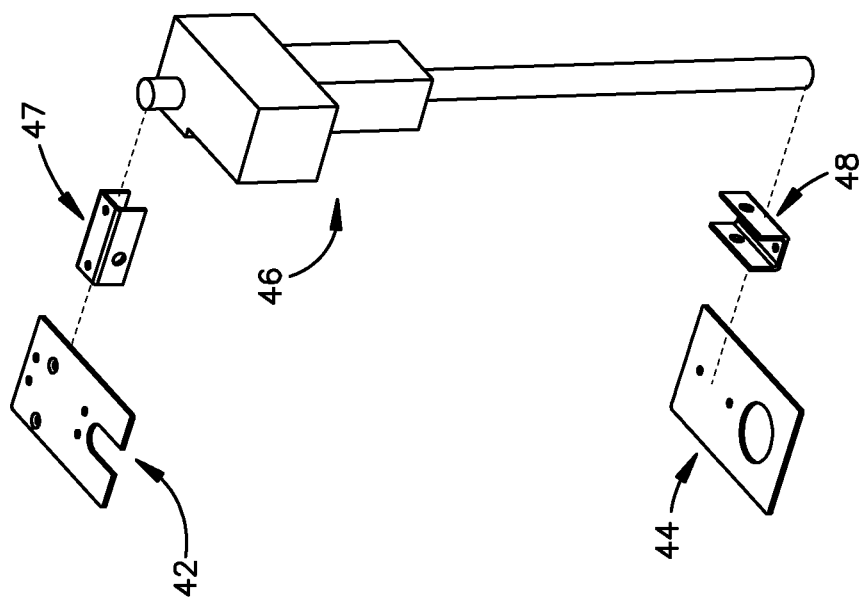
FIG. 4B is an exploded view of the actuator assembly.

In a preferred embodiment, sleeve 36 includes a U-shaped cross-section, and has an open side that preferably fits over outer tube 34. Sleeve 36 preferably includes a plurality of slots 37 that receive adapters 29 from one side of adapter bracket 26. As shown in detail in FIGS. 4F, 4G, 4H, and 4I, sleeve 36 preferably includes 2 arrays 37 and 39 of slots, one preferably along each corner of the sleeve 36. This permits sleeve 36 to serve as part of either a right leg or as part of a left leg. As shown in FIGS. 4F, 4G, and 4H, sleeve 36 in one embodiment includes flanges 38 at the top and bottom of the sleeve. Each of flanges 38 is bent over to preferably provide a separation of about ½" between sleeve 36 and outer tube 34 to allow adequate room for the insertion of hooks 27 into slots 37 or slots 39. Preferably, each of slots 35 (see FIG. 4I) is about ⅝" long, and the distance between slots is about ⅜". In a preferred embodiment, sleeve 36 is permanently welded to outer tube 34. Alternatively, as would be understood by a person of skill in the art, sleeve 36 can be secured to outer tube 34 by bolting or by other means.

Figure 5B:
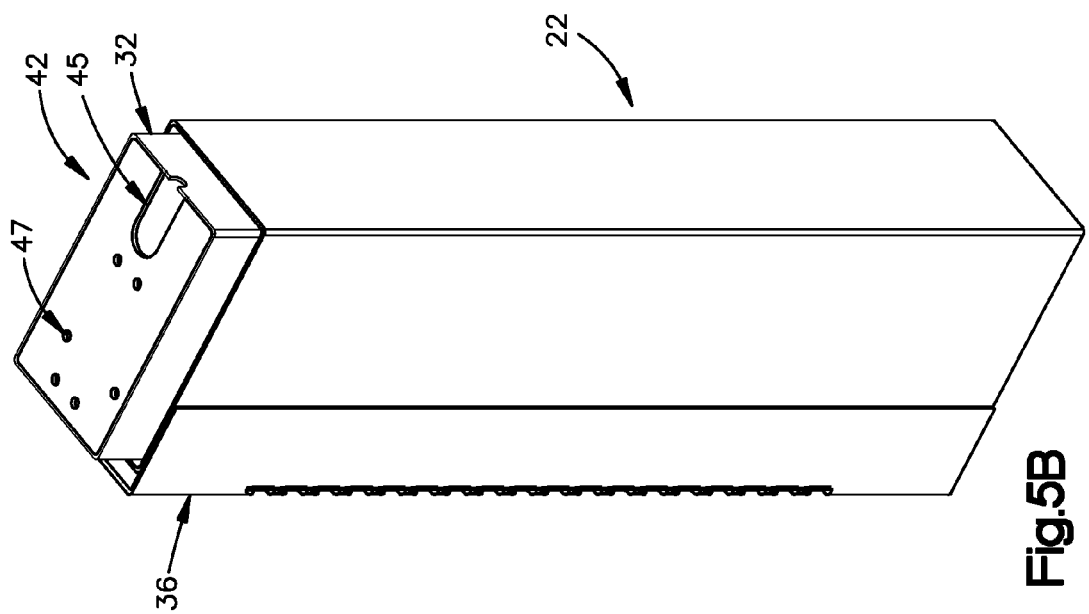
FIG. 5B depicts a top perspective view of telescoping tubing and sleeve according to an embodiment of the present invention.

As shown in FIG. 5B, top plate 42 is connected to inner tube 32. In a preferred embodiment, top plate 42 is welded to inner tube 32. Top plate 42 is also preferably connected to cantilever 24. In a preferred embodiment, as shown in FIG. 5B, top plate 42 includes a u-shaped opening 45 at one end as shown and a number of holes 47 (preferably 6 holes) to facilitate the use of fasteners to connect top plate 42 to cantilever 24.

Figure 5A:
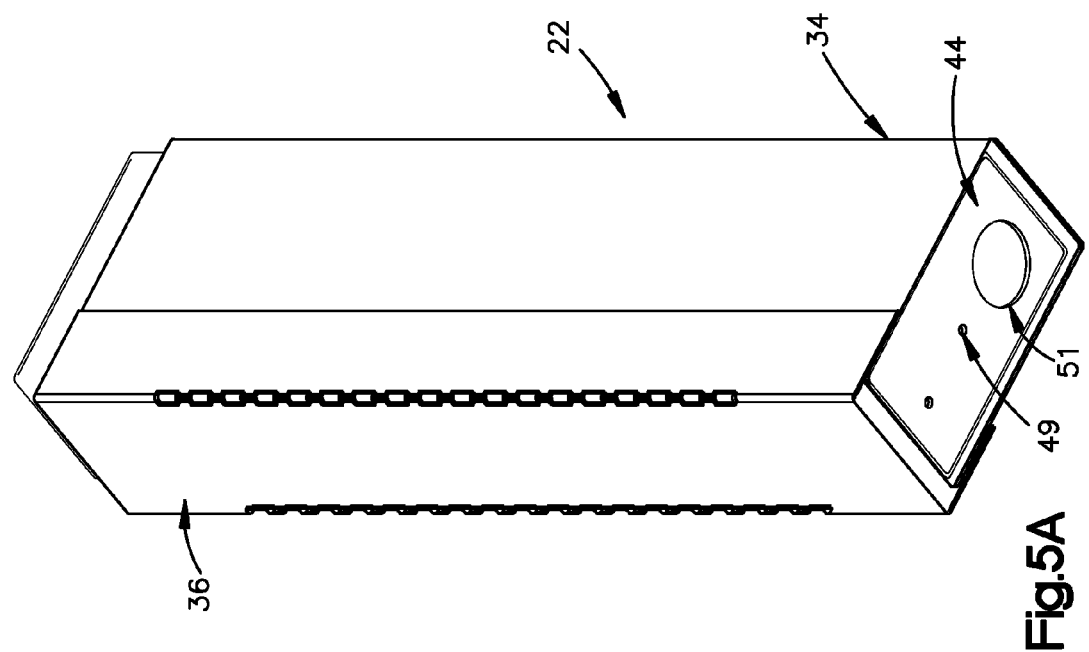
FIG. 5A depicts a bottom perspective view of telescoping tubing and sleeve according to an embodiment of the present invention.

Bottom plate 44 connects to outer tube 34. In a preferred embodiment, as shown in FIG. 5A, bottom plate 44 includes 2 holes 49 to accommodate fasteners and a single larger hole, preferably circular in shape. In an embodiment, bottom plate 44 is welded to the bottom of outer tube 34.

For successful operation, preferably the space between the inner and outer tube is carefully controlled, to avoid jamming or excess wear, on the one hand, or instability or wobbling, on the other hand. Accordingly, plastic spacer parts or "glides" 49a and 49b (see FIG. 4A) serve to maintain the desired spacing between elements of the telescoping tube assembly.

In other embodiments, telescoping tubes of circular or elliptical cross-section, or other cross-sectional shapes, are contemplated. In a preferred embodiment, the inner and outer tubes are each fabricated of 14 gauge steel.

Actuator 46 may be an electric linear actuator, such as one manufactured by Linak U.S., Inc., of Louisville, Ky. As shown in FIG. 4B, in one embodiment, actuator 46 connects to top plate 42 via top bracket 47 and actuator 46 connects to bottom plate 44 via bottom bracket 48.

Figure 4E:
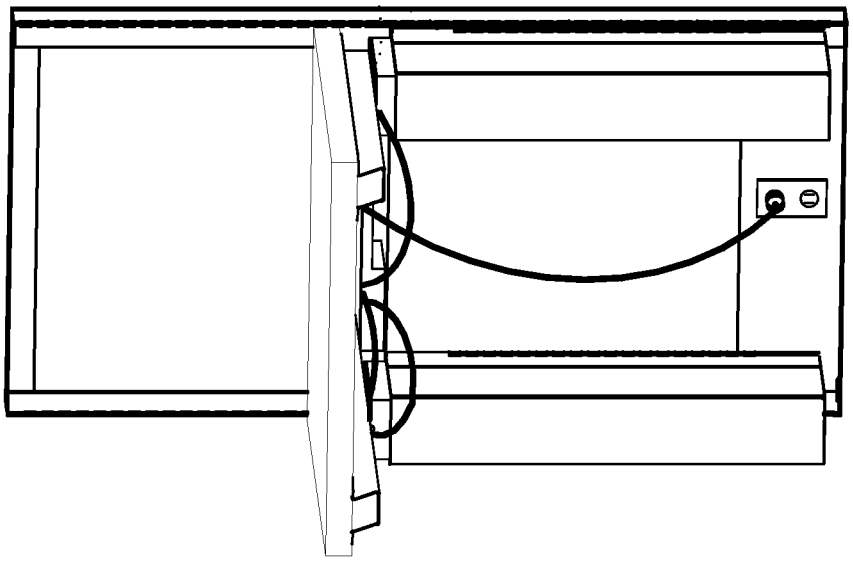
FIG. 4E is a perspective view with a horizontal work surface, controls and electrical connections installed.
Figure 4D:
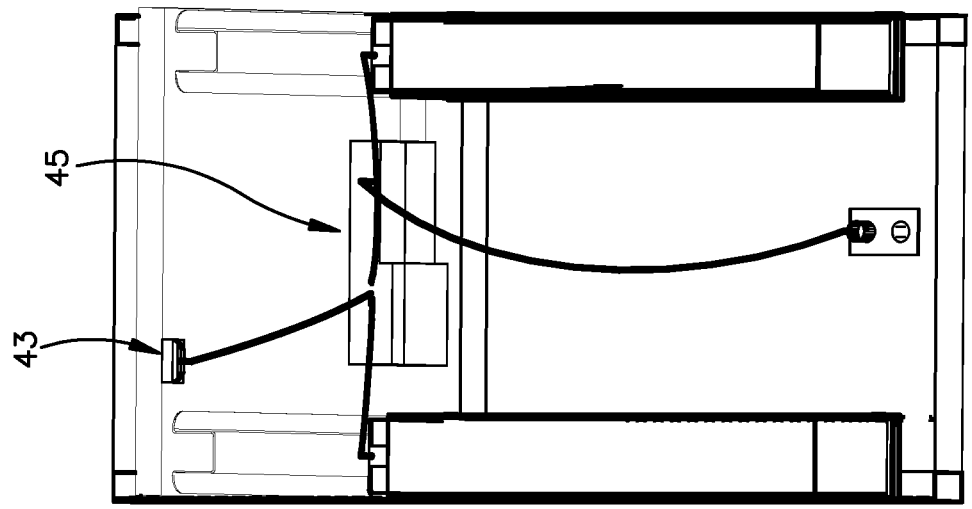
FIG. 4D depicts the underside of a work surface with controls and electrical connections.
Figure 4F:
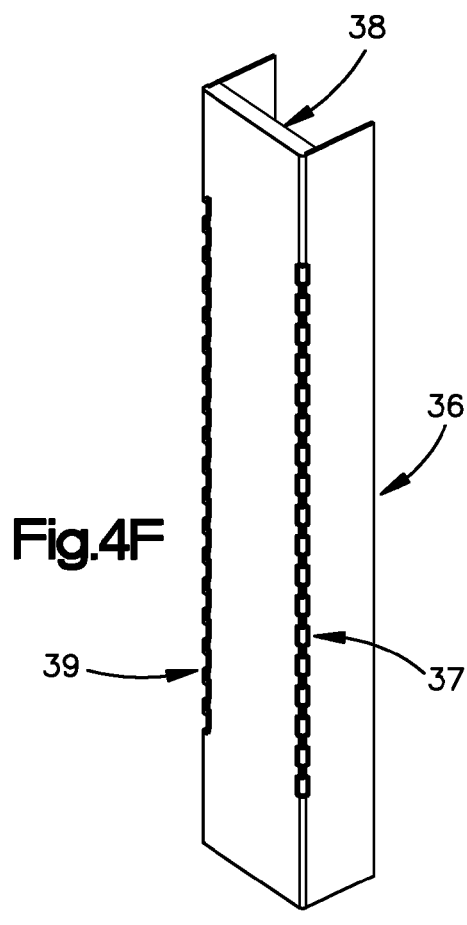
FIG. 4F depicts the outside of a sleeve according to an embodiment of the present invention.
Figure 4G:
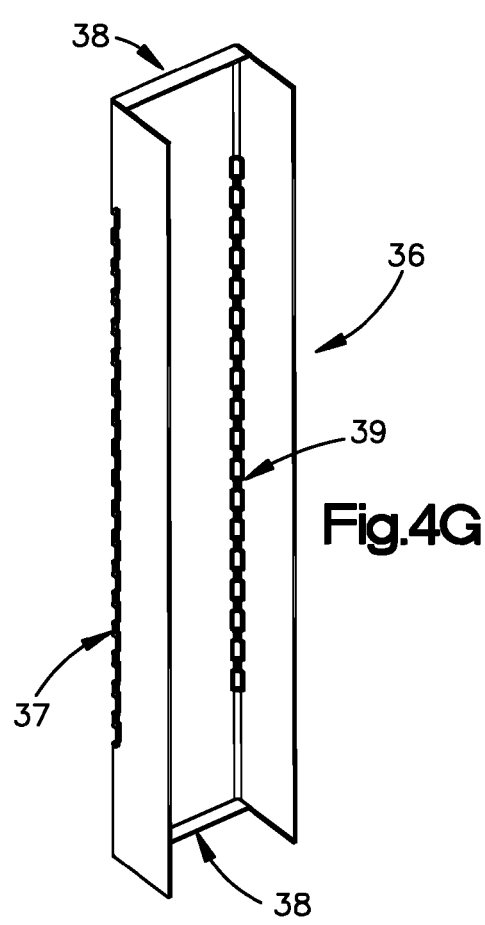
FIG. 4G depicts the inside of a sleeve according to an embodiment of the present invention.
Figure 4H:
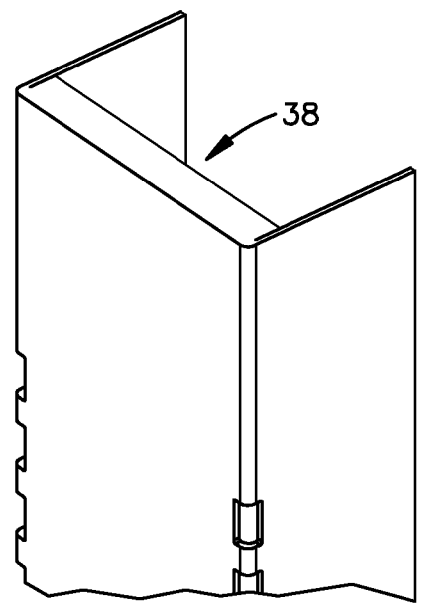
FIG. 4H depicts details of a sleeve, including a flange.
Figure 4I:
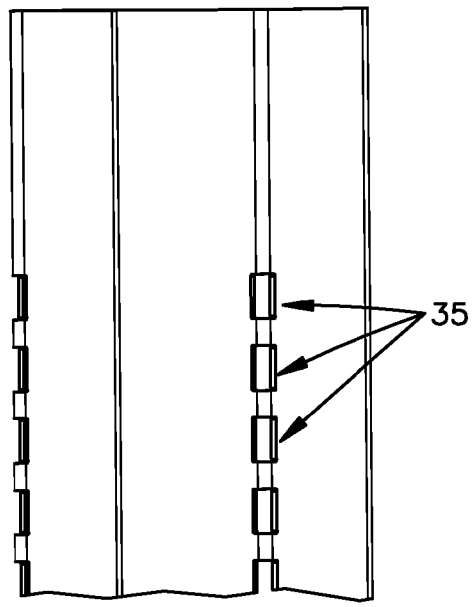
FIG. 4I shows details of slots on the sleeve.

As shown in FIGS. 4D and 4E, control 43 and control box 45 for actuators 46 are preferably located on the bottom of the work surface. Control 43 can be a button, knob, touch screen, or any other control mechanism suitable for actuation by a human. A wire extends from control 43 to control box 45. In another embodiment, control 43 communicates with control box 45 wirelessly. In a preferred embodiment, each telescoping tube assembly 22 has its own linear actuator, and the linear actuators are synchronized by the controls, so that, for example, each one moves the same amount up or down, and at the same rate, as the other(s). In a preferred embodiment, a single control box 45 is connected to 2 telescoping tube assemblies 22, and control box 45 is also connected to a power outlet, as shown in FIGS. 4D and 4E.

In a preferred embodiment, control 43 includes an up or down arrow button, and the work surface height is adjusted up and down by pushing the up or down arrow-button. The work surface continues to move as long as the arrow-button is depressed and the motion stops when the arrow-button is released.

FIG. 5A depicts a bottom perspective view of fully assembled telescoping tube assembly 22, showing bottom plate 44 connected to the bottom of outer tube 34. FIG. 5B is a top perspective view of fully assembled telescoping tube assembly 22, showing top plate 42 connecting to the top of inner tube 32. Preferably top plate 42 is welded to the top of inner tube 32 and bottom plate 44 is welded to the bottom of outer tube 34.

Figure 6B:
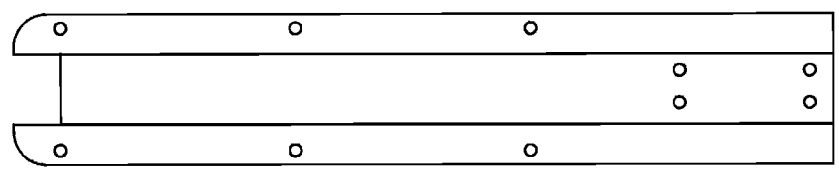
FIG. 6B depicts a top view of a cantilever according to an embodiment of the present invention.
Figure 6A:
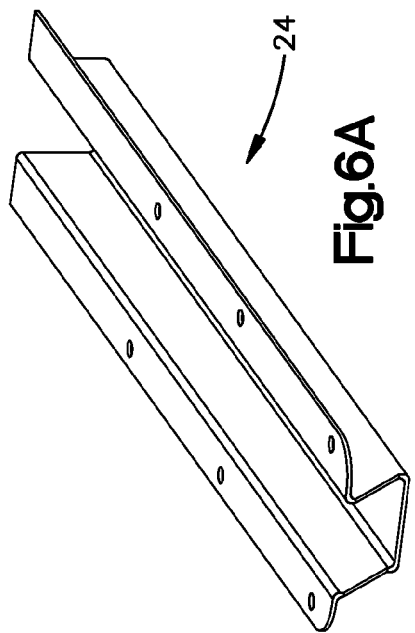
FIG. 6A depicts a perspective view of a cantilever according to an embodiment of the present invention.
Figure 6C:
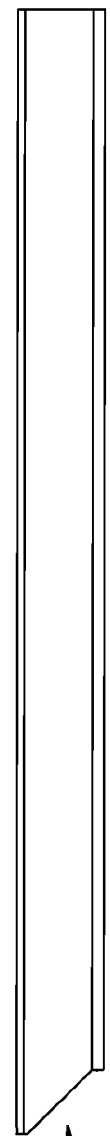
FIG. 6C depicts a side view of a cantilever according to an embodiment of the present invention.

FIG. 6A is a perspective view of an exemplary embodiment of cantilever element 24. FIGS. 6B and 6C are respectively top and side views of cantilever element 24. As described above in connection with FIGS. 1A-1C, each cantilever element 24 connects to the top of an inner tube 32, and also to the desktop or work surface. The cantilever elements 24 have the function of supporting the desktop or work surface as it is raised or lowered. The cantilever element 24 as depicted is only exemplary. In particular, the dimensions and placement of the holes shown in the left and right sides of cantilever element 24 will vary depending on the type of desktop or work surface or other surface to be supported and the fastening or attachment arrangements supported by the respective desktop or work surface. In a preferred embodiment, there are 3 holes on the left side and 3 holes on the right side of cantilever element 24. In contrast, the holes shown as formed in the central portion of cantilever element 24 are of a fixed configuration, as these match corresponding holes in top plate 42, which as noted is connected (preferably welded to) inner tube 32. In a preferred embodiment, the overall length of cantilever element 24 is about 22".

Figure 6E:
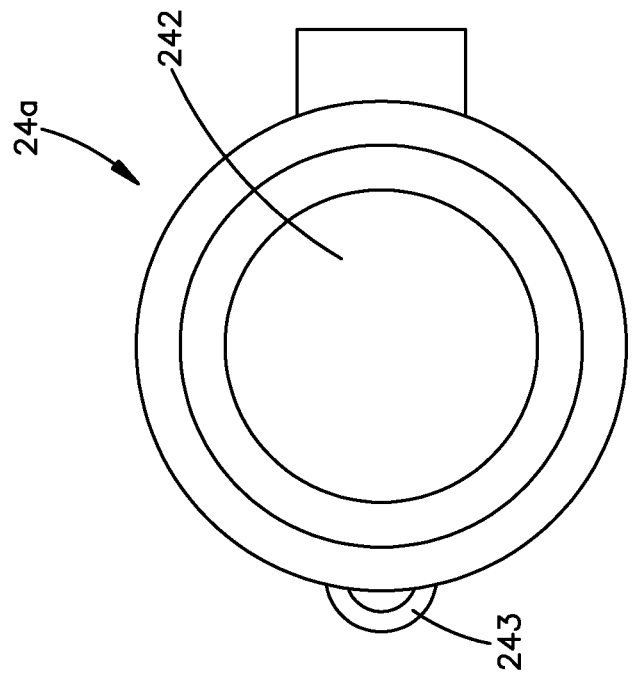
FIG. 6E depicts a top view of the suction cup attachment element.
Figure 6D:
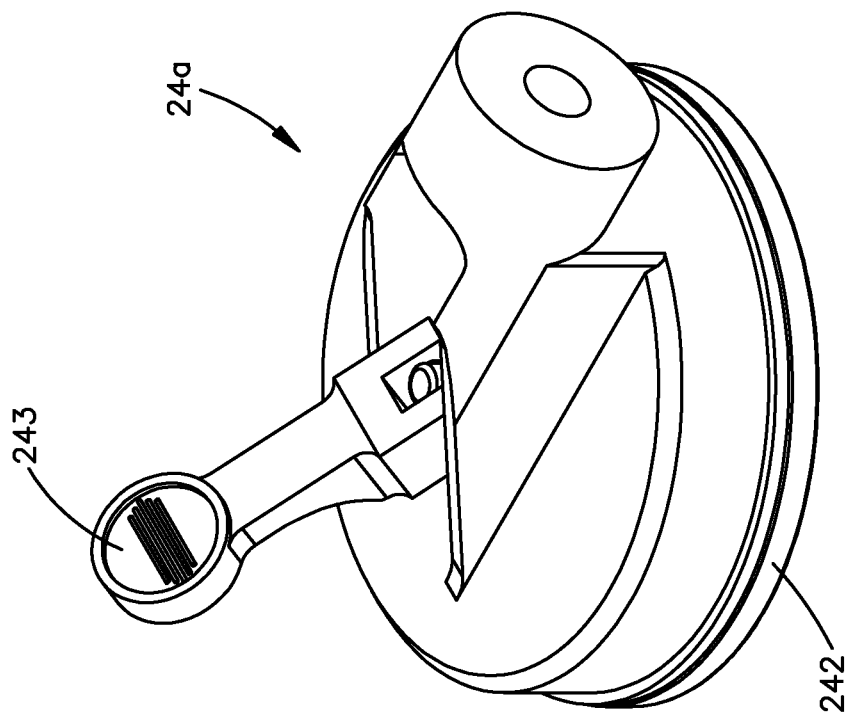
FIG. 6D depicts a perspective view a suction cup attachment element having a base and a handle.

In another example and as described above in connection with FIGS. 1D-1E, the cantilever arm 24 can attach to the work surface by means of suction cups 24a. Referring to FIGS. 6D-6E, the suction cup 24a includes a base 242 and a handle 243. The suction cup attachment elements 24a may have a base diameter that is 4.625" and a base thickness of 0.25". Furthermore, in a preferred example the overall height of the suction cup 24a, not including the handle 243, is 4.5" with an overall height of 2.625" when compressed. The handle 243 may be 3" in length and may vary in thickness from 0.25" to 0.625". The suction cup attachment elements 24a may include a handle 243 that is made from ABS Plastic and a base 242 that is made from PVC Plastic or Neoprene; however, it should be appreciated that a number of different materials may be used.

To mount a preferred embodiment of the work surface adjusting apparatus 20 on the frame, the user or installer would proceed as follows: 1) Attach the adapter bracket to the work station frame by inserting the male hooks, facing downwards, into work station female slots; 2) Hang the lifting column on the adapter bracket by sliding the column female slots over the bracket male hooks that face upwards; and 3) Attach the cantilever arm with screws going through the 4 holes on the inside bottom of the arm and into the 4 holes at the top of the lifting column.

FIGS. 7A-16E depict various embodiments of adapter bracket 26. Adapter bracket 26 attaches the telescoping tube assemblies 22 (legs) to a variety of furniture systems or fixed surfaces. As already discussed, one side of adapter bracket 26 preferably has a fixed configuration of adapters or hooks 29 for attachment to telescoping tube 22. In the discussion of FIGS. 7A-16E below, this corresponds to the left side of adapter bracket 26. As discussed, the other side (furniture side) varies depending on the type of furniture to which the apparatus is to be attached. In FIGS. 7A-16E, this corresponds to the right side of adapter bracket 26.

In a preferred embodiment, the overall length of adapter bracket 26 is about 17 to 20 inches. Preferably, a length is provided that allows room for enough adapters to lend sufficient strength and stability to the interconnection of the height adjusting apparatus and the furniture (or wall). In a preferred embodiment, adapter bracket 26 is about 1" wide. In another embodiment, adapter bracket 26 is about 2½" wide.

Preferably, the shape of the top right-side adapter of adapter bracket 26 includes an upward protrusion to prevent the bracket from being easily dislodged, e.g., for safety reasons. The distance by which the top adapter protrudes above the top of the adapter bracket is in the range of about ⅛" to ⅜".

Various exemplary embodiments of adapter bracket 26 will now be described in detail, in a manner facilitating making specific embodiments of adapter bracket 26 by cutting from hot rolled steel (or cold rolled steel, or other metal) using a computer numeric control (cnc) tool or the like.

All Steel Adapter Bracket (FIGS. 7A-G).

Figure 17C:
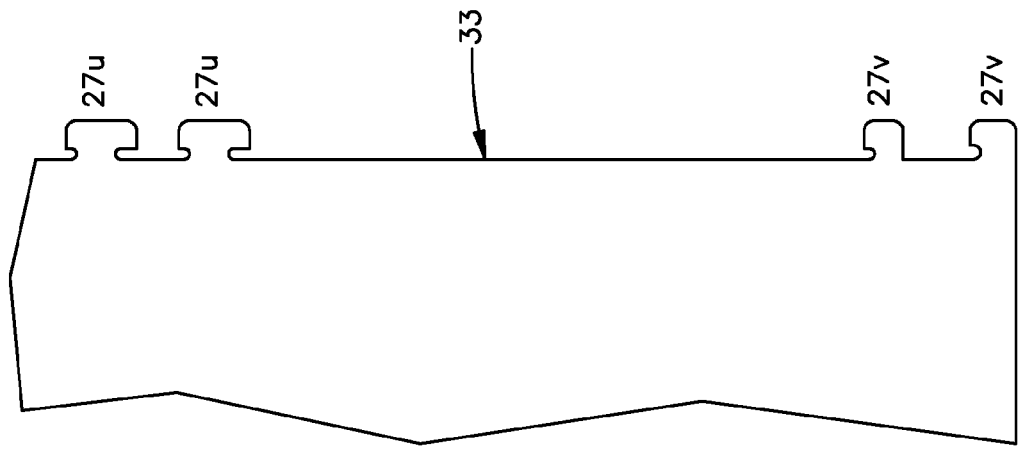
FIG. 17C depicts details of other adapters of the embodiment of FIG. 17A.
Figure 17B:
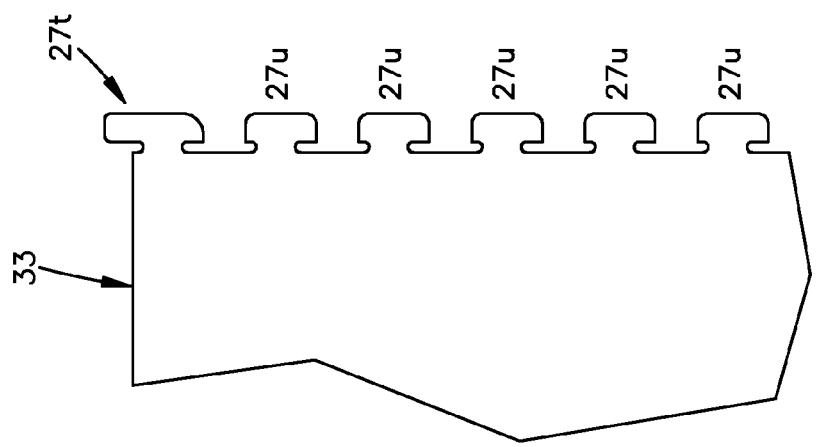
FIG. 17B depicts details of adapters of the embodiment of FIG. 17A.
Figure 17A:
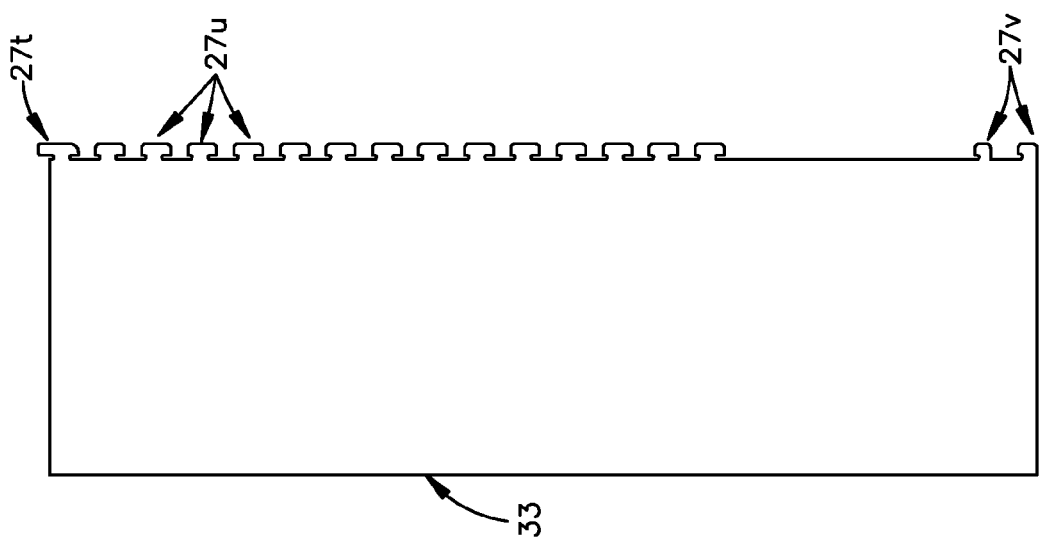
FIG. 17A depicts a top view of another embodiment of an adapter bracket of the present invention.

In one embodiment, as shown in FIG. 7A, 17 right-side adapters 27a are of an identical, generally hook-shaped configuration. A single topmost right-side adapter 27b, includes an upward protrusion to guard against dislodgement. As shown in detail in FIGS. 7C and 7D, the bracket preferably further includes a notch opposite each right-side adapter 27a or 27b. Preferably, as shown in detail in FIGS. 7F and 7G, each right-side adapter 27a or 27b includes a curved leading edge.

Described below are the dimensions of a preferred embodiment of an All Steel adapter bracket. Angles and distances are exemplary. In other embodiments, more or fewer adapters of differing dimensions and shape may be provided.

Bracket Core: Bracket is cnc-cut hot rolled steel; 18¼" in length, 1¹/₁₆" in width. ⁵/₆₄" depth.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1" from smoothed 90° angle.

Right Side Male Adapters: 18 male adapters, spaced at 1". 17 are identical. Final adapter at top is unique. Smoothed 90° angle left, ⅝" to 45° angle left, ¹/₁₆" to 45° angle right, ⁵/₁₆" to 90° angle right, ⅛" to 90° angle right, ³/₁₆" to smoothed 90° angle left, ⅛" to smoothed 45° angle left, ³/₁₆" to 45° angle left, then ¼" to smoothed 90° angle left. ⅜" to core. Final adapter at top is unique. From previous adapter's end, ⅝" to 45° angle left, ¹⁄₁₆" to 45° angle right, ⁵⁄₁₆" to 90° angle right, ⅛" to 90° angle right, ³⁄₁₆" to smoothed 90° angle left, ⅛" to smoothed 45° angle left. ³⁄₁₆" to smoothed 45° angle left, ²⁵⁄₆₄" to 45° left. ⅜" to 90° right. Extend to level with top edge.

AO Adapter Bracket (FIGS. 8A-8D).

In another embodiment, as shown in FIG. 8A, 14 right-side adapters 27*d* are identical and of a generally hook-shaped configuration. The bottommost 2 adapters 27*c* are tab-shaped, and the topmost adapter 27*e* has an upward protrusion to guard against dislodgement. See detailed views of preferred adapter shapes in FIGS. 8C and 8D. Preferably, there is an elongated space between the topmost tab-shaped adapter 27*c* and the first hook-shaped adapter 27*d*. Preferably, this space or gap is about 1½ long. In an embodiment, adapter bracket 26 preferably is bent along a line parallel to the longitudinal axis of adapter bracket 26, giving adapter bracket 26 a generally v-shaped cross-section. In a preferred embodiment, the bend line is about ⅛" from the right side of adapter bracket 26 and about ⅞" from the left side of adapter bracket 26, resulting in an asymmetrical v-shaped cross-section, with one side of the "v" longer than the other side. Preferably, the measure of the dihedral angle between the two sides is about 125°.

Described below are the dimensions of a preferred embodiment of an AO adapter bracket. Angles and distances are exemplary. In other embodiments, more or fewer adapters of differing dimensions and shape may be provided. In a preferred embodiment, an AO adapter bracket core includes an angle of approximately 125° between a larger left side portion (width approximately ⅞") and a smaller right side portion (width approximately ⅛"). This angled configuration is desirable in order to meet the unique configuration of AO furniture.

Bracket Core: Bracket is cnc-cut hot rolled steel; 18¼" in length, 1" in width. ⁵⁄₆₄" depth. ⅞" from left edge of core, core angles at 125° for remaining ⅛" of width.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1" from smoothed 90° angle.

Right Side Male Adapters: 17 male adapters, first two and last adapters from bottom are unique. From bottom right smoothed 90° angle left, ¹³⁄₁₆" to 90° angle right. ⅜" to smoothed 90° angle left. ⁷⁄₁₆" to smoothed 90° angle left. ⅜" to 90° angle right at core. ⁹⁄₁₆" to next adapter, 90° angle right. ⅜" to smoothed 90° angle left, then ⁷⁄₁₆" to smoothed 90° angle left. ⅜" to 90° angle right at core. 1⁹⁄₁₆" to smoothed 90° angle right. ³⁄₃₂" to smoothed 90° angle right. ³⁄₁₆" to 90° angle left. ⁹⁄₃₂" to smoothed 90° angle left. ⅝" to smoothed 90° angle left, then ⅜" to 90° angle right at core, 13 identical adapters follow, spaced at 1" from end to end. The last adapter at top, beginning from end of previous adapter: 1⁹⁄₁₆" to smoothed 90° angle right. ³⁄₃₂" to smoothed 90° angle right. ⅛" to 90° angle left, then ⁹⁄₃₂" to smoothed 90° angle left. ¹¹⁄₁₆" to smoothed 90° angle left, then ⁹⁄₃₂" to smoothed 90° angle left. ⅛" to 90° angle right, then ⁷⁄₃₂" to core bend.

Compatico Adapter Bracket (FIGS. 9A-E).

In still another embodiment, as shown in FIGS. 9A and 9B, 17 right-side adapters 27*g* are of an identical, generally hooked-shaped configuration. A single topmost adapter 27*f* is of different shape, having an upward protrusion to guard against dislodgement. In an embodiment, each right-side adapter 27*g* and 27*f* includes a straight leading edge. See FIGS. 9C-9E for details of adapter shapes.

Described below are the dimensions of a preferred embodiment of a Compatico adapter bracket. Angles and distances are exemplary. In other embodiments, more or fewer adapters of differing dimensions and shape may be provided.

Bracket Core: Bracket is cnc-cut hot rolled steel; 18¼" in length, 1" in width. ⁵⁄₆₄" depth.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1" from smoothed 90° angle.

Right Side Male Adapters: 18 male adapters, spaced 1" from end to end. First 17 adapters from bottom are identical. From bottom right smoothed 90° angle left, 1" to 90° angle right, then ⅛" to 90° angle right. ⁵⁄₁₆" to smoothed 90° angle left, then ⁹⁄₃₂" to smoothed 90° angle left. ⁷⁄₁₆" to 45° angle left. ¹¹⁄₆₄" to 45° angle left. ⁹⁄₃₂" to 90° angle right at core. Last male adapter, from end of previous adapter: ¾" to 90° angle right. ⅛" to 90° angle right. ¼" to smoothed 90° angle left, then ⁹⁄₃₂" to smoothed 90° angle left. ⅝" to 45° angle left, then ¹¹⁄₆₄" to 45° angle left. ⁵⁄₃₂" to smoothed 90° angle left. ⅛" to core, then extend ⅛" to top edge.

Ethos Space Adapter Bracket (FIGS. 10A-F).

Figure 10C:
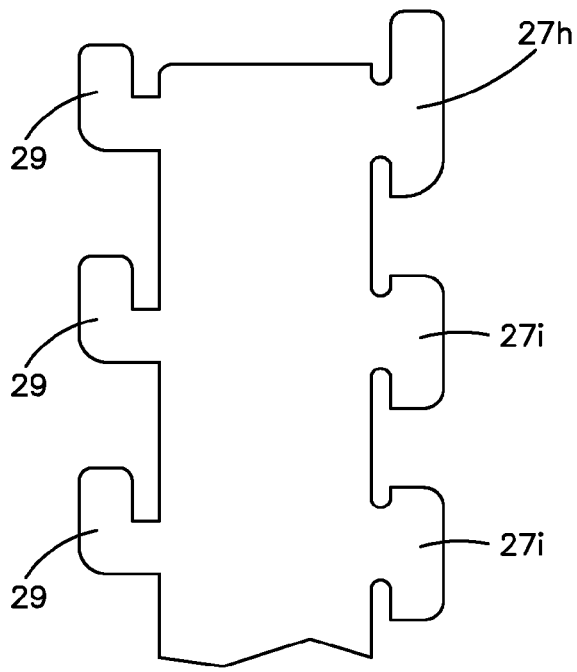
FIG. 10C depicts details of adapters of the embodiment of FIG. 10A.
Figure 10E:
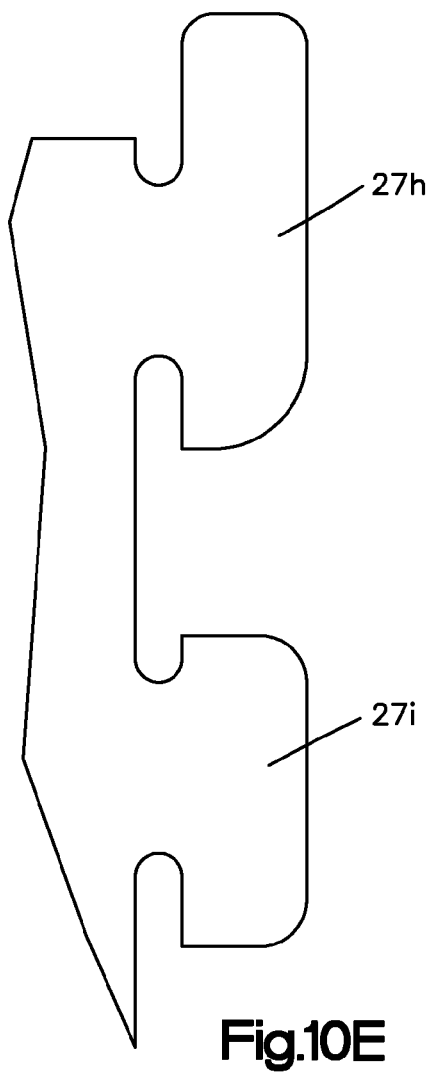
FIG. 10E is an enlarged view of certain adapters of the embodiment of FIG. 10A.
Figure 10D:
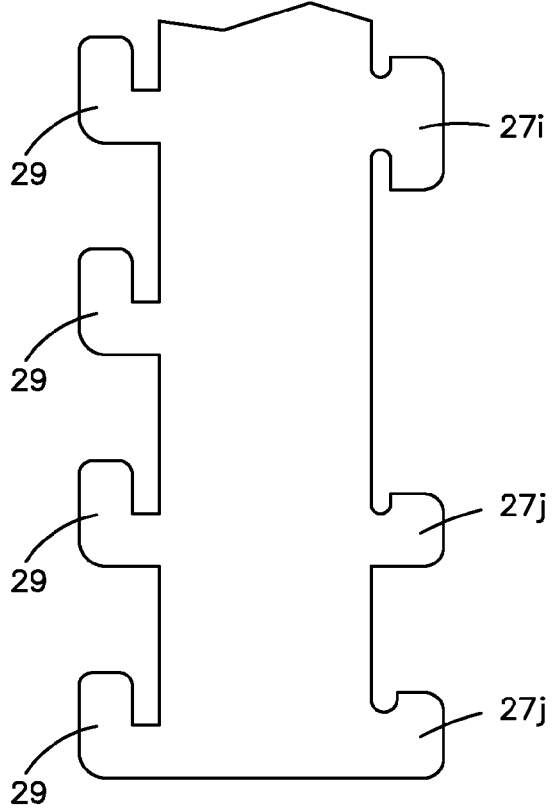
FIG. 10D depicts details of other adapters of the embodiment of FIG. 10A.
Figure 10F:
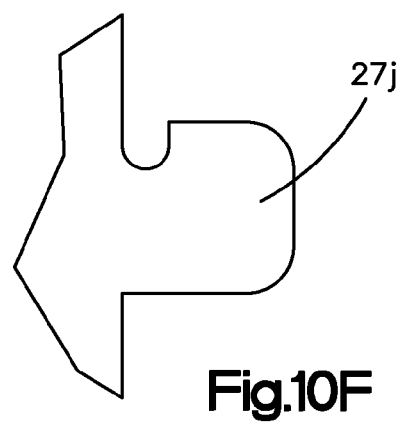
FIG. 10F is an enlarged view of an adapter of the embodiment of FIG. 10A

In still another embodiment, as shown in FIGS. 10A and 10B, 14 right-side adapters 27*i* are identical and of a generally hook-shaped configuration. Topmost adapter 27*h* has an upward protrusion to guard against dislodgement. Further, in this embodiment, bottommost 2 adapters 27*j* face the opposite way (hook directed up) from the other adapters. See enlarged views of each adapter shape in FIGS. 10C-10F.

Described below are the dimensions of a preferred embodiment of an Ethos Space adapter bracket. Angles and distances are exemplary. In other embodiments, more or fewer adapters of differing dimensions and shape may be provided.

Bracket Core: Bracket is cnc-cut hot rolled steel; 17¹³⁄₃₂" in length, 1" in width. ⁵⁄₆₄" depth.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends ⁵⁄₃₂" from smoothed 90° angle.

Right Side Male Adapters: 17 male adapters; 14 identical and 3 mutually unique. Extend ¹¹⁄₃₂" from bottom edge of core to smoothed 90° angle left. ¹³⁄₃₂" to smoothed 90° angle left, then ⁷⁄₃₂" to 90° angle left. ³⁄₃₂" to smoothed 90° angle right, then ⅛" to smoothed 90° angle right at core. ¹¹⁄₁₆" to second adapter, 90° angle right. ¹¹⁄₃₂" to smoothed 90° angle left, then ¹¹⁄₃₂" to smoothed 90° angle left. ¼" to 90° angle left. ³⁄₃₂" to smoothed 90° angle right, then ⅛" to smoothed 90° angle right at core. 1²³⁄₃₂" to third adapter, smoothed 90° angle right. ³⁄₃₂" to smoothed 90° angle right, then ³⁄₁₆" to 90° angle left. ¼" to smoothed 90° angle left, then ⅝" to smoothed 90° angle left. ¼" to 90° angle left. ³⁄₃₂" to smoothed 90° angle right, then ³⁄₃₂" to smoothed 90° angle right at core. Repeat adapter 13 times, spaced at 1" from end to end. Last adapter at top begins ²¹⁄₃₂" from end of previous adapter, as smoothed 90° angle right. ³⁄₃₂" to smoothed 90° angle right, then ³⁄₁₆" to 90° angle left. ¼" to smoothed 90° angle left, then ⅞" to smoothed 90° angle left. ¼" to smoothed 90° angle left. ¼" to smoothed 90° angle right, then ³⁄₃₂" to smoothed 90° angle right at core.

Knoll Dividends Adapter Bracket (FIGS. 11A-11E).

In still another embodiment, as shown in FIGS. 11A and 11B, the topmost adapter 27k has an upward protrusion to guard against dislodgement. The other right-side adapters are grouped in groups of two, with a space having no adapters in between groups. The spacing between adapters within each group of two adapters 27l (measured from the top of one adapter 27l to the top of the next adapter 27l) is about 1½". The gap between two-adapter groups is about 3", measured from the top of the adapter 27l on one side of the gap to the top of the adapter 27l on the other side of the gap. Adapters 27l are generally T-shaped, as may be seen in the detailed views of FIGS. 11C-E.

Described below are the dimensions of a preferred embodiment of a Koll Dividends adapter bracket. Angles and distances are exemplary. In other embodiments, more or fewer adapters of differing dimensions and shape may be provided.

Bracket Core: Bracket is cnc-cut hot rolled steel; 18¼" in length, 1" in width. ⁵⁄₆₄" depth.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1" from smoothed 90° angle.

Right Side Male Adapters: 9 male adapters; 8 identical, 1 unique. All 9 adapters are preceded by a shallow recess. Smoothed 90° angle at bottom left corner. ¹⁵⁄₁₆" space to recess: 45° angle left. ¹⁄₁₆" to 142° angle left, then ¼" to 83° angle right. ⁵⁄₃₂" to 90° angle right, then ⁷⁄₃₂" to smoothed 90° angle left. ⁵⁄₁₆" to smoothed 90° angle left, then ⅝" to smoothed 90° angle left. ⁵⁄₁₆" to smoothed 90° angle left, then ⅛" to 90° angle right. ³⁄₃₂" to 90° right at core. Repeat recess and adapter ¹⁵⁄₁₆" from end. From end of adapter pair, instead of ¹⁵⁄₁₆" space, distance is 2⁷⁄₁₆" to next recess and adapter pair (otherwise, as per previous paragraph beginning with recess). 4 pairs of recesses and adapters, in total. At end of final pair's adapter: ¹⁵⁄₁₆" space to recess: 45° angle left. ¹⁄₁₆" to 142° angle left, then ¼" to 83° angle right. ⁵⁄₃₂" to 90° angle right, then ⁷⁄₃₂" to smoothed 90° angle left. ⅛" to smoothed 45° angle left for ⁵⁄₁₆". 45° angle left, then ⅝" to smoothed 90° angle left. ⁵⁄₁₆" to smoothed 90° angle left, then ⁵⁄₁₆" to 90° right. ³⁄₃₂" to 90° angle right, then ⅛" to 90° angle left, level with top edge of core.

Side Mounted Adapter Bracket (FIGS. 12A-12D).

In still another embodiment there are no right-side adapters. The top and bottom corners are 90° angles. Holes are provided through the adapter to accommodate fasteners.

Described below are the dimensions of a preferred embodiment of side mounted adapter bracket. Angles and distances are exemplary. In other embodiments differing dimensions and shapes may be provided.

Bracket Core: Bracket is cnc-cut hot rolled steel; 19" in length, 2½" in width. ⁵⁄₆₄" depth. 2 holes are located on the core. The first hole is located 3¼" from the bottom edge, and the second is located 3⅛" from the top edge. The holes are ⅜" in diameter, with centers set at ¾" from the right side edge.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1¾" from smoothed 90° angle.

Right Side Male Adapters: There are no right-side adapters on the Side Mounted bracket. The bottom and top right corners are 90° angles Steel Case Adapter Bracket (FIGS. 13A-13F).

Figures 13A, 13B:
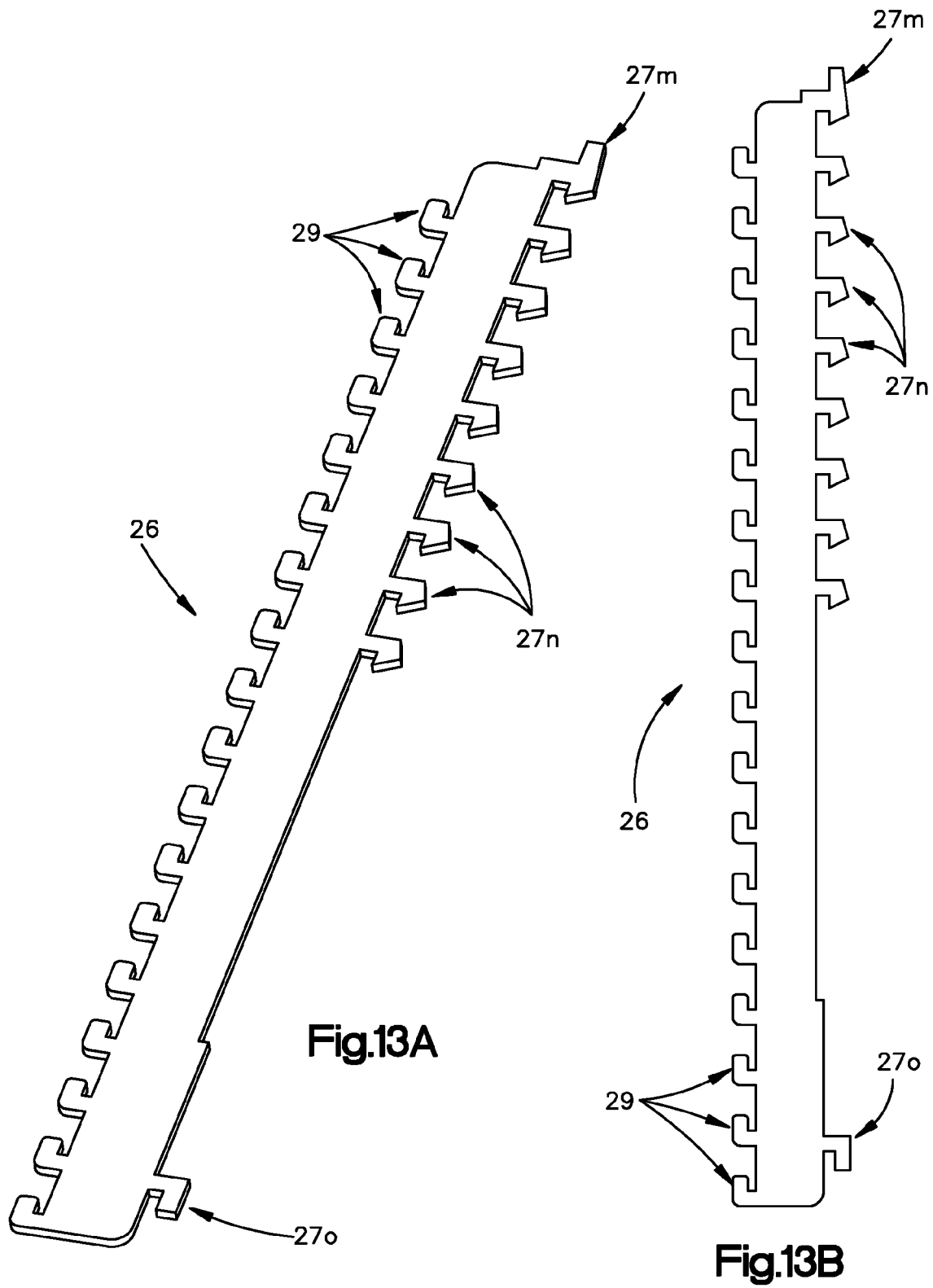
FIG. 13A depicts a perspective view of an embodiment of an adapter bracket according to the present invention for use with, e.g., Steel Case furniture.
FIG. 13B depicts a top view of the embodiment of FIG. 13A.
Figure 14D:
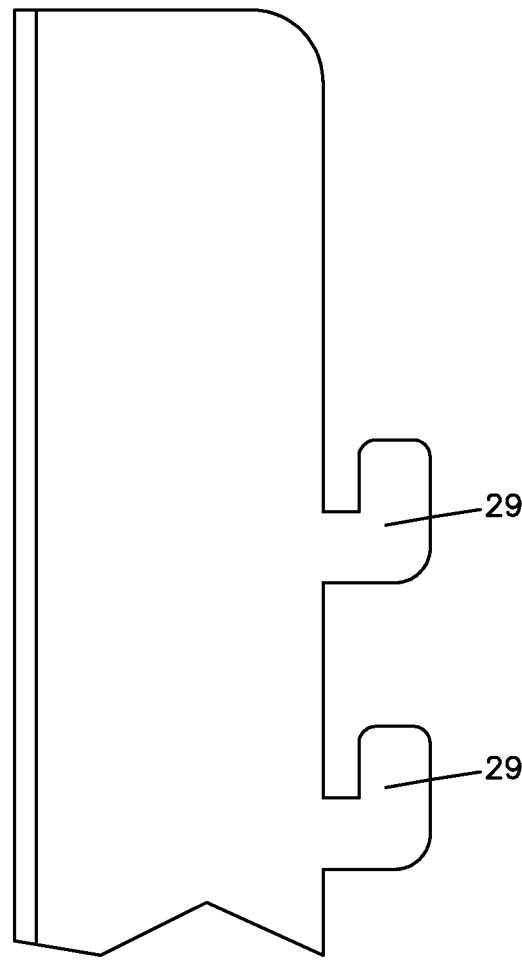
FIG. 14D depicts details of adapters of the embodiment of FIG. 14A.
Figure 14E:
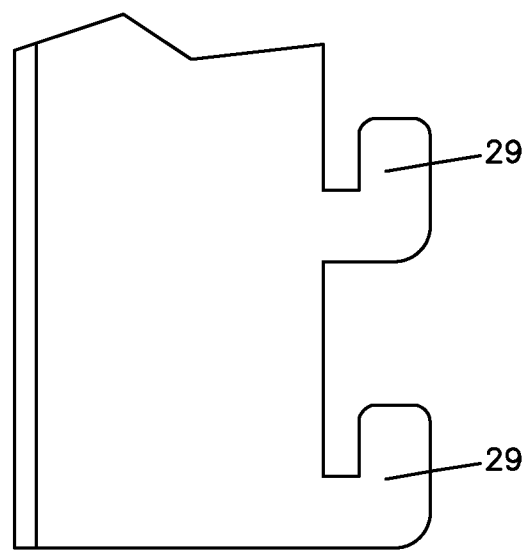
FIG. 14E depicts details of other adapters of the embodiment of FIG. 14A.

In still another embodiment, as shown in FIGS. 13A and 13B, topmost adapter 27m has an upward protrusion to guard against dislodgement, and bottommost adapter 27o is L-shaped. The other adapters (adapters 27n, preferably 8 in number) are generally hook-shaped, with a slant leading edge. The shapes of the various adapters are shown in detail in FIGS. 13C-F. The slant-edged adapters 27n are grouped together in the upper half of bracket 26, and there is a gap having no adapters extending from the bottommost of the slant-edged adapters to the L-shaped adapter. The gap is about 9" in length.

Described below are the dimensions of a preferred embodiment of a Steel Case adapter bracket. Angles and distances are exemplary. In other embodiments, more or fewer adapters of differing dimensions and shape may be provided.

Bracket Core: Bracket is cnc-cut hot rolled steel; 18¼" in length, 1" in width. ⁵⁄₆₄" depth.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1" from smoothed 90° angle.

Right Side Male Adapters: 10 male adapters; 8 identical, 2 mutually unique. Smoothed 90° angle left at bottom right edge. 1" to 90° angle right, then ³⁄₁₆" to 90° angle right. ⁵⁄₁₆" to 90° angle left, then ¼" to 90° angle left. ⁹⁄₁₆" to 90° angle left, then ⁷⁄₁₆" to 90° angle right at core. From end of first adapter, 2¼" to recess: 90° angle left, then ⅛" to 90° angle right. 6¹⁵⁄₁₆" to next adapter. 90° angle right, then ⁷⁄₃₂" to 90° angle right. ⁷⁄₃₂" to 63° angle left, then ¹¹⁄₃₂" to 100° angle left. 2¹⁄₆₄" to 107° angle left. ⁷⁄₁₆" to 90° angle right. Repeat adapter 7 times, spaced at 1" from end to end. Last adapter, from end of previous adapter: ¾" to 90° angle right, then ⁷⁄₃₂" to 90° angle right. ⁷⁄₃₂" to 63° angle left, then ¹¹⁄₃₂" to 110° angle left. ²⁵⁄₃₂" to 97° angle left, then ⁷⁄₃₂" to 90° angle left. ⅜" to 90° angle right, then ¹⁵⁄₃₂" to 90° angle left. ³⁄₁₆" to 90° angle right at top edge.

Wall Mounted Adapter Bracket (FIGS. 14A-14E).

In still another embodiment, as shown in FIGS. 14A-C, bracket 26 has a uniform series of hook-shaped adapters on one side, no adapters on the other side, and a bend between the two sides. Preferably, the bend is 90°. Preferably, the bend line is 1½" from one side of the bracket and 1" from the other side.

Described below are the dimensions of a preferred embodiment of a wall mounted adapter bracket. Angles and distances are exemplary. In other embodiments, differing dimensions and shapes may be provided.

Bracket Core: Bracket is cnc-cut hot rolled steel; 19" in length, ⁵⁄₆₄" depth. From left side edge, 1½" to 90° bend. From bend, 1" to right side edge. A hole is set with center 1½" from bottom edge of left side. Hole is ⁵⁄₁₆" in diameter, with its center set ¾" from the left edge. 4 identical holes are set 4" apart from first hole.

Left Side Male Adapters: There are no male adapters on the left side of the bracket. The bottom and top corners of the right side are 90° angles.

Right Side Male Adapters: 18 male adapters, spaced at 1 inch. All male adapters identical. First adapter begins extending from bottom of core. ⅜" from core edge to smoothed 90° angle right, ½" to smoothed 90° angle right, ¼" to smoothed 90° angle right, ¼" to 90° angle left, ⅛" to core. Final male adapter ends 1¾" from smoothed 90° angle.
Techion Adapter Bracket (FIGS. 15A-15D).

In still another embodiment 17 right-side adapters 27q are of an identical, generally hook-shaped configuration, except for topmost adapter 27p, which has an upward protrusion to guard against dislodgement. In an embodiment, the bracket further includes a notch opposite each right-side adapter. In an embodiment, each right-side adapter includes a curved leading edge. See enlarged views of the adapter shape and notches in FIGS. 15C and 15D.

Described below are the dimensions of a preferred embodiment of a Techion adapter bracket. Angles and distances are exemplary. In other embodiments, more or fewer adapters of differing dimensions and shape may be provided.

Bracket Core: Bracket is cnc-cut hot rolled steel; 18¼" in length, 1 1/16" in width. 5/64" depth.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1" from smoothed 90° angle.

Right Side Male Adapters: 18 male adapters, spaced at 1". 17 are identical. Final adapter at top is unique. Smoothed 90° angle left, ⅝" to 45° angle left, 1/16" to 45° angle right, 5/16" to 90° angle right, ⅛" to 90° angle right, 3/16" to smoothed 90° angle left, ⅛" to smoothed 45° angle left, 3/16" to 45° angle left, then ¼" to smoothed 90° angle left. ⅜" to core. Final adapter at top is unique. From previous adapter's end, ⅝" to 45° angle left, 1/16" to 45° angle right, 5/16" to 90° angle right, ⅛" to 90° angle right, 3/16" to smoothed 90° angle left, ⅛" to smoothed 45° angle left. 3/16" to smoothed 45° angle left. 25/64" to 45° left. ⅜" to 90° right. Extend to level with top edge.

Universal Adapter Bracket (FIGS. 16A-16E).

In still another embodiment, as shown in FIGS. 16A and 16B, there are preferably 7 right-side adapters. These include topmost adapter 27r, which has an upward protrusion to guard against dislodgement, as well as 6 generally hook-shaped adapters 27s. Spacing between successive adapters 27r, measured from the top of one adapter 27r to the top of the next adapter 27r, is about 3". In an embodiment, the gaps or spaces between right-side adapters include 3 divots 25, each divot 25 having a maximum depth of about 1/16" and a total length of about ½".

The universal adapter bracket is designed to fit most furniture systems and work stations. In order to accomplish this, universal adapter bracket provides adapters that accommodate the size, shape, and spacing of slots supported by a wide variety of furniture systems and work stations.

Described below are the dimensions of a preferred embodiment of a universal adapter bracket. Angles and distances are exemplary. In other embodiments, more or fewer adapters of differing dimensions and shape may be provided.

Bracket Core: Bracket is cnc-cut hot rolled steel; 19" in length, 1" in width. 5/64" depth.

Left Side Male Adapters: 18 male adapters, spaced at 1 inch. All male adapters identical. First adapter begins extending from bottom of core. ⅜" to smoothed 90° angle right, ½" to smoothed 90° angle right, ¼" to smoothed 90° angle right, ¼" to 90° angle left, ⅛" to core. Final male adapter ends 1¾" from smoothed 90° angle.

Right Side Male Adapters: 7 male adapters; 6 identical, 1 unique. Smoothed 90° angle left. ¼" to divot: smoothed recess with equal slopes ⅛" from start and ⅛" from end, with maximum depth of 1/16". Total length of divot: ½". At end of first divot, first adapter begins immediately. ⅛" to 90° angle right, then ⅛" to smoothed 90° angle left. ¼" to smoothed 90° angle left, then ⅜" to smoothed 90° angle left. ⅜" to 90° angle right at core. ¼" to divot (as per previous paragraph). At end of divot, ½" to next divot, then ½" to next divot. Following third consecutive divot, second male adapter begins immediately (as per previous paragraph). This repeats until a total of 6 male adapters have been created. Set of 3 divots follows 6th male adapter (as per previous paragraph). Then begins the last, unique male adapter. ⅛" to 90° angle right, then ⅛" to smoothed 90° angle left. ¼" to smoothed 90° angle left, then ¾" to smoothed 90° angle left. ¼" to 90° angle left. ⅜" to 90° angle right, then ⅛" to meet core's top edge (level).

As will be appreciated, these embodiments of adapter bracket 26 are only illustrative, and others may be devised according to the need to interconnect the height adjustor with specific desks, modular furniture systems, office cubicle systems, and building features such as walls and floors.

In a preferred embodiment, adapter bracket 26 is formed from 14 gauge steel.

Haworth Bent Universal Adapter Bracket (FIGS. 16F-16J).

In still another embodiment, the adapter bracket 26 may include a bent universal adapter bracket as illustrated in FIGS. 16F-16J. Similar to the universal adapter bracket described above in reference with FIGS. 16A-16E, there are preferably 7 right-side adapters. The right-side adapters are shown at the top of the adapter and include topmost adapter 27r, which has an upward protrusion to guard against dislodgement, as well as 6 generally hook-shaped adapters 27s. The topmost adapter 27r and the hook-shaped adapters 27s preferably include the same dimensions as described above.

Figure 16C:
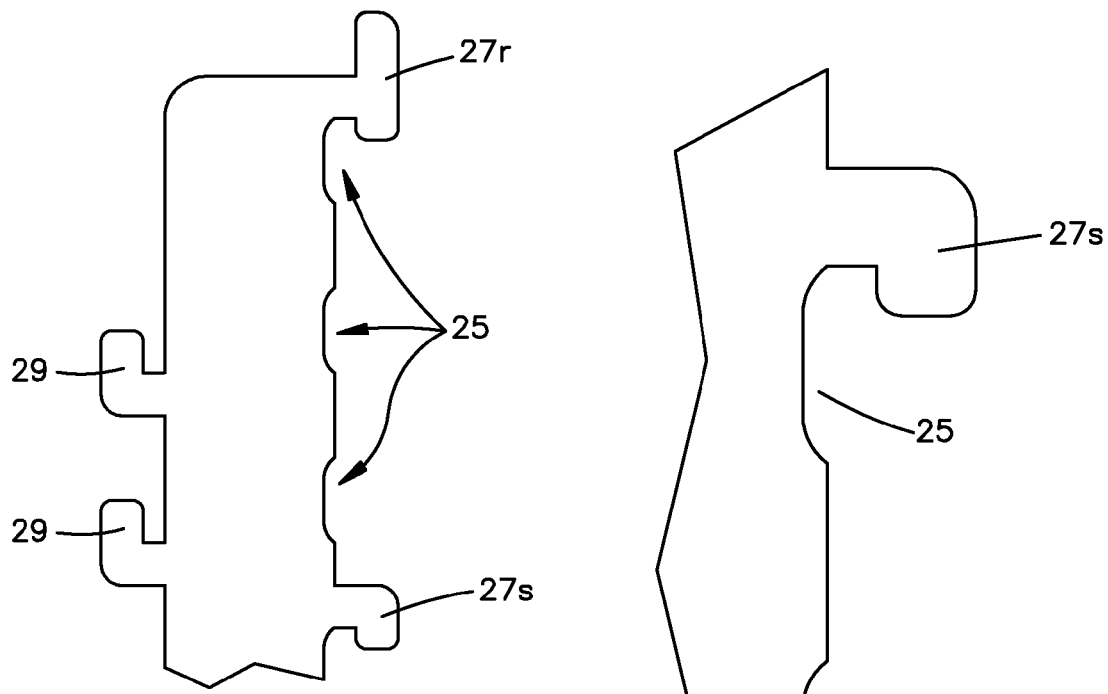
FIG. 16C depicts details of adapters of the embodiment of FIG. 16A.
Figures 16D, 16E:
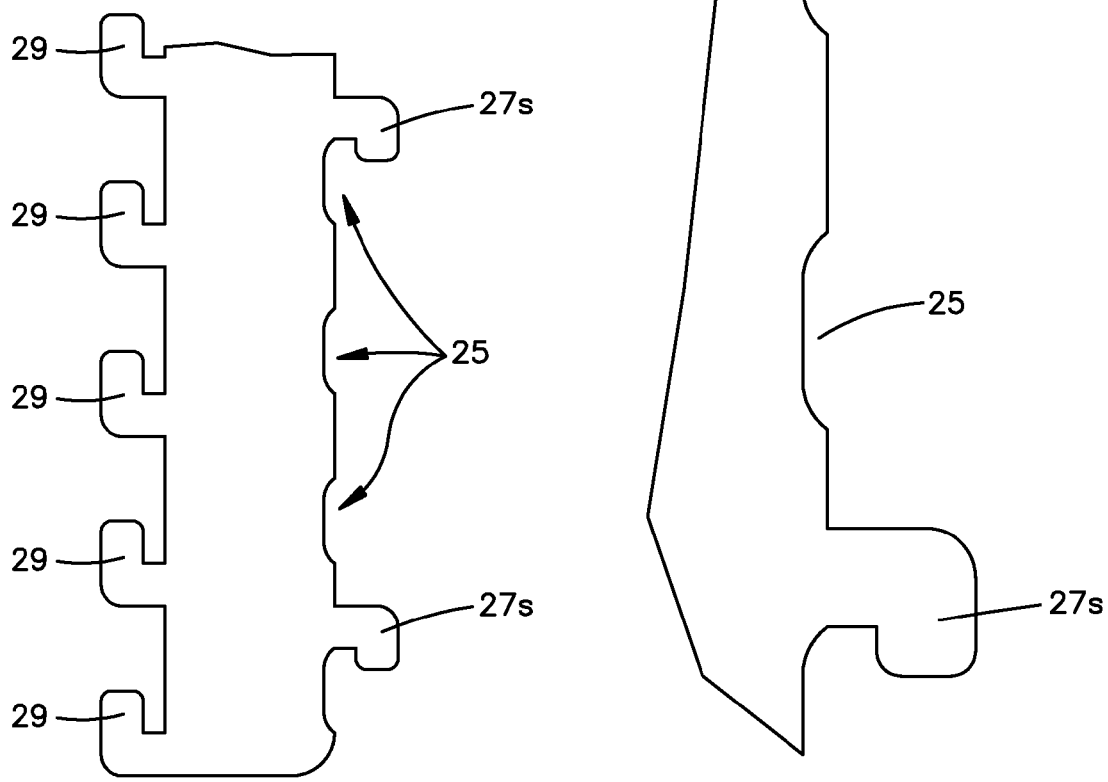
FIG. 16D depicts details of other adapters of the embodiment of FIG. 16A.
FIG. 16E is an enlarged view of certain adapters of the embodiment of FIG. 16A.
Figure 16F:
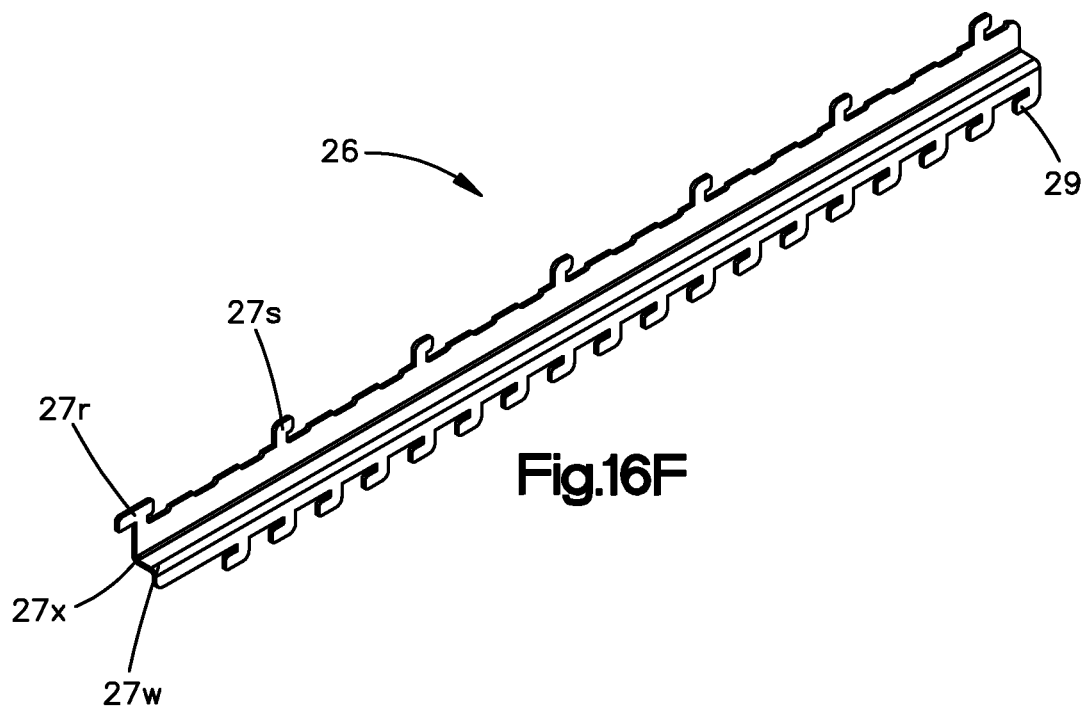
FIG. 16F depicts a perspective view of an embodiment of another universal adapter bracket according to the present invention.

In this example, the adapter bracket 26 is bent at a central portion thereof. Referring to FIG. 16F, the right-side adapters 27r, 27s are shown at a top portion of the adapter bracket 26 and the left-side adapters 29 are shown at a bottom portion of the adapter bracket 26. An intermediate portion between the right-side adapters 27r, 27s and the left side adapters 26 are bent at two positions 27x, 27w. As a first lateral side extends vertically downwards from a position at the topmost adapter 27r, the adapter bracket 26 is bent at a first position 27x and extends horizontally at a second lateral side on a plane that is substantially perpendicular to the first lateral side. As the second lateral side extends horizontally, the adapter bracket is bent again at a second position 27w and extends vertically downwards to form a third lateral side that is substantially parallel to the first lateral side and substantially perpendicular to the second parallel side.

Figure 16G:
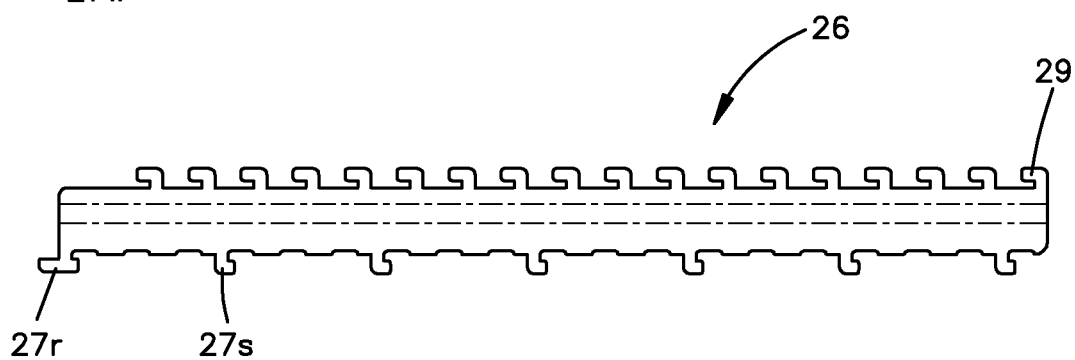
FIG. 16G depicts a top view of the embodiment of FIG. 16F in a flat configuration and prior to bending.
Figure 16H:
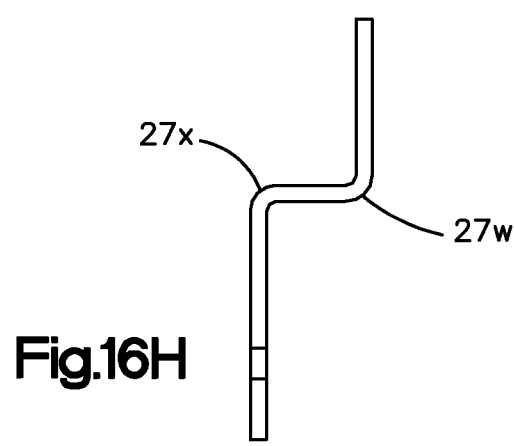
FIG. 16H depicts a cross-sectional view of the embodiment of FIG. 16F.

FIG. 16G illustrates the adapter bracket 26 in a flat configuration and before being bent. As illustrated in FIG. 16G, in a preferred example, the adapter bracket 26 measures approximately 492 mm by 50.5 mm in a flat configuration and prior to being bent. Referring to FIG. 16H, a cross-sectional view of the bent adapter bracket 26 is illustrated. FIG. 16H illustrates the first lateral side extending vertically downwardly before the adapter bracket 26 is bent at a first position 27x, the second lateral side extending horizontally before the adapter bracket 26 is bent at a second position 27w, and the third lateral side extending vertically upwards. In a preferred example, the first lateral side may extend vertically approximately 26.5 mm until the first bending position 27x and the third lateral side may extend vertically approximately 19.05 mm from the second bending position 27w.

Figure 16I:
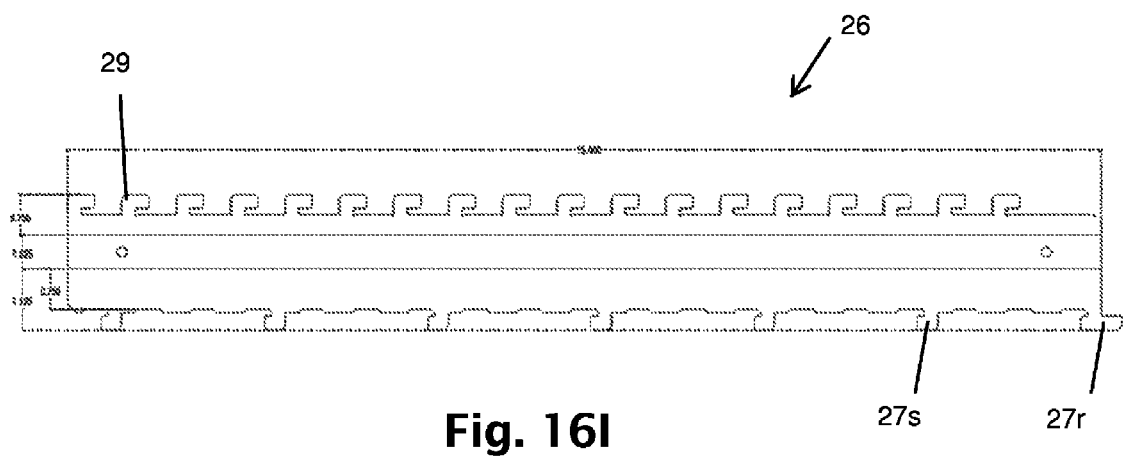
FIG. 16I depicts a top view of an embodiment of another universal adapter bracket in a flat configuration according to the present invention.

FIG. 16I illustrates a top view of an embodiment of another universal adapter bracket 26 in a flat configuration according to the present invention. In this example, the adapter bracket 26 is similar to the adaptor bracket 26 illustrated in FIG. 16F-H but may include different dimensions. In a preferred example, the adaptor bracket 26 measures approximately 19 inches or about 482.6 mm by approximately 2.5 inches or about 63.5 mm. The adaptor bracket is bent above a middle portion that is approximately 0.75 mm below the left-side adapters 29 and 1.125 mm above the right-side adapters 26r, 26s. In this example, protrusions or nubs are included between the right-side adapters 26r, 26s but in a preferred example, these protrusions may be removed such that the area between the right-side adapters 26r, 26s is flat.

Figure 16J:
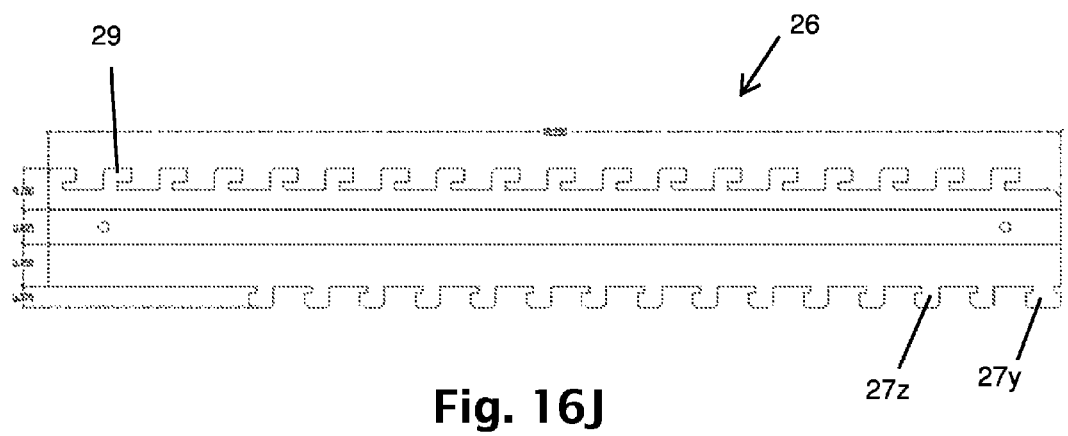
FIG. 16J depicts a top view of an embodiment of another universal adapter bracket in a flat configuration according to the present invention.

FIG. 16J illustrates a top view of an embodiment of another universal adapter bracket 26 in a flat configuration according to the present invention. In this example, the adapter bracket 26 may also be bent but may include different shaped right-side adapters 27y, 27z. Also, the dimensions of the adaptor bracket 26 may be approximately 18.25 inches or about 463.6 mm. The adaptor bracket is bent above a middle portion that is approximately 0.75 mm below the left-side adapters 29 and 1.125 mm above the right-side adapters 26r, 26s.

Outer Tube Bracket

In another embodiment, as shown in FIGS. 17A-C, 18, and 19, an adapter bracket is formed integrally with a portion of outer tube 34. As shown particularly in FIGS. 18 and 19, in one embodiment an outer tube 34 comprising an outer tube bracket comprises two L-shaped sections that are joined, for example, by welding.

Section 33 comprises an array of adapters, e.g. adapters 27t, 27u, and 27v. The size, shape, and spacing of these adapters preferably correspond to the furniture-side adapters of any one of the previously described adapter brackets, including for example the Ethos Space adapter bracket depicted in FIGS. 10A-F, the Universal adapter bracket depicted in FIGS. 16A-E, or any other adapter designed to work with any other type of furniture. Preferably, adapters 27t, 27u, and 27v extend beyond outer tube 34 about 1.5", plus or minus about 0.5". Alternatively, instead of being furnished with hook or tab-shaped adapters, section 33 can incorporate holes for fasteners to facilitate attachment to a wall, a desk, or other fixed element.

Figure 19:
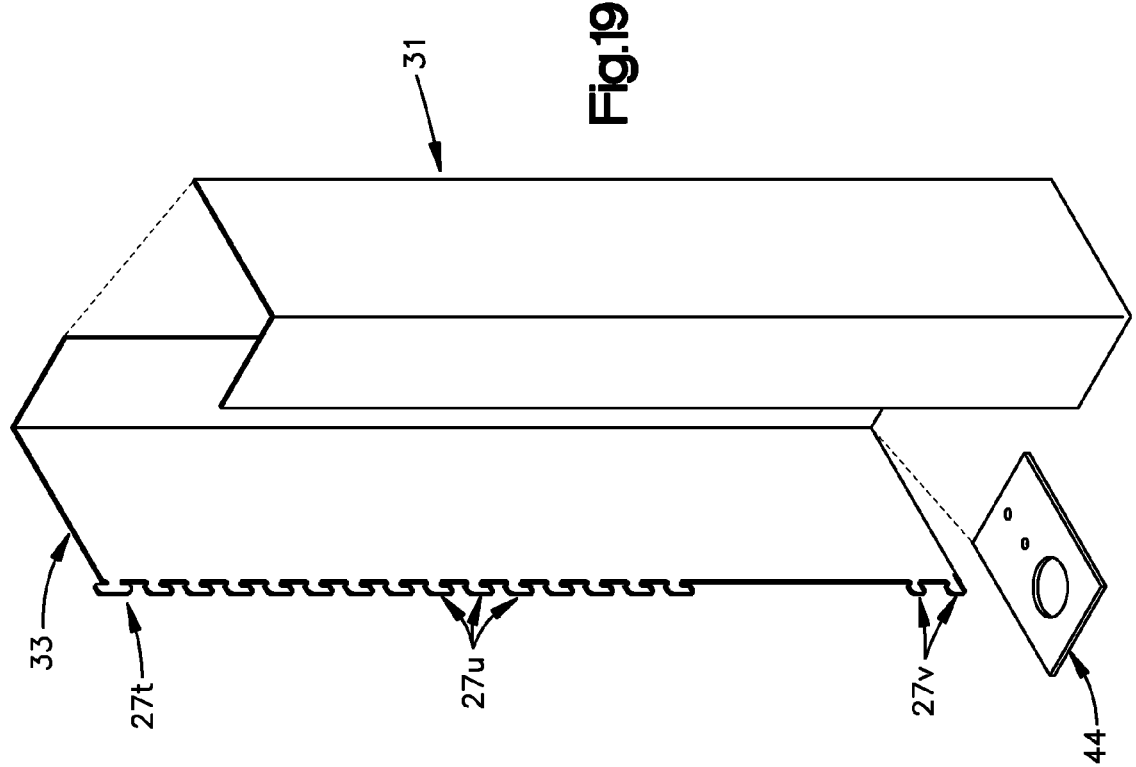
FIG. 19 shows an exploded view of an outer tube with integrally formed adapter bracket.
Figure 18:
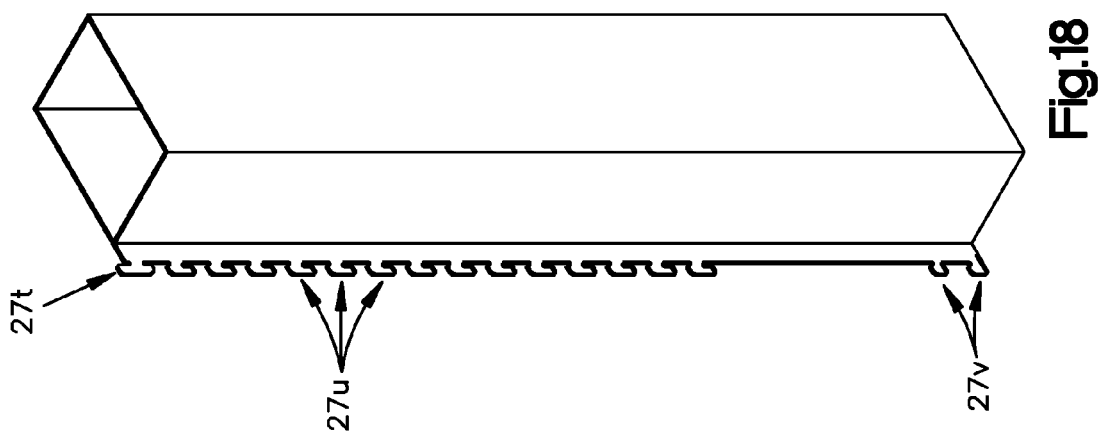
FIG. 18 shows an outer tube with integrally formed adapter bracket.

Section 31 is a universal section that can be used in combination with various different embodiments of section 33. As shown in FIGS. 18 and 19, when joined, sections 31 and 32 form an outer tube 34.

In the exemplary embodiment depicted in FIGS. 17A-C, 18, and 19, 14 adapters 27u are identical and of a generally hook-shaped configuration. Topmost adapter 27t has an upward protrusion to guard against dislodgement. Further, in this embodiment, bottommost 2 adapters 27v face the opposite way (hook directed up) from the other adapters.

Described below are the dimensions of a preferred embodiment of an outer tube bracket. Angles and distances are exemplary. In other embodiments, more or fewer adapters of differing dimensions and shape may be provided.

Bracket Core: Bracket is cnc-cut hot rolled steel; 25" in length, 8⅛" in width. 5/64" depth.

Right Side Male Adapters: 17 male adapters; 14 identical and 3 mutually unique. Extend 11/32" from bottom edge of core to smoothed 90° angle left. 13/32" to smoothed 90° angle left, then 7/32" to 90° angle left. 3/32" to smoothed 90° angle right, then ⅛" to smoothed 90° angle right at core. 11/16" to second adapter, 90° angle right. 11/32" to smoothed 90° angle left, then 11/32" to smoothed 90° angle left. ¼" to 90° angle left. 3/32" to smoothed 90° angle right, then ⅛" to smoothed 90° angle right at core. 9 5/16" to third adapter, smoothed 90° angle right. 3/32" to smoothed 90° angle right, then 3/16" to 90° angle left. ¼" to smoothed 90° angle left, then ⅝" to smoothed 90° angle left. ¼" to 90° angle left. 3/32" to smoothed 90° angle right, then 3/32" to smoothed 90° angle right at core. Repeat adapter 13 times, spaced at 1" from end to end. Last adapter at top begins 21/32" from end of previous adapter, as smoothed 90° angle right. 3/32" to smoothed 90° angle right, then 3/16" to 90° angle left. ¼" to smoothed 90° angle left, then ⅞" to smoothed 90° angle left. ¼" to smoothed 90° angle left. ¼" to smoothed 90° angle right, then 3/32" to smoothed 90° angle right at core.

Universal Section: Universal section is 25" in height and 11⅛" wide, bent 90° left at 4 5/64" from left edge. 4 holes along top edge: ¼" in diameter with centers 1" from top edge. 2 holes before left bend, equidistant from edge and bend, and with their centers 2 9/16" apart. 2 holes after bend, equidistant from bend and edge, and with centers 5 9/16" apart.

Etho Space Section: Etho Space section is 25" in height and 12 15/32" wide, bent 90° left at 4 3/64" from right edge. 4 holes along top edge: ¼" in diameter with centers 1" from top edge. 2 holes before right bend, equidistant from bend and edge, and with centers 5 9/16" apart. 2 holes after bend, equidistant from bend and edge, and with centers 5 9/16" apart. Adapters are situated along right edge.

Also disclosed herein is a method for adjusting the height of a work surface using the disclosed height adjustor apparatus. The method preferably includes:

1) Selecting a height adjustment apparatus comprising at least one telescoping tube assembly, each comprising an inner tube, an outer tube, a top, a bottom, and an electric linear actuator, and a first bracket connected to the top portion of the inner tube of each telescoping tube assembly, the first bracket for supporting the work surface and causing it to move up or down as the respective inner tube moves up or down;

2) Selecting an adapter bracket comprising two sides, a first side for attachment to one of the at least one telescoping tube assemblies, and a second side custom-designed for attachment to a specific model of furniture or another fixed element, such as a wall;

3) Coupling the telescoping tube assembly to the fixed element by attaching the respective sides of the adapter bracket to the telescoping tube and the furniture or other fixed element and coupling the first bracket to the work surface;

4) Electrically connecting the linear actuators to a linear actuator controller and to a standard electrical outlet; and 5) Operating the controller so as to cause the linear actuators to move the work surface up or down.

In one embodiment, the fixed element is a desk. In another embodiment, the fixed element is a portion of an office cubicle system or a modular furniture system. In still another embodiment, the fixed element is a wall. In a further embodiment, the work surface is a desktop.

Figure 20:
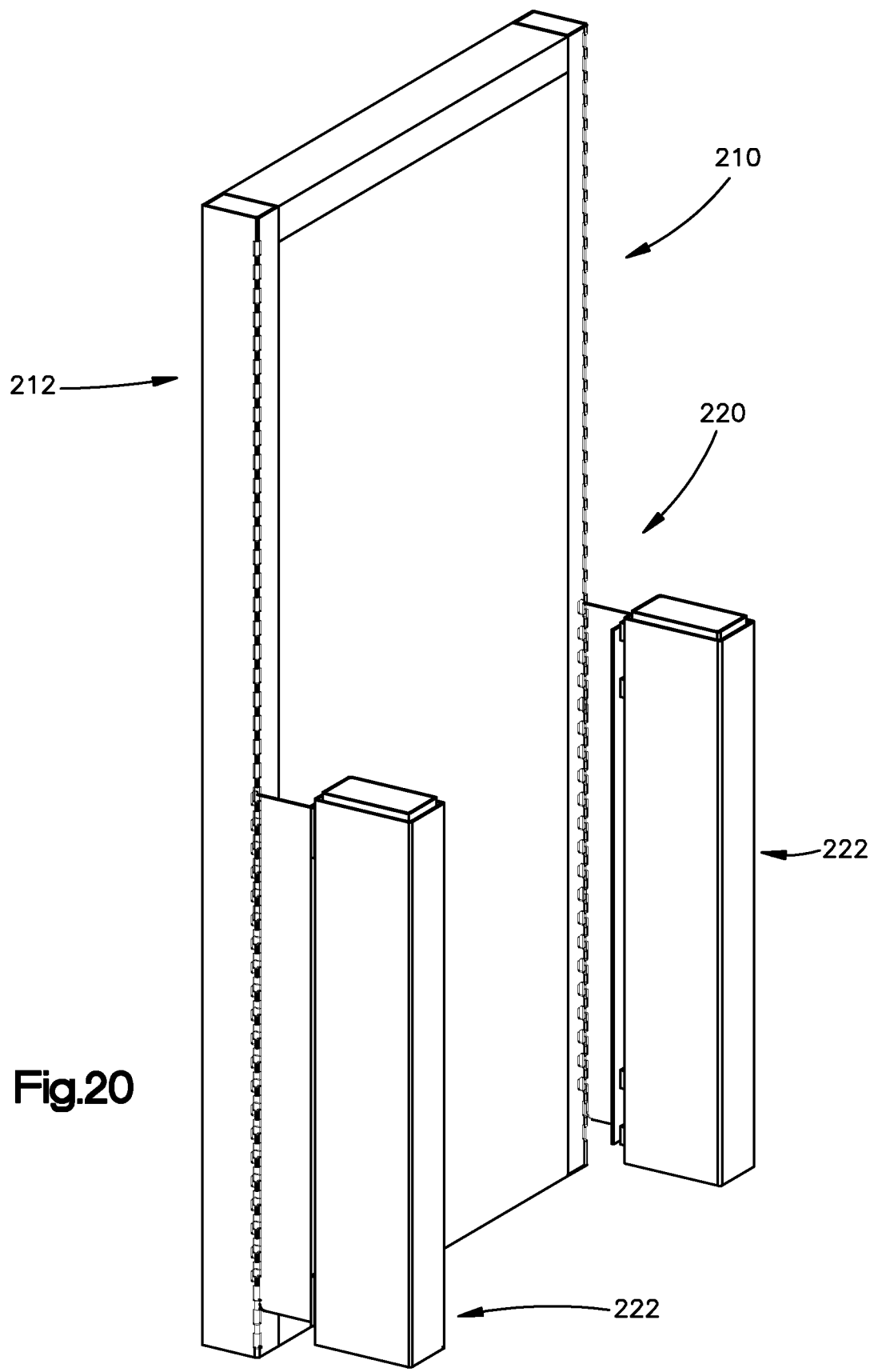
FIG. 20 shows a horizontal surface height adjustor according to another embodiment of the present invention, mounted on a frame.
Figure 23B:
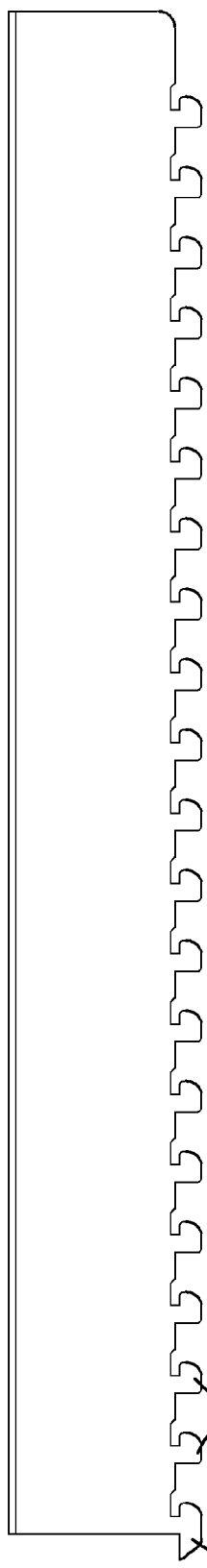
FIG. 23B depicts the adapter side of the embodiment of FIG. 23A.
Figure 23C:
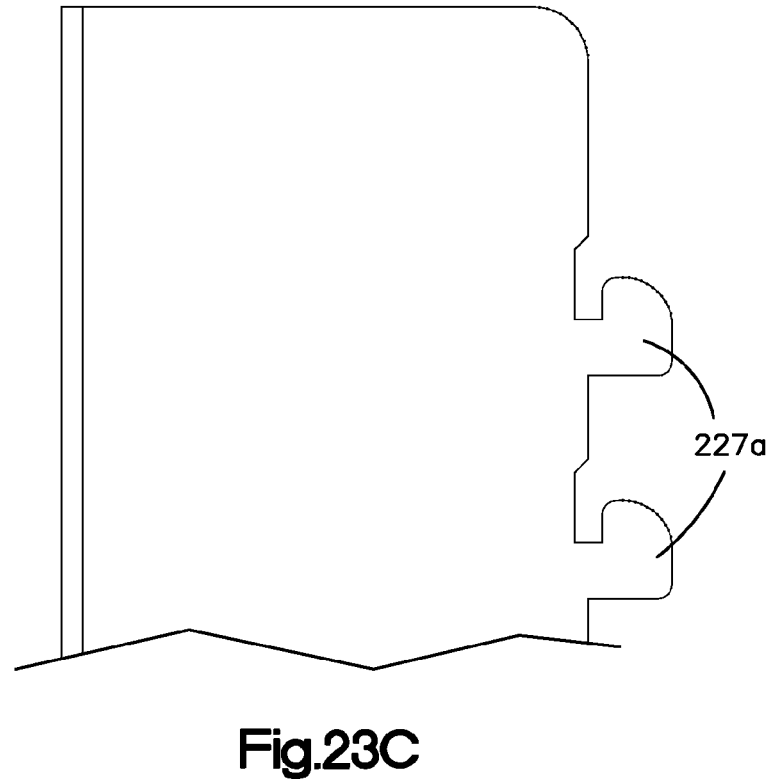
FIG. 23C depicts details of adapters of the embodiment of FIG. 23A.
Figure 23D:
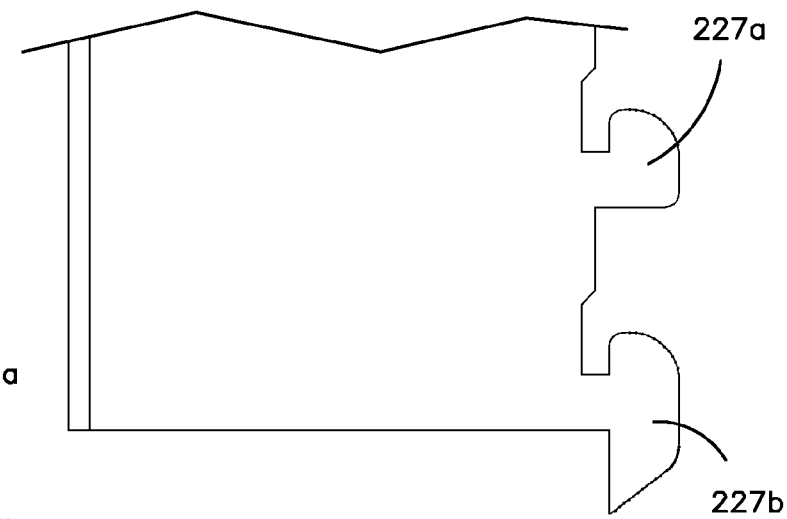
FIG. 23D depicts details of other adapters of the embodiment of FIG. 23A.
Figure 24A:
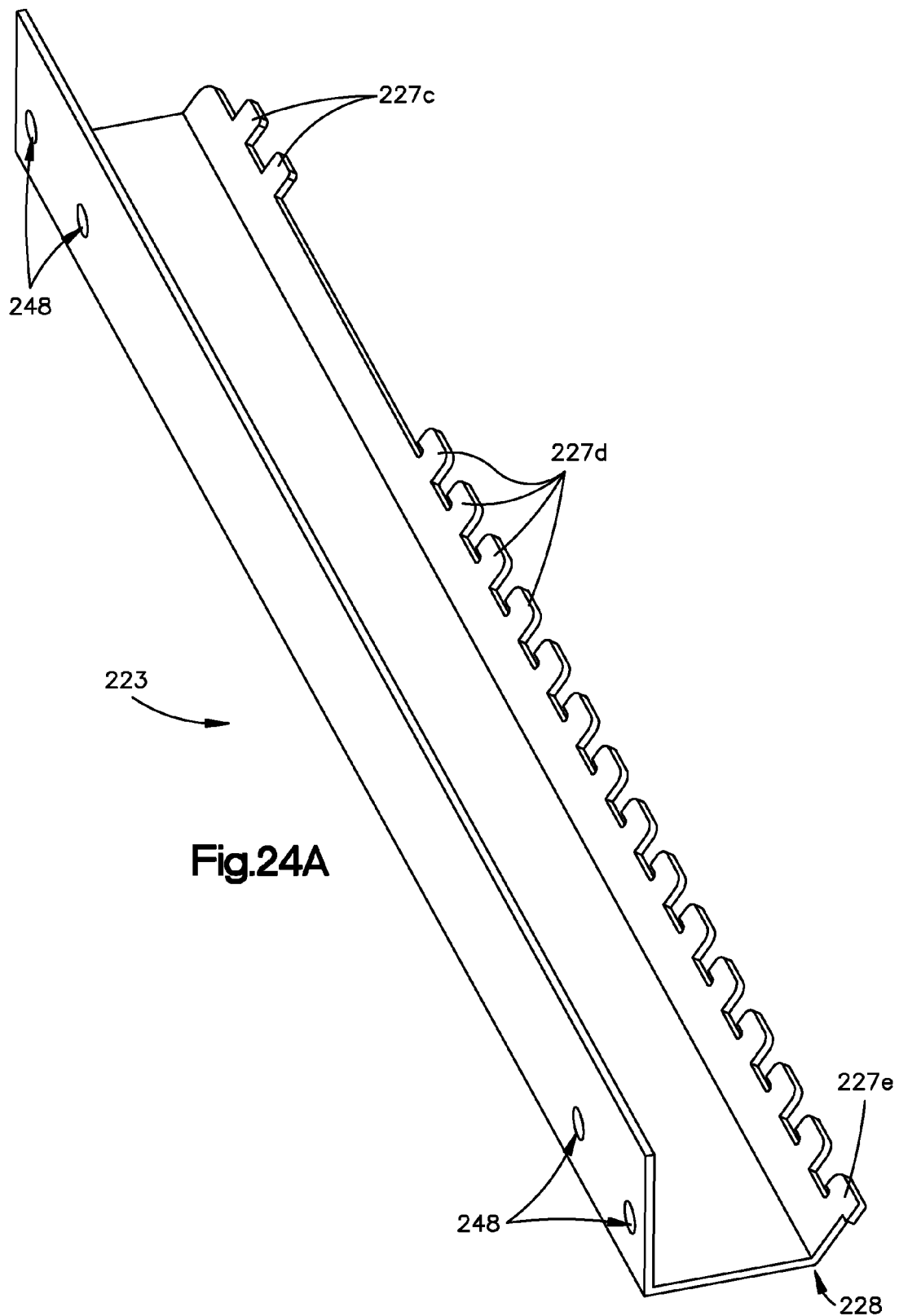
FIG. 24A depicts a perspective view of an embodiment of an angle bracket according to the present invention for use with, e.g, AO furniture.
Figure 24B:
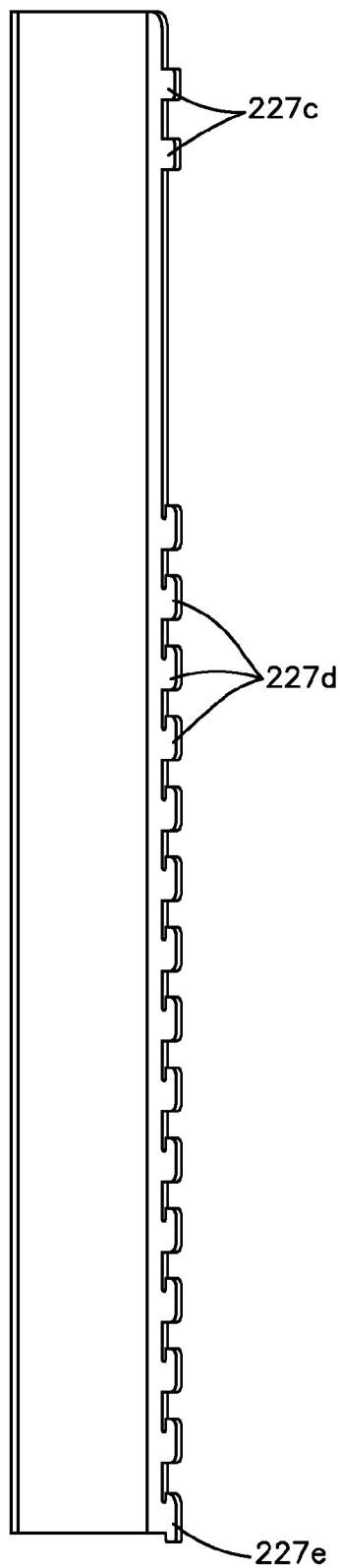
FIG. 24B depicts the adapter side of the embodiment of FIG. 24A.
Figure 24C:
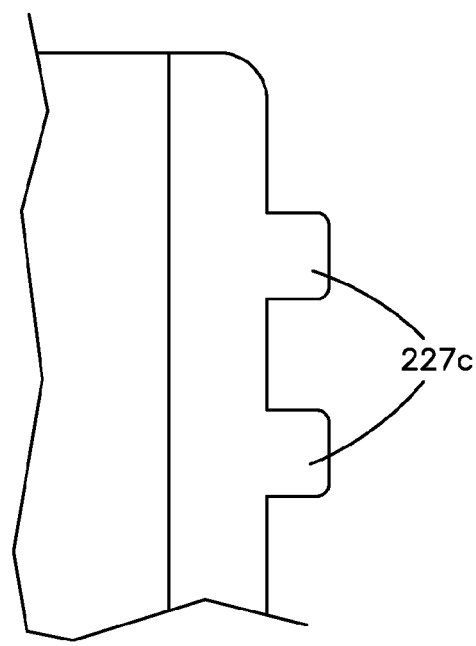
FIG. 24C depicts details of adapters of the embodiment of FIG. 24A.
Figure 24D:
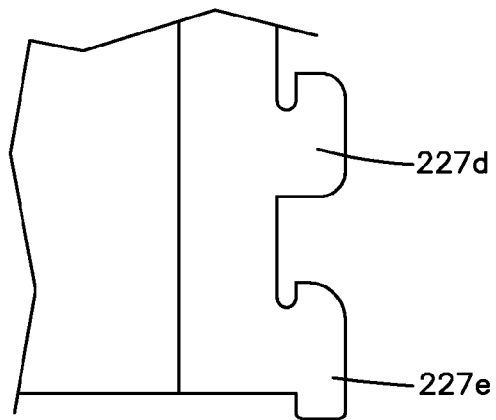
FIG. 24D depicts details of other adapters of the embodiment of FIG. 24A.
Figure 24E:
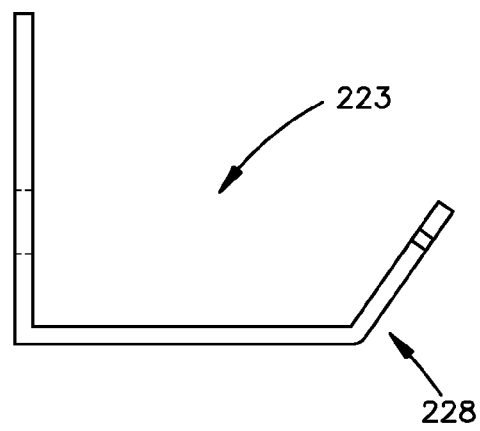
FIG. 24E depicts a cross-section of the angle bracket embodiment of FIG. 24A.

FIGS. 20-21B depict another embodiment 220 of the work surface height adjusting apparatus of the present invention, mounted to a frame 212. Frame 212 can be, for example, a panel frame or other component of a modular furniture system or office cubicle system. Frame 212 can be a frame of a desk or work station. Alternatively, rather than being mounted to a frame, work surface adjusting apparatus 220 can be mounted to a wall or other fixed surface, or secured to a footing or to a floor.

In the embodiment of FIGS. 20-21B, telescoping tube assemblies 222 are connected to frame 212 by angle brackets 223. In a preferred embodiment, angle brackets 223 comprise 2 sides that form a right angle. In a variation, angle bracket 223 comprises more than 2 sides and more than 1 angle. See, e.g., FIGS. 24A-24E.

One side of angle bracket 223, which may be called the "furniture side" or the "adapter side," comprises a set of generally hook-shaped or tab-shaped adapters 227, for mounting to corresponding slots in a fixed element, such as a panel frame or other component of a modular furniture system or office cubicle system. The other side of angle bracket 223 comprises holes 248 for fasteners that connect angle bracket 223 to telescoping tube assembly 222. In a preferred embodiment, angle bracket 223 comprises 2 holes 248 near each end of the bracket, for a total of 4 holes 248. In a preferred embodiment, one or more connecting plates 240 are affixed to telescoping tube assembly 222. Each connecting plate comprises 2 or more holes 241 for receiving fasteners that pass through corresponding holes 248 in angle bracket 223.

In a preferred embodiment, each connecting plate 240 comprises 2 threaded holes 241 for receiving machine screws. In a preferred embodiment, 2 connecting plates 240 are affixed to each telescoping tube assembly 222, with one connecting plate 240 near the top end of telescoping tube assembly 222 and another connecting plate 240 near the bottom end of telescoping tube assemble 222. In a preferred embodiment, the connecting plates 240 are affixed to the telescoping tube assemblies 222 by welding. In another embodiment, the connecting plates 240 are affixed to the telescoping tube assemblies 222 by an adhesive. In another embodiment, connecting plates 240 are affixed to the telescoping tube assemblies 222 by means of screws. In a preferred embodiment, connecting plate 240 has a narrowed middle section and wider end sections. In an embodiment, the overall shape of connecting plate 240 resembles the shape of a double-headed wrench.

Installation of a preferred embodiment of horizontal surface height adjustment apparatus 220 proceeds preferably as follows: In a preferred embodiment, each telescoping tube assembly (leg) 222 has 2 connecting plates 240 affixed to one side of the leg. Each plate 240 has two threaded holes 241 for receiving a machine screw. First, the angle brackets 223 are attached to the legs 222. Each of the four holes in the angle brackets aligns with one of the two holes in each of the two connecting plates on the telescoping tube assembly (leg) 222. The angle bracket 223 and connecting plate 240 are fastened together with four machine screws (not shown). The machine screws are inserted through the four holes 248 in the angle brackets 223 and into the two receiving holes 241 in each of the two connecting plates 240. All machine screws are then screwed into the threaded holes, thereby joining the angle brackets with the legs 222 to which the connecting plates are attached. The joined legs and angle brackets are then mounted on the frame or work station wall 212 by inserting the adapter hooks 227 into the corresponding slots in the frame or work station wall 212.

Various exemplary embodiments of angle bracket 223 will now be described in detail.

In an embodiment of angle bracket 223 designed for use with multiple furniture types, shown in FIGS. 22A-22D, there are preferably 8 adapters. These include adapter 227r, which has a protrusion to guard against dislodgement, as well as 7 generally hook-shaped adapters 227s. Spacing between successive adapters 227s, measured from the top of one adapter 227s to the top of the next adapter 227s, is about 3". In an embodiment, the gaps or spaces between right-side adapters include 3 divots 225, each divot 225 having a maximum depth of about 1/16" and a total length of about 1/2". In other embodiments, more or fewer adapters of differing dimensions and shape may be provided.

The embodiment of FIGS. 22A-22D is a universal angle bracket that is designed to fit most furniture systems and work stations. In order to accomplish this, the universal angle bracket provides adapters that accommodate the size, shape, and spacing of slots supported by a wide variety of furniture systems and work stations.

Another embodiment of angle bracket 223, shown in FIGS. 23A-23D, is for use with, e.g., All Steel furniture. In this embodiment, 20 adapters 227a are of an identical, generally hook-shaped configuration. A single adapter 227b includes a protrusion to guard against dislodgement. As shown in detail in FIGS. 23C and 23D, the bracket preferably further includes a notch opposite each right-side adapter 227a or 227b. Preferably, as shown in detail in FIGS. 23C and 23D, each adapter 227a or 227b includes a curved leading edge.

Another embodiment of angle bracket 223 is designed for use with, e.g., AO furniture. In this embodiment, as shown in FIGS. 24A-24E, 14 adapters 227d are identical and of a generally hook-shaped configuration. Two adapters 27c at one end of the bracket are tab-shaped, and adapter 227e at the other end of the bracket has a protrusion to guard against dislodgement. See detailed views of preferred adapter shapes in FIGS. 24 C-E. Preferably, there is an elongated space between the second tab-shaped adapter 227c and the first hook-shaped adapter 227d. Preferably, this space or gap is about 5" long. In an embodiment, angle bracket 223 preferably comprises an additional bend 228 along a line parallel to the longitudinal axis of angle bracket 223, and also parallel to the main 90° bend of angle bracket 223, giving angle bracket 223 a cross-section resembling an asymmetrical U-shape. See FIG. 24E. In a preferred embodiment, the bend line is about $27/32$" from the outer edge of the adapters and about $1 55/64$" from the main 90° bend of angle bracket 223, resulting in an asymmetrical U-shaped cross-section, with one side of the "U" longer and bent at a different angle than the other side. Preferably, the measure of the dihedral angle between the two sides that meet at bend 228 is about 125°.

Angles and distances are exemplary. In other embodiments, more or fewer adapters of differing dimensions and shape may be provided. The angled configuration of this embodiment is desirable in order to meet the unique configuration of AO furniture.

Figure 25B:
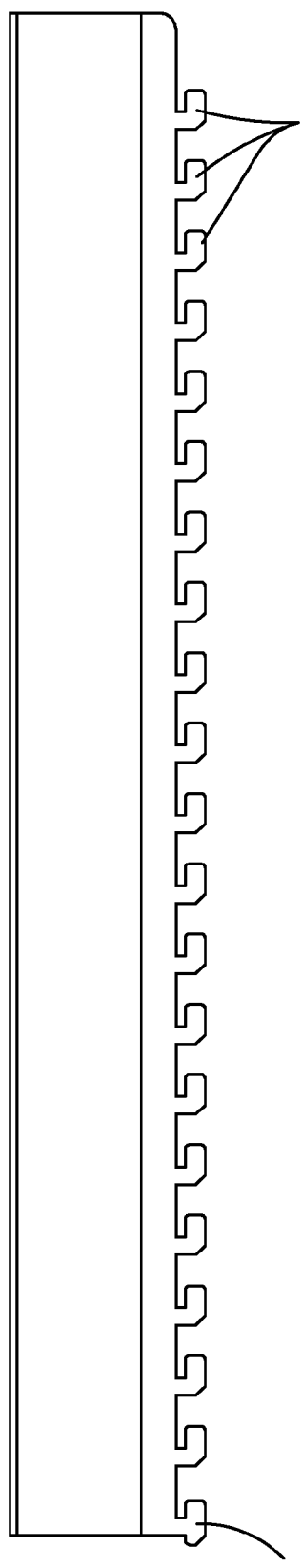
FIG. 25B depicts the adapter side of the embodiment of FIG. 25A.
Figure 25C:
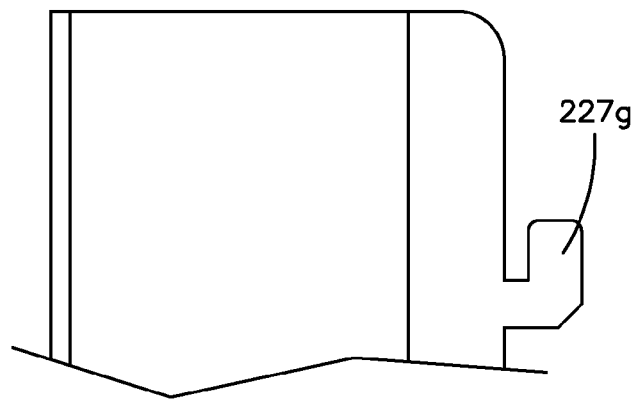
FIG. 25C depicts details of an adapter of the embodiment of FIG. 25A.
Figure 25D:
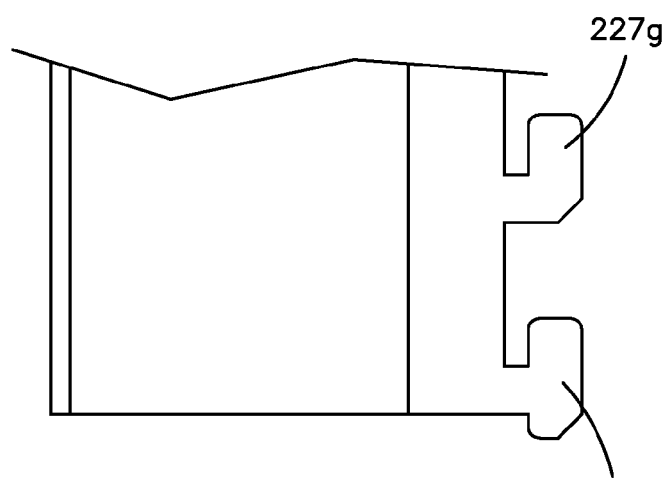
FIG. 25D depicts details of other adapters of the embodiment of FIG. 25A.

Another embodiment of angle bracket 223, shown in FIGS. 25A-25D, is for use with, e.g., Compatico furniture. In this embodiment, as shown in FIGS. 25A and 25B, 20 adapters 227g are of an identical, generally hooked-shaped configuration. A single adapter 227f at one end of the bracket is of different shape, having a protrusion to guard against dislodgement. In an embodiment, each adapter 227g and 227f includes a straight leading edge. See FIGS. 25C and 25D for details of adapter shapes.

Figure 26A:
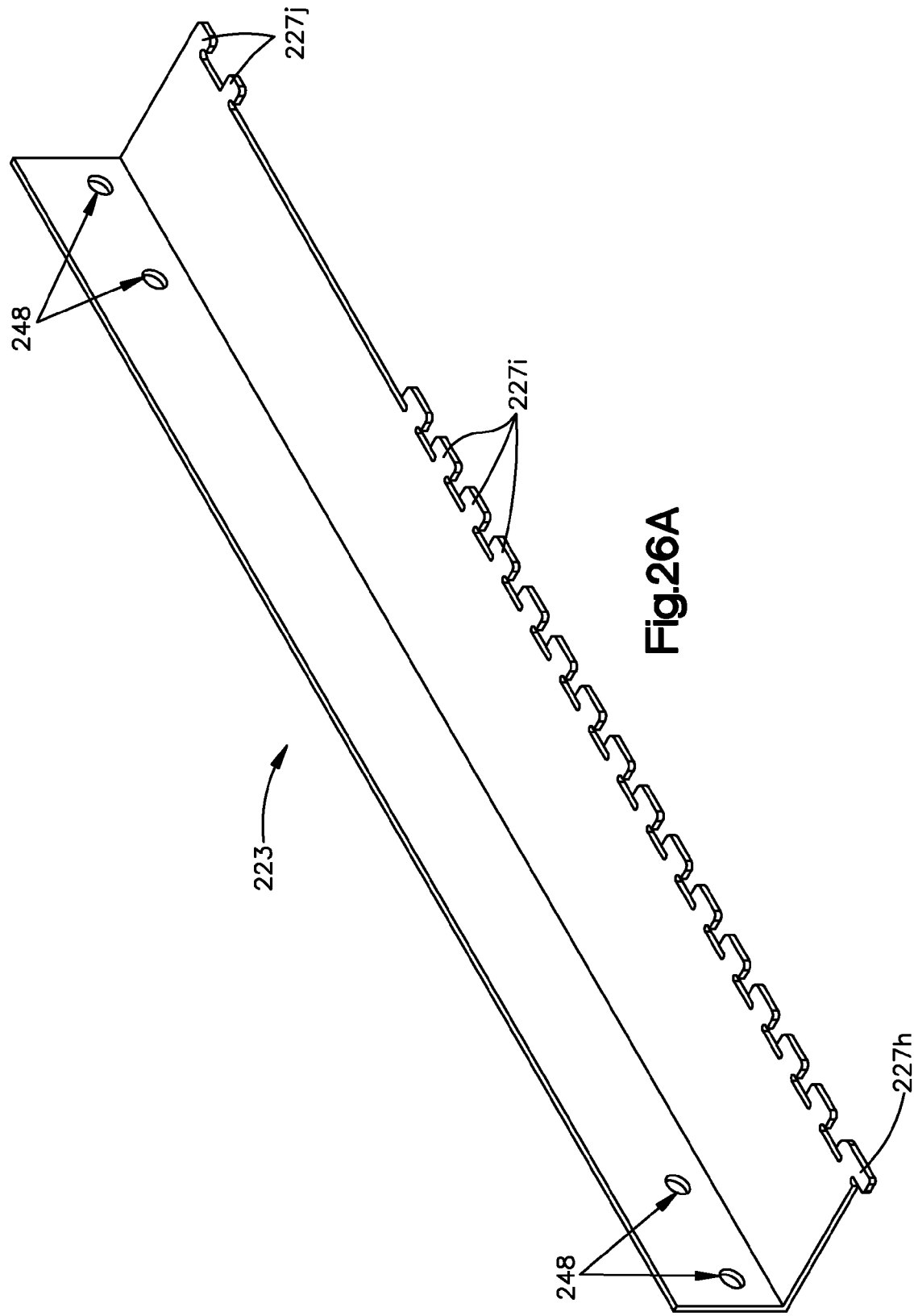
FIG. 26A depicts a perspective view of an embodiment of an angle bracket according to the present invention for use with, e.g, Ethos Space furniture.

Another embodiment of angle bracket 223, shown in FIGS. 26A-26D, is for use with, e.g., Ethos Space furniture. In this embodiment, as shown in FIGS. 26A and 26B, 15 adapters 227i are identical and of a generally hook-shaped configuration. One adapter 227h has a protrusion to guard against dislodgement. Further, in this embodiment, the 2 adapters 227j face the opposite way (hook oppositely directed) from the other adapters. See enlarged views of each adapter shape in FIGS. 26C-D. Angles and distances are exemplary. In other embodiments, more or fewer adapters of differing dimensions and shape may be provided.

Figure 27A:
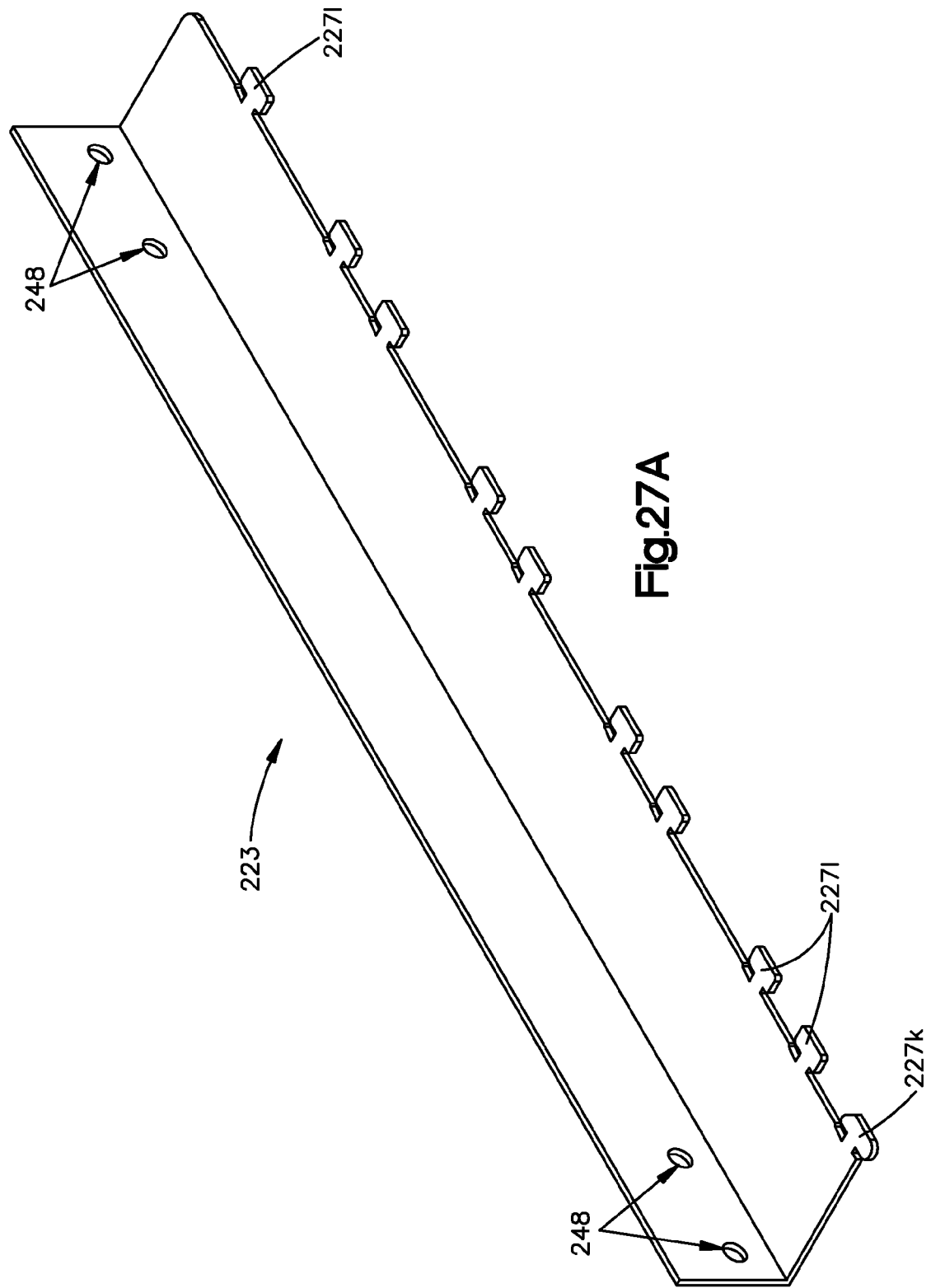
FIG. 27A depicts a perspective view of an embodiment of an angle bracket according to the present invention for use with, e.g., Knoll Dividends furniture.
Figure 29A:
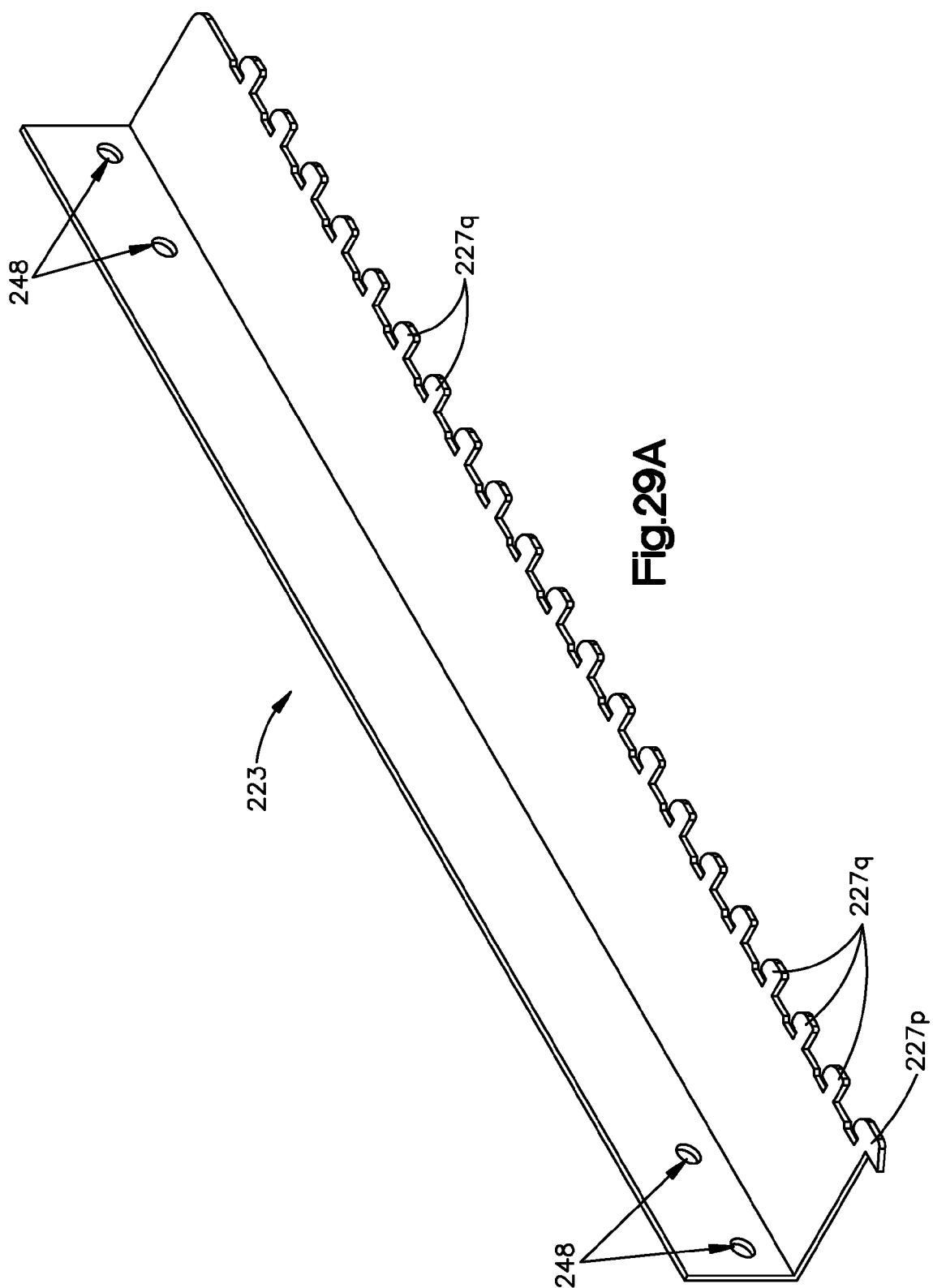
FIG. 29A depicts a perspective view of an embodiment of an angle bracket according to the present invention for use with, e.g., Techion furniture.
Figure 29B:
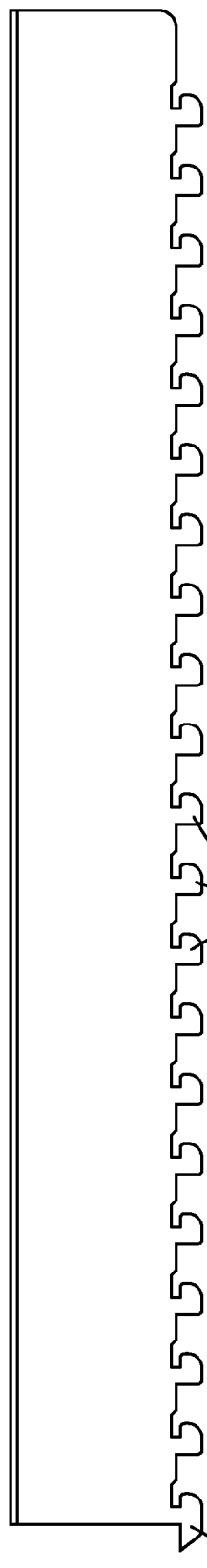
FIG. 29B depicts the adapter side of the embodiment of FIG. 29A.
Figure 29C:
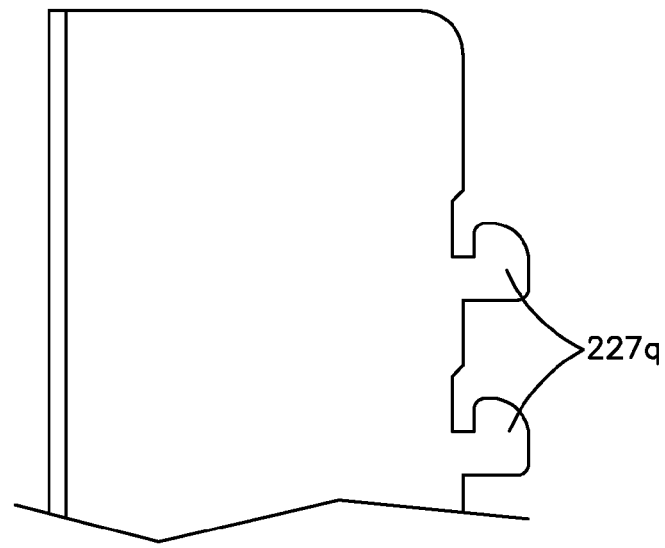
Figure 29D:
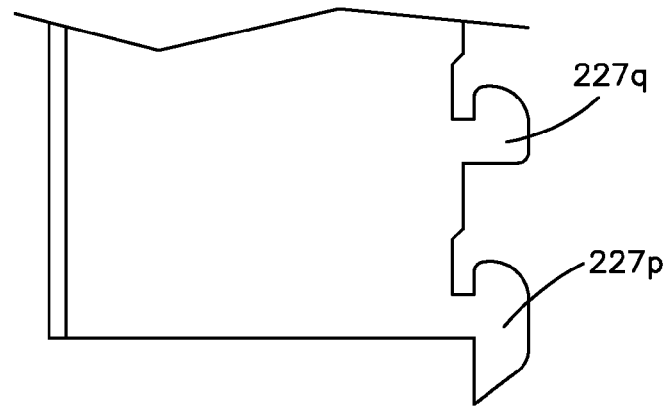

Another embodiment of angle bracket 223, shown in FIGS. 27A-27D, is for use with, e.g., Knoll Dividends furniture. In this embodiment, as shown in FIGS. 27A and 27B one adapter 227k has a protrusion to guard against dislodgement. The other adapters are grouped in groups of two, with a space having no adapters in between groups. The spacing between adapters within each group of two adapters 227l (measured from the top of one adapter 227l to the top of the next adapter 227l) is about 1½". The gap between two-adapter groups is about 3", measured from the top of the adapter 227l on one side of the gap to the top of the adapter 227l on the other side of the gap. Adapters 227l are generally T-shaped, as may be seen in the detailed views of FIGS. 27C-D. In other embodiments, more or fewer adapters of differing dimensions and shape may be provided.

Another embodiment of angle bracket 223, shown in FIGS. 28A-28D, is for use with, e.g., Steel Case furniture. In this embodiment, as shown in FIGS. 28A and 28B, one adapter 227m has a protrusion to guard against dislodgement, and one adapter 227o is L-shaped. The other adapters (adapters 227n, preferably 11 in number) are generally hook-shaped, with a slant leading edge. The shapes of the various adapters are shown in detail in FIGS. 28C-D. The slant-edged adapters 227n are grouped together in one half of bracket 223, and there is a gap having no adapters extending from the last of the slant-edged adapters to the L-shaped adapter. The gap is about 9" in length. In the gap area, at a point about 2¼" from the end of the bracket, the adapter side of the bracket protrudes outward about ⅛".

Angles and distances are exemplary. In other embodiments, more or fewer adapters of differing dimensions and shape may be provided.

Another embodiment of angle bracket 223, shown in FIGS. 29A-29D, is for use with, e.g., Techion furniture. In this embodiment 20 right-side adapters 227q are of an identical, generally hook-shaped configuration, except for adapter 227p at one end, which has a protrusion to guard against dislodgement. In an embodiment, the bracket further includes a notch opposite each adapter. In an embodiment, each adapter includes a curved leading edge. See enlarged views of the adapter shape and notches in FIGS. 29C and 29D. In other embodiments, more or fewer adapters of differing dimensions and shape may be provided.

For additional exemplary adapter dimensions, angles, and distances applicable to embodiments of angle bracket 223, see the detailed descriptions of the various embodiments of adapter bracket 26, supra, particularly including the exemplary dimensions of right side male adapters set forth therein.

The description contained herein is for purposes of illustration and not for purposes of limitation. Changes and modifications may be made to the embodiments of the description and still be within the scope of the invention. Furthermore, obvious changes, modifications or variations will occur to those skilled in the art. Also, all references cited above are incorporated herein by reference, in their entirety, for background and to assist the reader of this disclosure.

While the invention has been shown and described herein with reference to particular embodiments, it is to be understood that the various additions, substitutions, or modifications of form, structure, arrangement, proportions, materials, and components and otherwise, used in the practice and which are particularly adapted to specific environments and operative requirements, may be made to the described embodiments without departing from the spirit and scope of the present invention. Accordingly, it should be understood that the embodiments disclosed herein are merely illustrative of the principles of the invention. Various other modifications may be made by those skilled in the art which will embody the principles of the invention and fall within the spirit and the scope thereof.

While embodiments related to adjustable work surfaces have been described, such descriptions are not to be understood as limiting. For example, the described adjustor can also be adapted to adjust a restaurant table, a hospital bed, or other adjustable items such as, e.g., an assembly line or a server rack.

What is claimed is:

1. An apparatus for adjusting the height of a surface comprising: a telescoping tube assembly comprising an inner tube having a top plate, and an outer tube; and an adapter bracket comprising a first side connected to the telescoping tube assembly and a second side attachable to a fixed element by one or more adapters that protrude from the second side and are receivable in corresponding openings on the fixed element, wherein the top plate is connectable to the surface so that the surface is raised as the inner tube moves up and the surface is lowered as the inner tube moves down.

2. The apparatus of claim 1, wherein the fixed element is piece of furniture and the adapter bracket comprises an array of adapters, the size, shape, and placement of which permits the bracket to be selectively attachable to any of at least two or more pieces of furniture which differ from each other in the size, shape, or placement of their respective openings.

3. The apparatus of claim 1, wherein the fixed element is a desk.

4. The apparatus of claim 1, wherein the fixed element is a portion of an office cubicle system or a modular furniture system.

5. The apparatus of claim 1, wherein the fixed element is a wall.

6. The apparatus of claim 1, wherein the surface is a desktop.

7. The apparatus of claim 1, wherein the inner tube is moved relative to the outer tube by a linear actuator driven by an electric motor.

8. The apparatus of claim 1, wherein the second side of the adapter bracket comprises holes to accommodate fasteners.

9. The apparatus of claim 1, wherein the adapter bracket first side comprises an array of generally hook-shaped adapters that are received in openings on the telescoping tube assembly, and wherein the telescoping tube assembly further comprises a sleeve affixed to the outer tube and the telescoping tube assembly openings are formed in the sleeve.

10. The apparatus of claim 1, further comprising one or more suction cups, wherein the top plate is coupled to the surface using the one or more suctions cups.

11. The apparatus of claim 10, wherein the one or more suction cups comprise two suction cups on each end of the top plate, each suction cup comprising a base and a handle for activating a suction effect and securing the surface to the top plate.

12. The apparatus of claim 10, wherein the suction cup is coupled to the top plate using a pin and coupled to the surface using a suction cup base.

13. An apparatus for adjusting the height of a work surface comprising: a lifting column comprising an electric linear actuator; a bracket coupled to the top of the lifting column, the bracket being adapted to support a work surface; and an adapter bracket adapted to connect the lifting column to a furniture system, the adapter bracket having a first side connected to the lifting column, and a second side comprising an array of adapters adapted to fit into an array of openings in a first furniture system, the array of adapters are also adapted to fit into an array of openings in a second furniture system, wherein the openings in the second furniture system differ in size, shape, number, or relative positioning compared to the openings in the first furniture system.

14. The apparatus of claim 13, wherein the array of adapters is also adapted to fit into an array of openings in a third furniture system, the array of openings in the third furniture system differing from the array of openings in the first furniture system and the array of openings in the second furniture system as to the size, shape, number, or relative positioning of their respective constituent openings.

15. The apparatus of claim 13, wherein the lifting column is a telescoping tube assembly comprising an inner tube that moves up and down relative to an outer tube.

16. The apparatus of claim 13, wherein the adapter bracket first side comprises an array of adapters received in an array of openings on the lifting column, and wherein further the telescoping tube assembly comprises a sleeve connected to the outer tube and the array of openings in the lifting column is formed in a corner portion of the sleeve.

17. The apparatus of claim 13, further comprising one or more suction cups configured to connect the bracket to the work surface.

18. The apparatus of claim 17, wherein the one or more suction cups comprise two suction cups on each end of the bracket, each suction cup comprising a base and a handle for activating a suction effect and securing the work surface to the bracket.

19. The apparatus of claim 17, wherein the suction cup is coupled to the bracket using a pin and coupled to the work surface using a suction cup base.

20. An apparatus for adjusting the height of a surface comprising: a telescoping tube assembly; an adapter bracket comprising a first side connected to the telescoping tube assembly and a second side attachable to a fixed element by one or more adapters that protrude from the second side and are received in openings on the fixed element, wherein the adapter bracket is bent at a first position and a second position such that the adapter bracket comprises a first lateral side, a second lateral side that is substantially perpendicular to the first lateral side, and a third lateral side that is substantially parallel to the first lateral side.

21. The apparatus of claim 20, wherein the adapter bracket first side comprises an array of generally hook-shaped adapters received in an array of openings on the telescoping tube assembly.

* * * * *